(12) United States Patent
Kobayashi

(10) Patent No.: US 8,139,887 B2
(45) Date of Patent: Mar. 20, 2012

(54) IMAGE-SIGNAL PROCESSING APPARATUS, IMAGE-SIGNAL PROCESSING METHOD AND IMAGE-SIGNAL PROCESSING PROGRAM

(75) Inventor: Hiroshi Kobayashi, Kanagawa (JP)

(73) Assignee: Sony Corporation (JP)

( * ) Notice: Subject to any disclaimer, the term of this patent is extended or adjusted under 35 U.S.C. 154(b) by 949 days.

(21) Appl. No.: 12/157,389

(22) Filed: Jun. 10, 2008

(65) Prior Publication Data

US 2008/0304758 A1 Dec. 11, 2008

(30) Foreign Application Priority Data

Jun. 11, 2007 (JP) ................................ P2007-154191

(51) Int. Cl.
G06K 9/40 (2006.01)
H04N 1/40 (2006.01)
H04N 11/02 (2006.01)

(52) U.S. Cl. ..................... 382/260; 358/448; 375/240.25

(58) Field of Classification Search .................. 382/210, 382/251, 253, 260, 261, 262, 263, 264, 265, 382/232, 276, 307; 358/3.04, 512, 426.04, 358/443, 448, 462, 530; 704/200–206, 222, 704/224, 226, 230; 375/240.03, 240.22, 375/245, 240.26
See application file for complete search history.

(56) References Cited

U.S. PATENT DOCUMENTS

| 3,715,466 | A | * | 2/1973 | Karato | 348/260 |
| 5,077,613 | A | * | 12/1991 | Hirao et al. | 348/356 |
| 5,600,373 | A | * | 2/1997 | Chui et al. | 375/240.1 |
| 6,332,119 | B1 | * | 12/2001 | Hinderks | 704/206 |
| 7,916,952 | B2 | * | 3/2011 | Demos | 382/232 |

FOREIGN PATENT DOCUMENTS

| JP | 03067893 A | 3/1991 |
| JP | 03158078 A | 7/1991 |
| JP | 04145783 A | 5/1992 |
| JP | 04252670 A | 9/1992 |
| JP | 08237669 A | 9/1996 |
| JP | 09044648 A | 2/1997 |
| JP | 09-219833 A | 8/1997 |
| JP | 10173488 A | 6/1998 |
| JP | 2005175735 A | 6/2005 |
| WO | 2007063771 A1 | 6/2007 |

OTHER PUBLICATIONS

Office Action from Japanese Application No. 2007-154191, dated Nov. 22, 2011.

* cited by examiner

*Primary Examiner* — Abolfazl Tabatabai
(74) *Attorney, Agent, or Firm* — Lerner, David, Littenberg, Krumholz & Mentlik, LLP

(57) ABSTRACT

Disclosed herein is an image-signal processing apparatus, including: a band pass filter configured to increase the bit count of an input digital image signal in a bit decompression process and pass on an image signal of a high frequency band; an amplitude limiting section configured to limit the amplitude of the image signal passed on by the band pass filter to a level determined in advance; and a subtractor configured to subtract an image signal output by the amplitude limiting section from the input digital image signal.

13 Claims, 32 Drawing Sheets

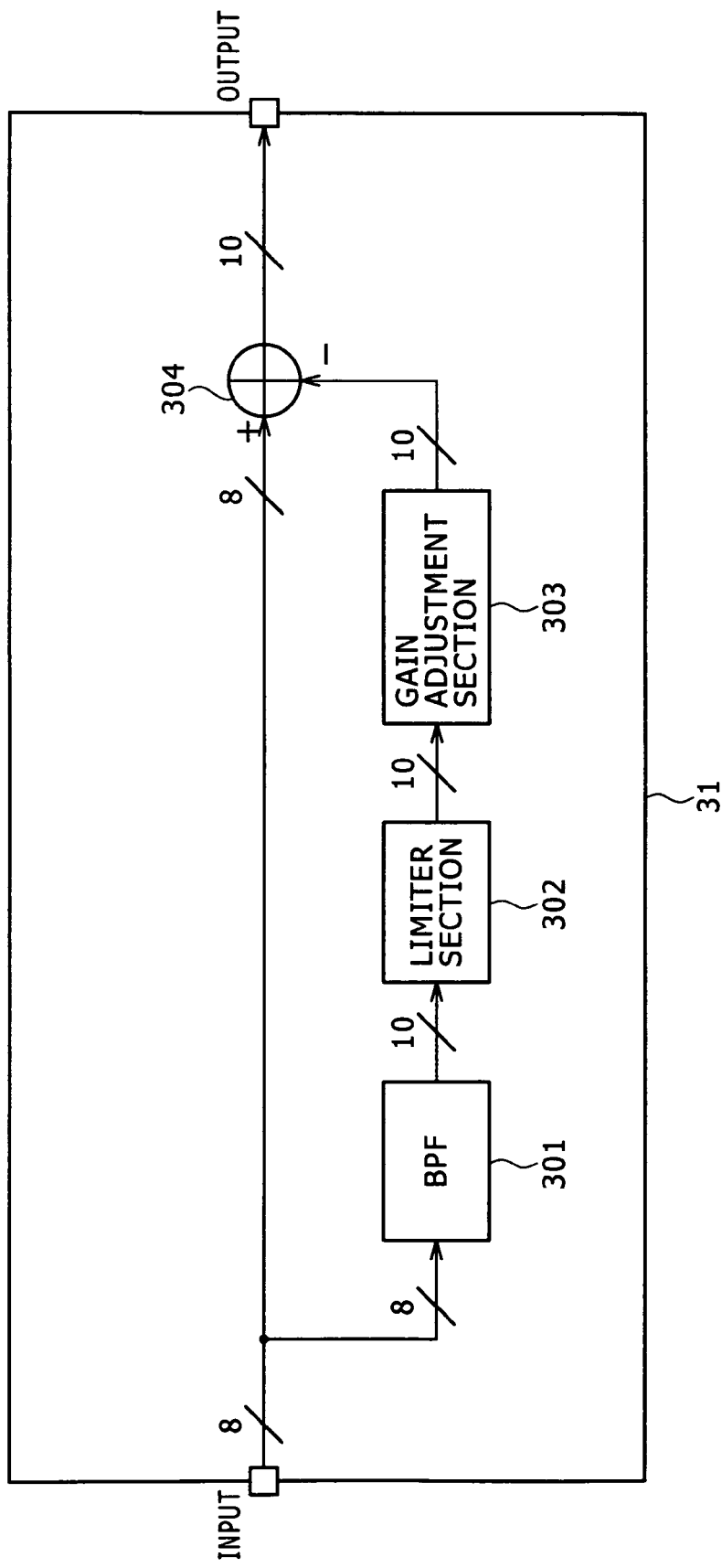

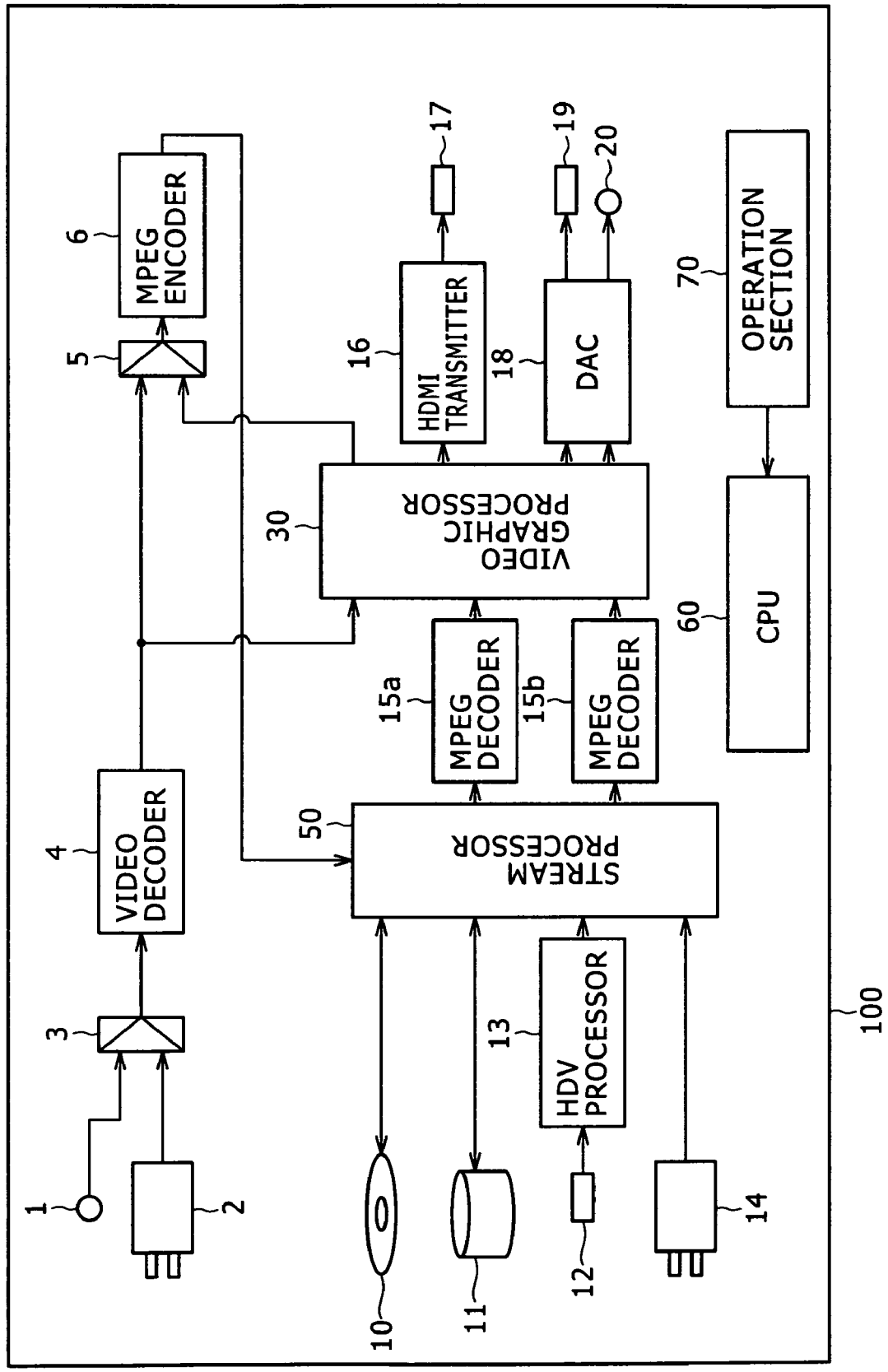

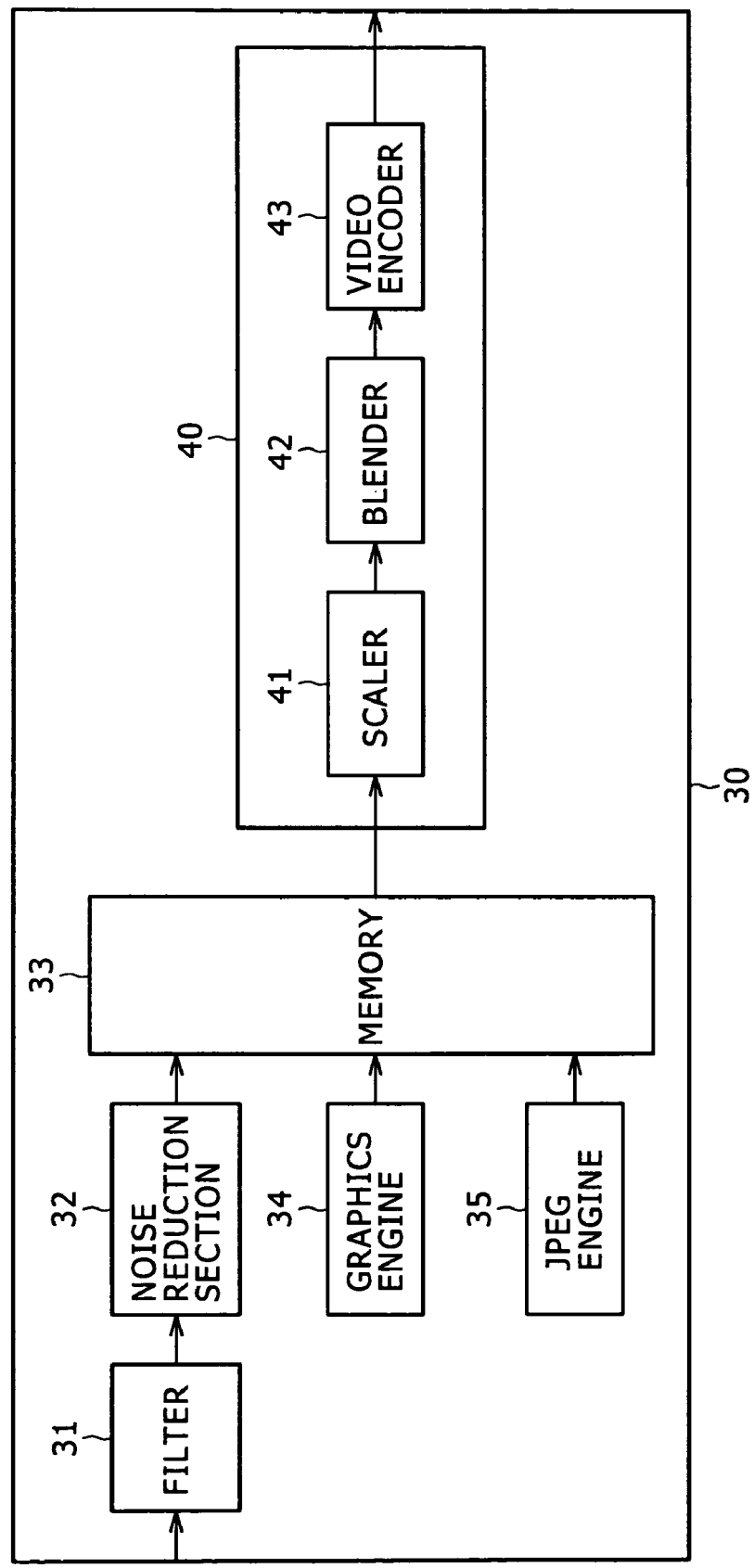

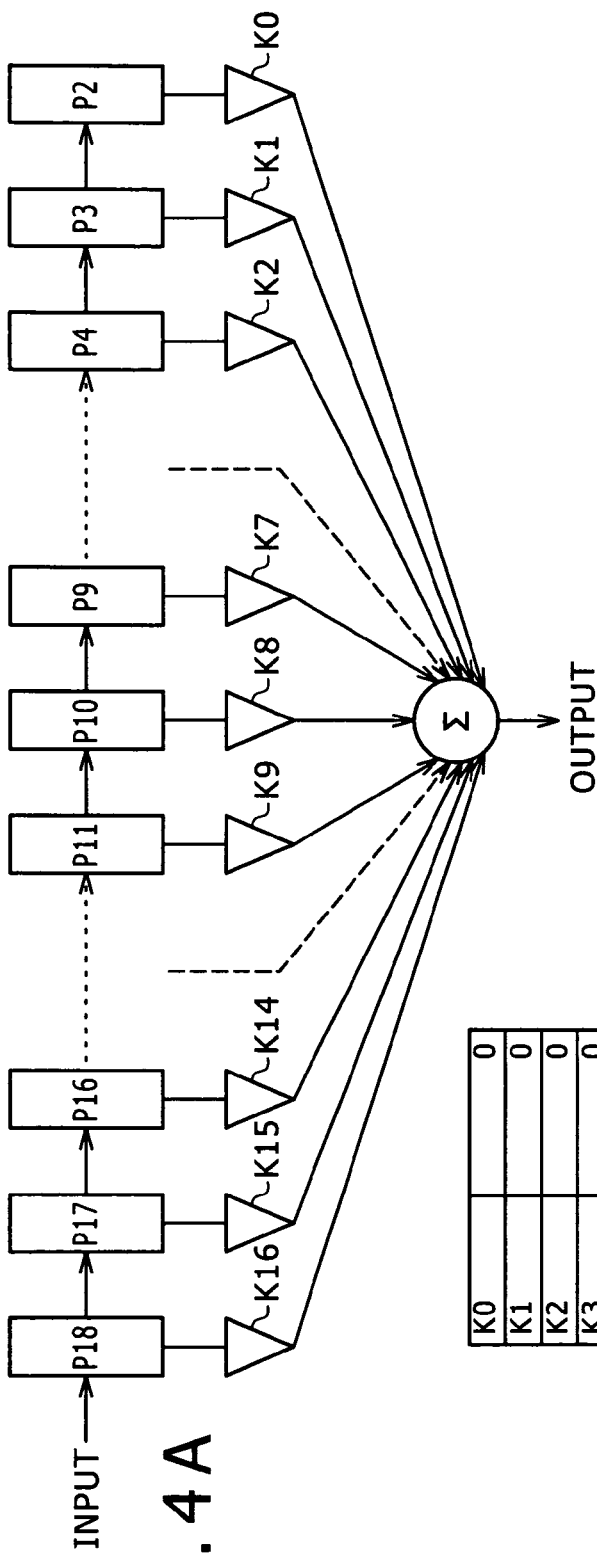

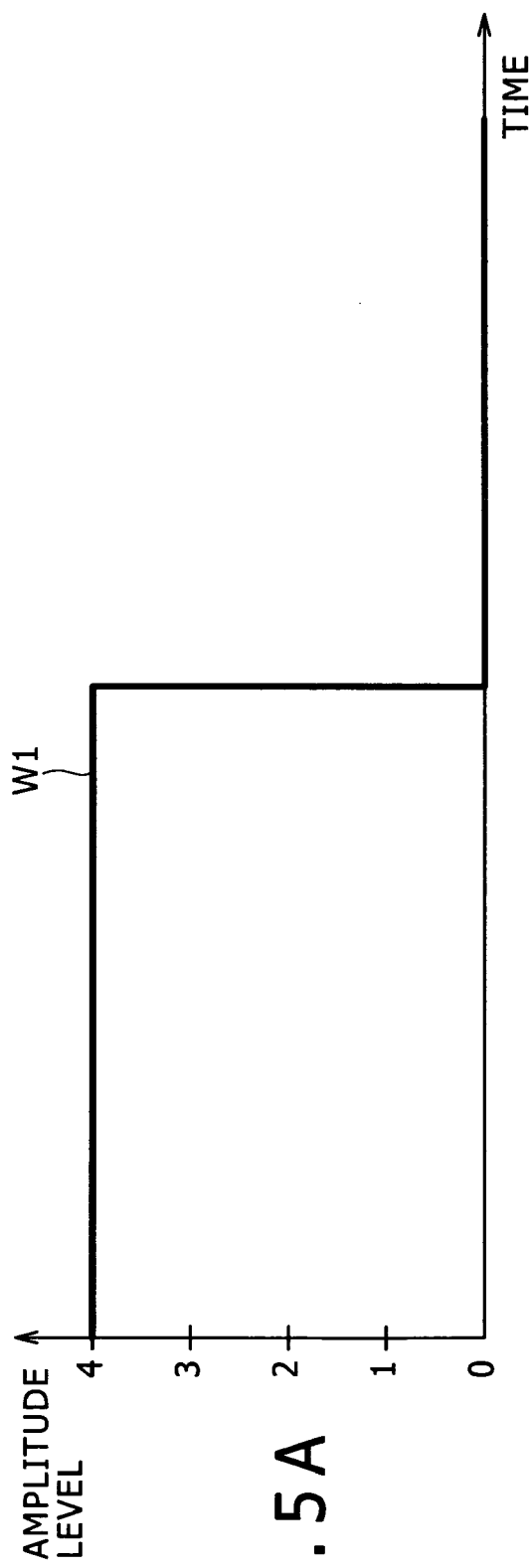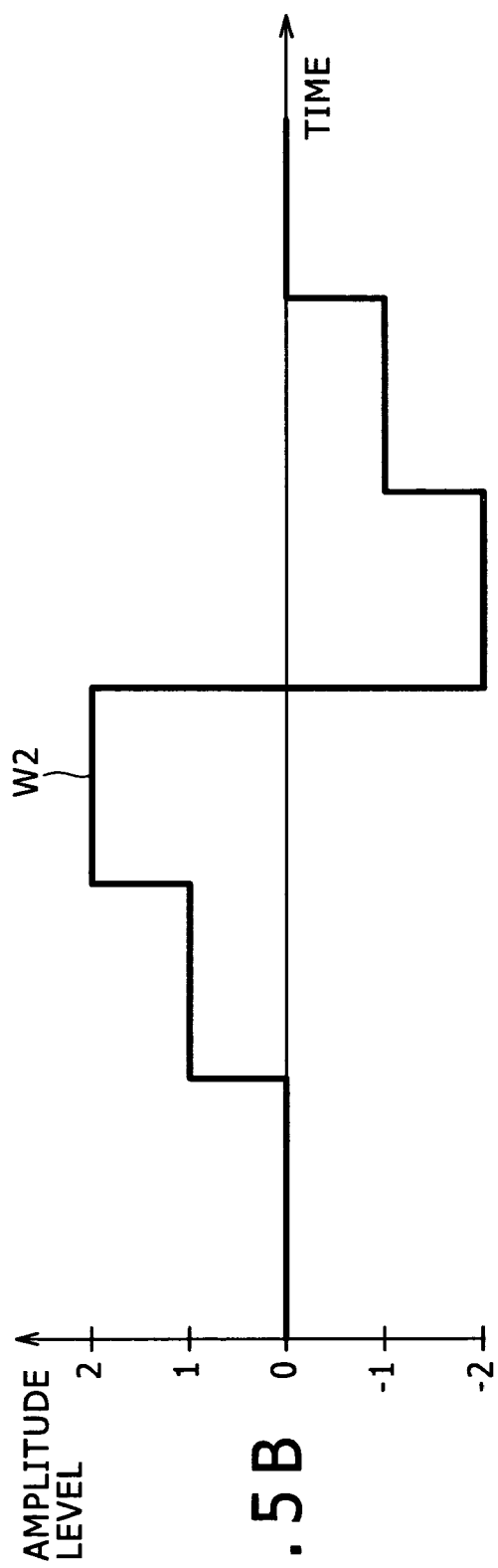

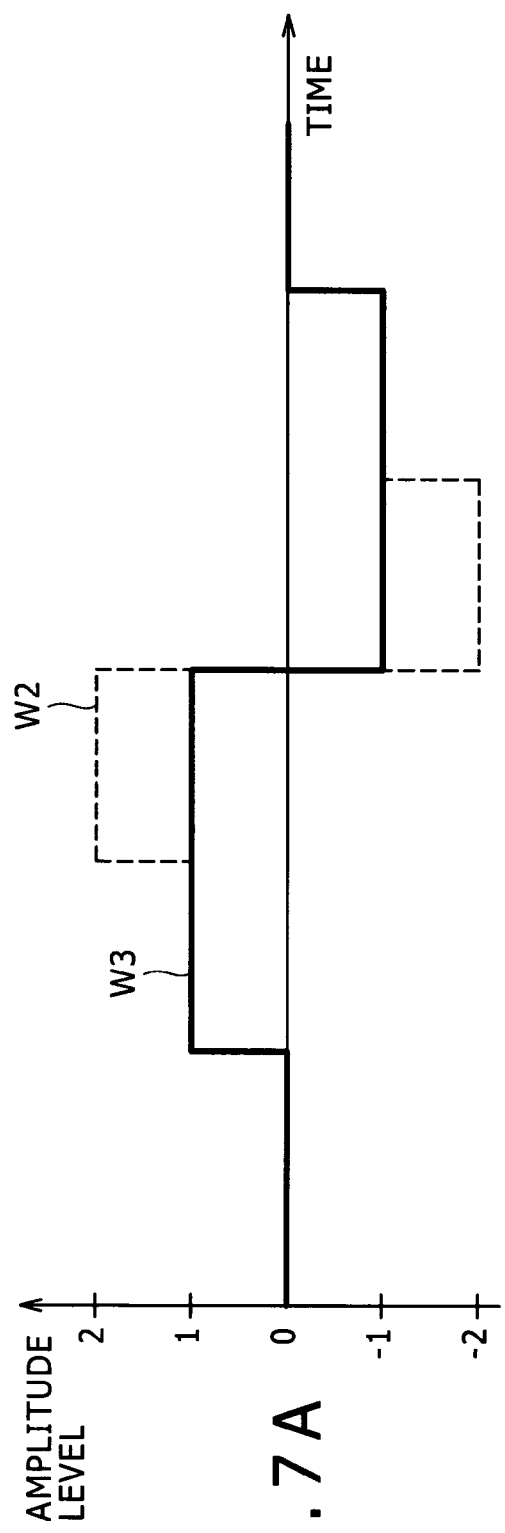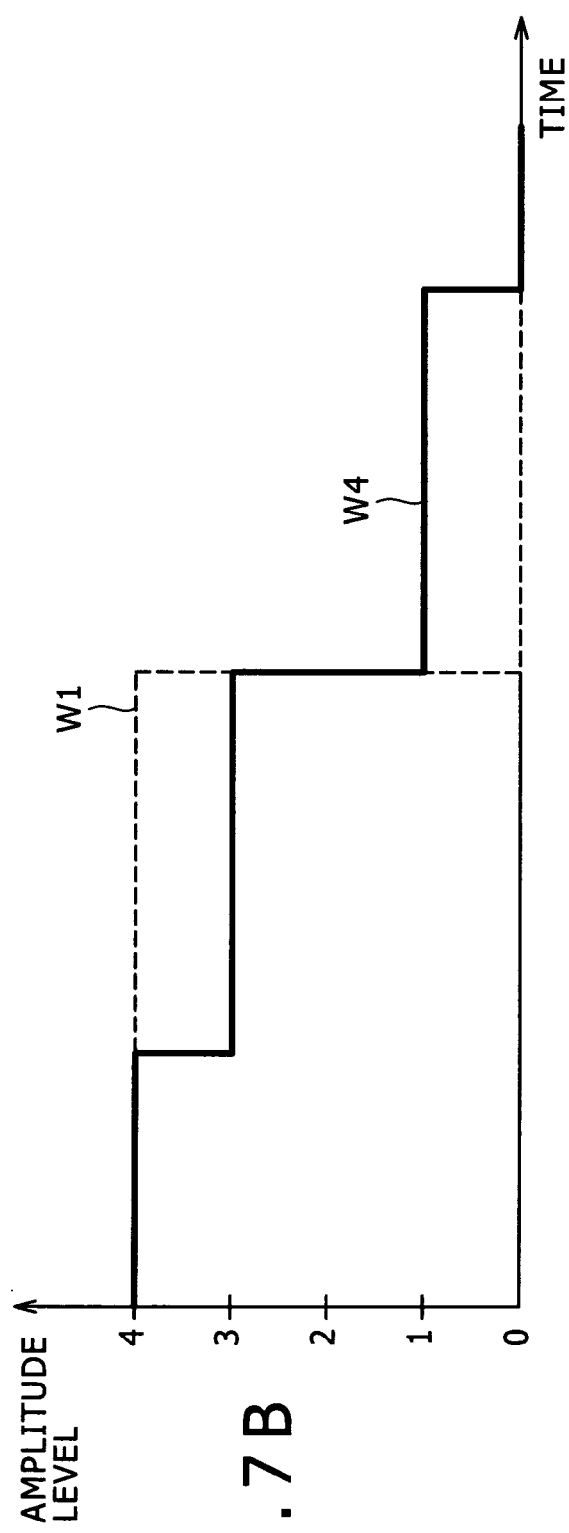

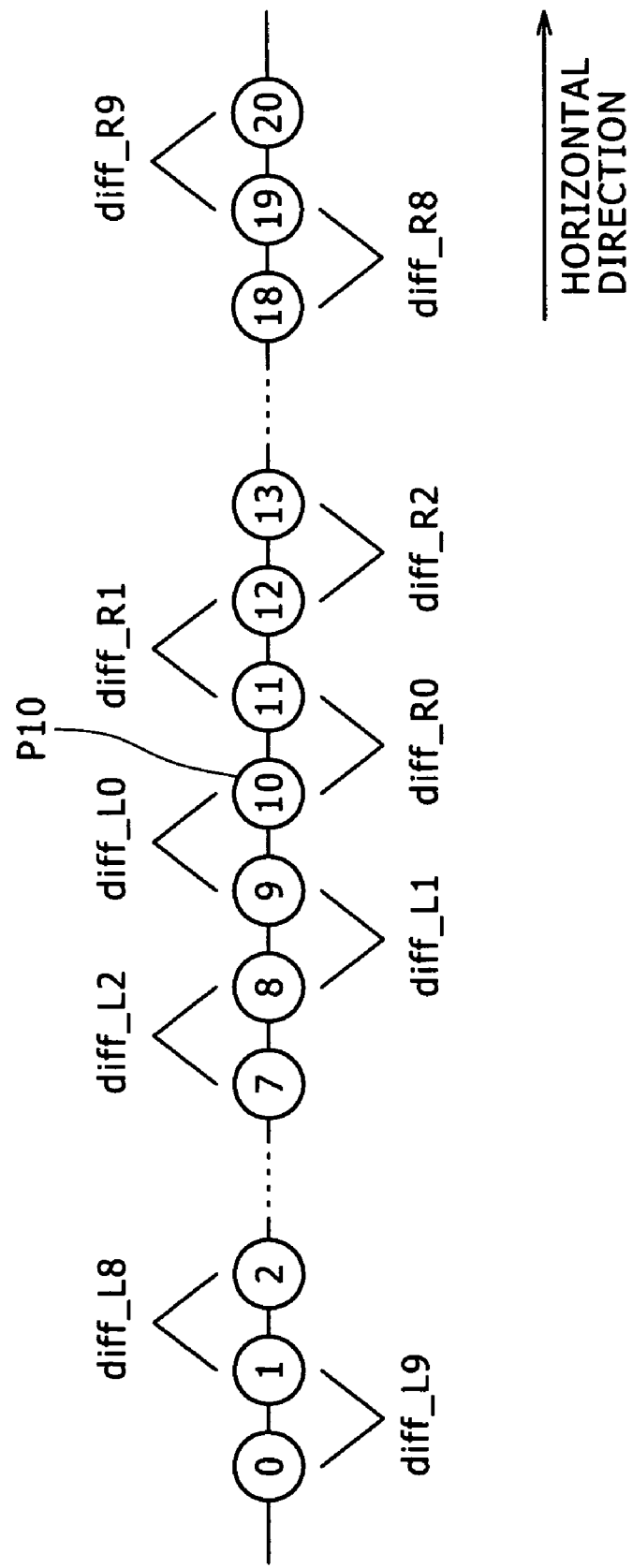

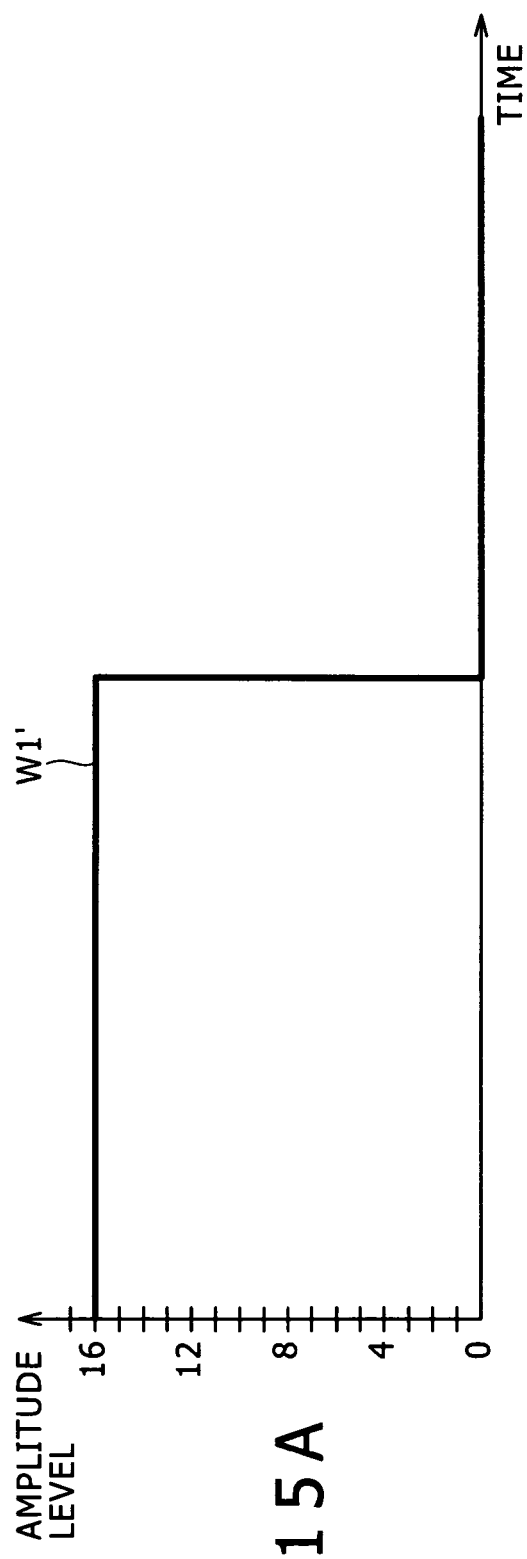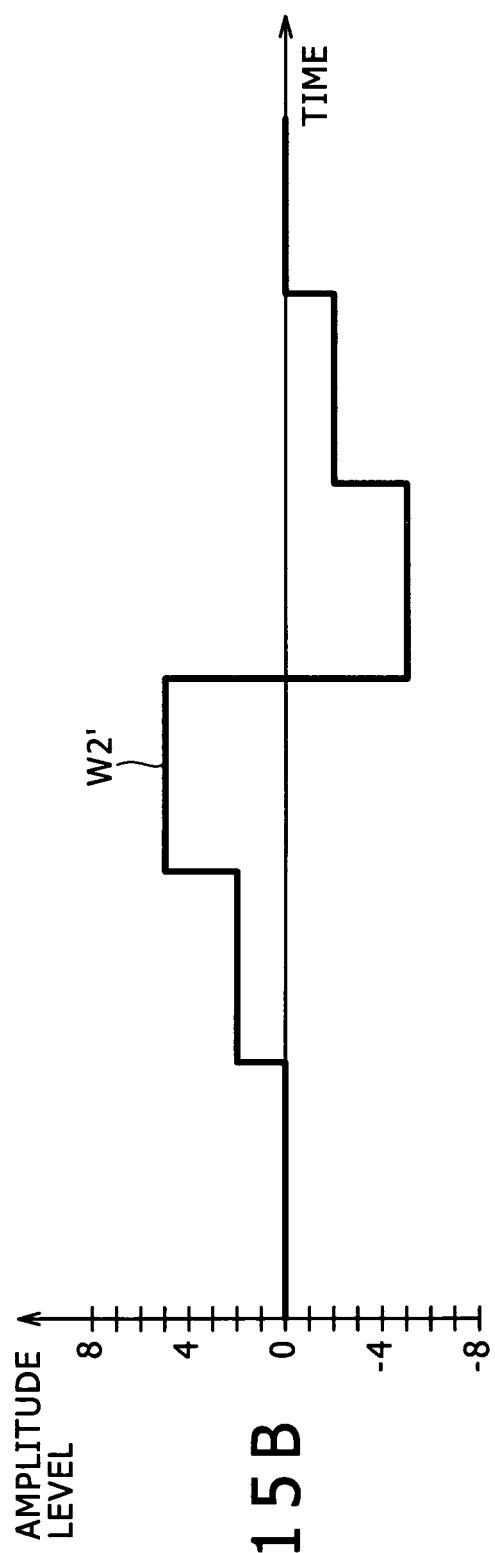

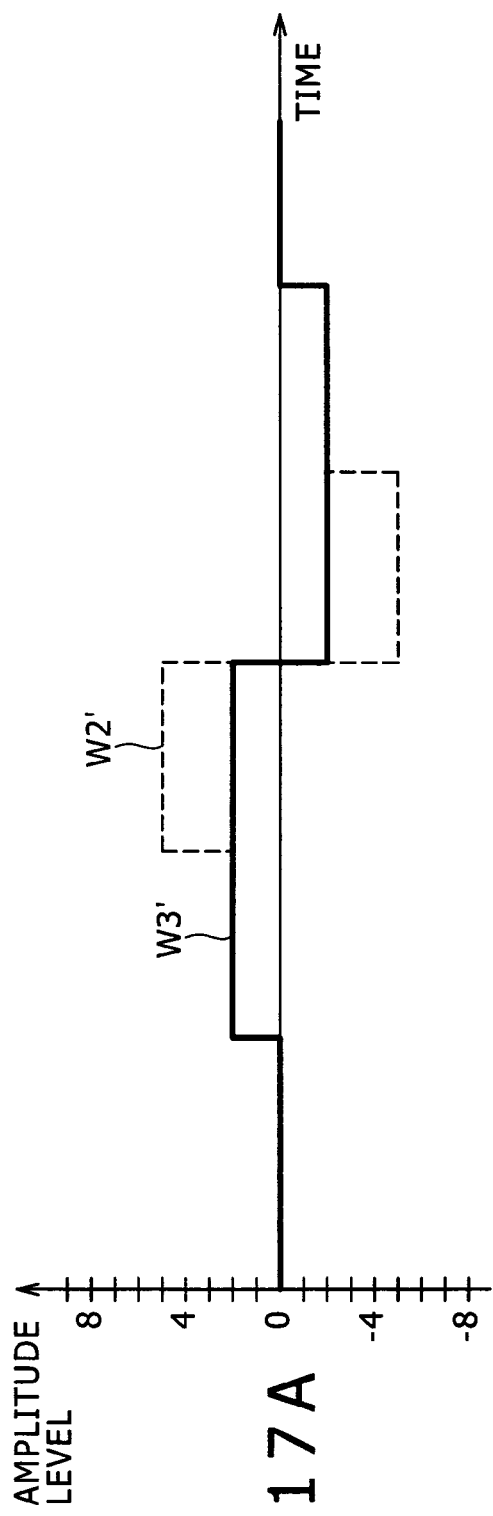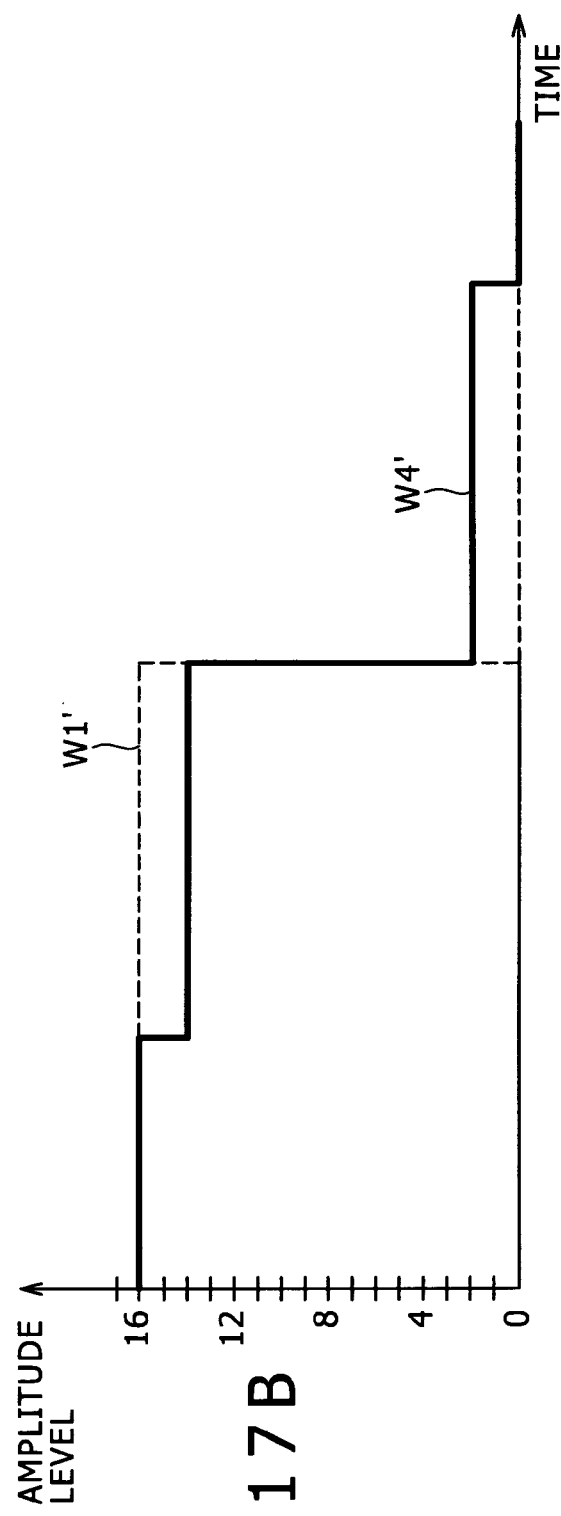

FIG.20

|  | M0 | M1 |
|---|---|---|
| K0 | -32/256 | 0 |
| K1 | 0 | 0 |
| K2 | 0 | 0 |
| K3 | 0 | 0 |
| K4 | -64/256 | -32/256 |
| K5 | 0 | 0 |
| K6 | 0 | -64/256 |
| K7 | 0 | 0 |
| K8 | 192/256 | 192/256 |
| K9 | 0 | 0 |
| K10 | 0 | -64/256 |
| K11 | 0 | 0 |
| K12 | -64/256 | -32/256 |
| K13 | 0 | 0 |
| K14 | 0 | 0 |
| K15 | 0 | 0 |
| K16 | -32/256 | 0 |

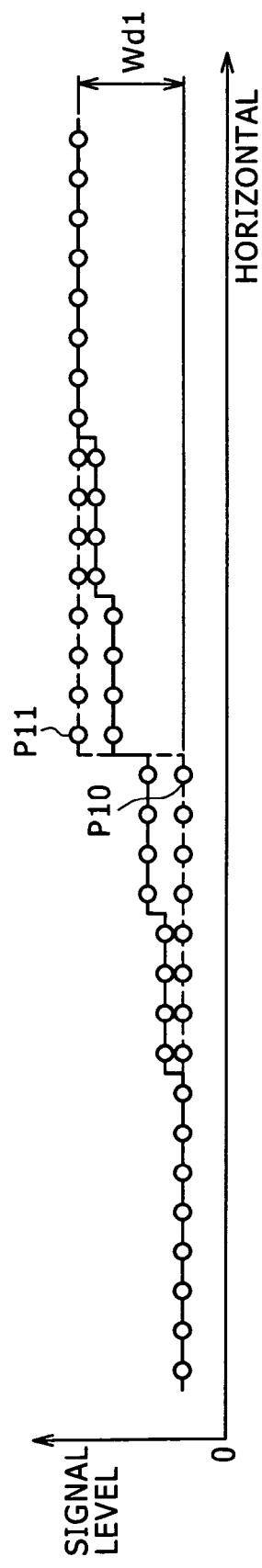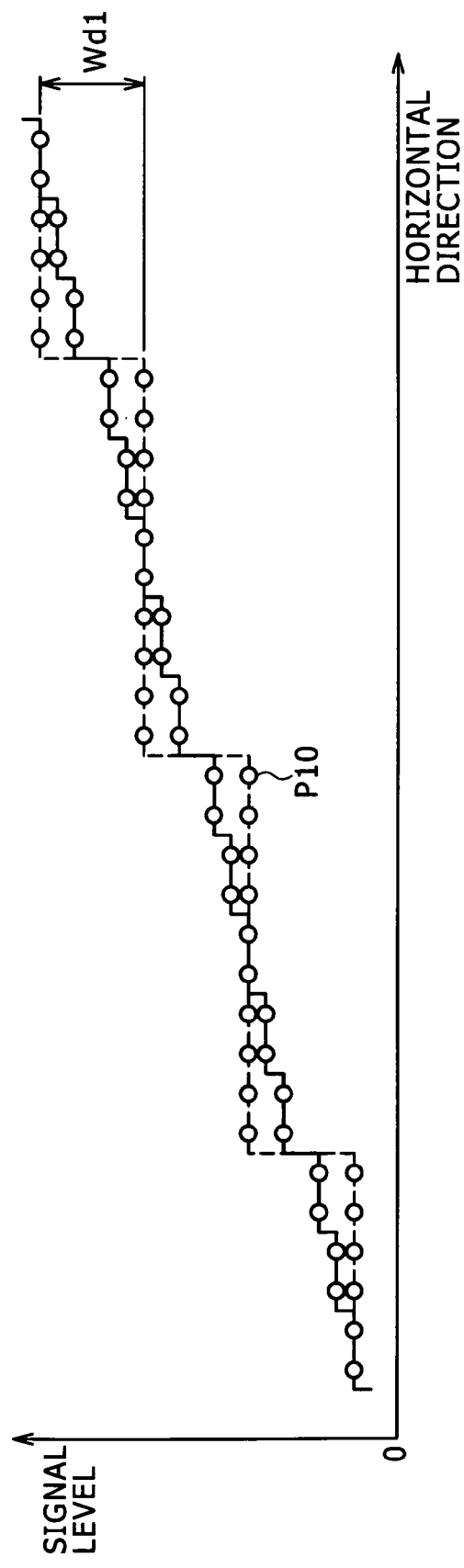
FIG.22A
FIG.22B

FIG.26

| | M1 | M2 |
|---|---|---|
| K0 | 0 | 0 |
| K1 | 0 | 0 |
| K2 | 0 | 0 |
| K3 | 0 | 0 |
| K4 | -32/256 | 0 |
| K5 | 0 | 0 |
| K6 | -64/256 | 0 |
| K7 | 0 | -64/256 |
| K8 | 192/256 | 128/256 |
| K9 | 0 | -64/256 |
| K10 | -64/256 | 0 |
| K11 | 0 | 0 |
| K12 | -32/256 | 0 |
| K13 | 0 | 0 |
| K14 | 0 | 0 |
| K15 | 0 | 0 |
| K16 | 0 | 0 |

IMAGE-SIGNAL PROCESSING APPARATUS, IMAGE-SIGNAL PROCESSING METHOD AND IMAGE-SIGNAL PROCESSING PROGRAM

CROSS-REFERENCE TO RELATED APPLICATIONS

The present application claims priority from Japanese Patent Application No. JP 2007-154191, filed in the Japanese Patent Office on Jun. 11, 2007, the entire content of which is incorporated herein by reference.

BACKGROUND OF THE INVENTION

1. Field of the Invention

The present invention relates to an image-signal processing apparatus well functioning as a recording/reproduction apparatus for recording typically a video signal onto a recording medium and reproducing the video signal from the recording medium, an image-signal processing method adopted by the image-signal processing apparatus and an image-signal processing computer program implementing the image-signal processing method.

2. Description of the Related Art

In many of the existing digital-signal processes carried out on a base band video signal, the digital signal is a quantized signal having a quantization bit count of eight. For this reason, a large number of video contents are produced and recorded as data of eight bits and, in addition, most of display units each used for displaying a video content are eight-bit oriented display units.

By the way, when a digital signal obtained as a result of an eight-bit quantization process is displayed on a display unit as a video, the display process raises a problem that pseudo contours appear inevitably at locations at which the luminance value should change gradually. By a pseudo contour, a stripe having the shape of a contour is meant. This is because, in some cases, the width of an eight-bit quantization process is coarse so that gradual luminance changes are unavoidably observed as stair-step changes.

In order to avoid such image deteriorations, there has been provided a technique whereby an image signal having precision not exceeding the quantization precision is reproduced by increasing the bit count of a digital signal obtained as a result an eight-bit quantization process to a larger number such as ten or 12.

Patent Document 1 (Japanese Patent Laid-open No. Hei 9-219833) discloses a technique for generating a digital signal having a bit count greater than the input digital signal.

SUMMARY OF THE INVENTION

By the way, as a technique for generating a digital signal having a bit count greater than the input digital signal, there has been provided a technique making use of a low pass filter which is also referred to hereafter as an LPF. If a digital image signal obtained as a result of a quantization process is supplied to a low pass filter, however, high-frequency signal components are removed by the LPF so that the technique making use of the low pass filter raises a problem that the image appearing on a display unit as the image represented by the digital image signal or the like becomes blurred.

Addressing the problem described above, inventor of the present invention has innovated an image-signal processing apparatus for reducing the number of pseudo-contour phenomena caused by an insufficient bit count of the digital image signal without blurring the image.

In order to solve the problem described above, the present invention provides an image-signal processing apparatus including: a band pass filter; an amplitude limiting section; a gain adjustment section; and a subtractor. The band pass filter is configured to increase the bit count of an input digital image signal in a bit decompression process and pass on an image signal of a high frequency band. The amplitude limiting section is configured to limit the amplitude of the image signal passed on by the band pass filter to a level determined in advance. The gain adjustment section is configured to adjust the gain of an image signal output by the amplitude limiting section as a signal having the amplitude limited by the amplitude limiting section. The subtractor is configured to subtract an image signal output by the gain adjustment section from the input digital image signal.

With the configuration described above, an image signal output by the adder has a frequency characteristic equivalent to that of a case in which a low pass filter process is applied only to an infinitesimal-amplitude image signal component included in the input video signal.

In accordance with the embodiment of the present invention, the image-signal processing apparatus carries out processing as if a low pass filter process were applied only to an infinitesimal-amplitude image signal component included in the input video signal. Thus, the image-signal processing apparatus is capable of reducing the number of pseudo-contour phenomena caused by an insufficient bit count of the digital image signal without blurring the image.

BRIEF DESCRIPTION OF THE DRAWINGS

FIG. 1 is a block diagram showing a typical configuration of a filter according to a first embodiment of the present invention;

FIG. 2 is a block diagram showing a typical internal configuration of a recording/reproduction apparatus according to the first embodiment of the present invention;

FIG. 3 is a block diagram showing a typical configuration of a video graphic processor according to the first embodiment of the present invention;

FIG. 4 is a plurality of explanatory diagrams each to be referred to in description of a BPF, Band Pass Filter, according to the first embodiment of the present invention, FIG. 4A is an explanatory diagram showing a typical configuration of the BPF, and FIG. 4B is a diagram showing table of filter coefficients used in the BPF;

FIG. 5 is a plurality of explanatory diagrams to be referred to in description of amplitude waveforms of signals input to and output by the BPF according to the first embodiment of the present invention, FIG. 5A is an explanatory diagram showing the amplitude of an image signal supplied to the BPF, and FIG. 5B is an explanatory diagram showing the amplitude of an image signal generated by the BPF;

FIG. 7 is a plurality of explanatory diagrams each to be referred to in description of the amplitude waveform of an image signal generated in the first embodiment of the present invention, FIG. 7A is an explanatory diagram showing the waveform of the amplitude of an image signal output by the limiter section, and FIG. 7B is an explanatory diagram showing the waveform of the amplitude of an image signal output by a subtractor;

FIG. 11 is a diagram showing relations set in accordance with the second embodiment of the present invention as relations between the positions of an observed pixel and ten vicinity pixels forming a horizontal vicinity array on the left-hand side of the observed pixel and ten vicinity pixels forming a horizontal vicinity array on the right-hand side of the observed pixel;

FIG. 15 is a plurality of explanatory diagrams to be referred to in description of amplitude waveforms of signals input to and output by a BPF according to the second embodiment of the present invention, FIG. 15A is an explanatory diagram showing the amplitude of an image signal supplied to the BPF, and FIG. 15B is an explanatory diagram showing the amplitude of an image signal generated by the BPF;

FIG. 17 is a plurality of explanatory diagrams each to be referred to in description of the amplitude waveform of an image signal in the second embodiment of the present invention, FIG. 17A is an explanatory diagram showing the waveform of the amplitude of an image signal output by the limiter section, and FIG. 17B is an explanatory diagram showing the waveform of the amplitude of an image signal output by a subtractor;

FIG. 20 is a diagram showing typical filter coefficients used by the BPF according to the second embodiment of the present invention;

FIGS. 22A and 22B are explanatory diagrams each to be referred to in description of a difference in signal level between an observed pixel and a pixel adjacent to the observed pixel;

FIG. 23 is a plurality of explanatory diagrams each to be referred to in description of the BPF according to the second embodiment of the present invention.

FIG. 26 is a table showing filter coefficients used in a BPF according to the third embodiment of the present invention;

DETAILED DESCRIPTION OF THE PREFERRED EMBODIMENTS

Figure 6:
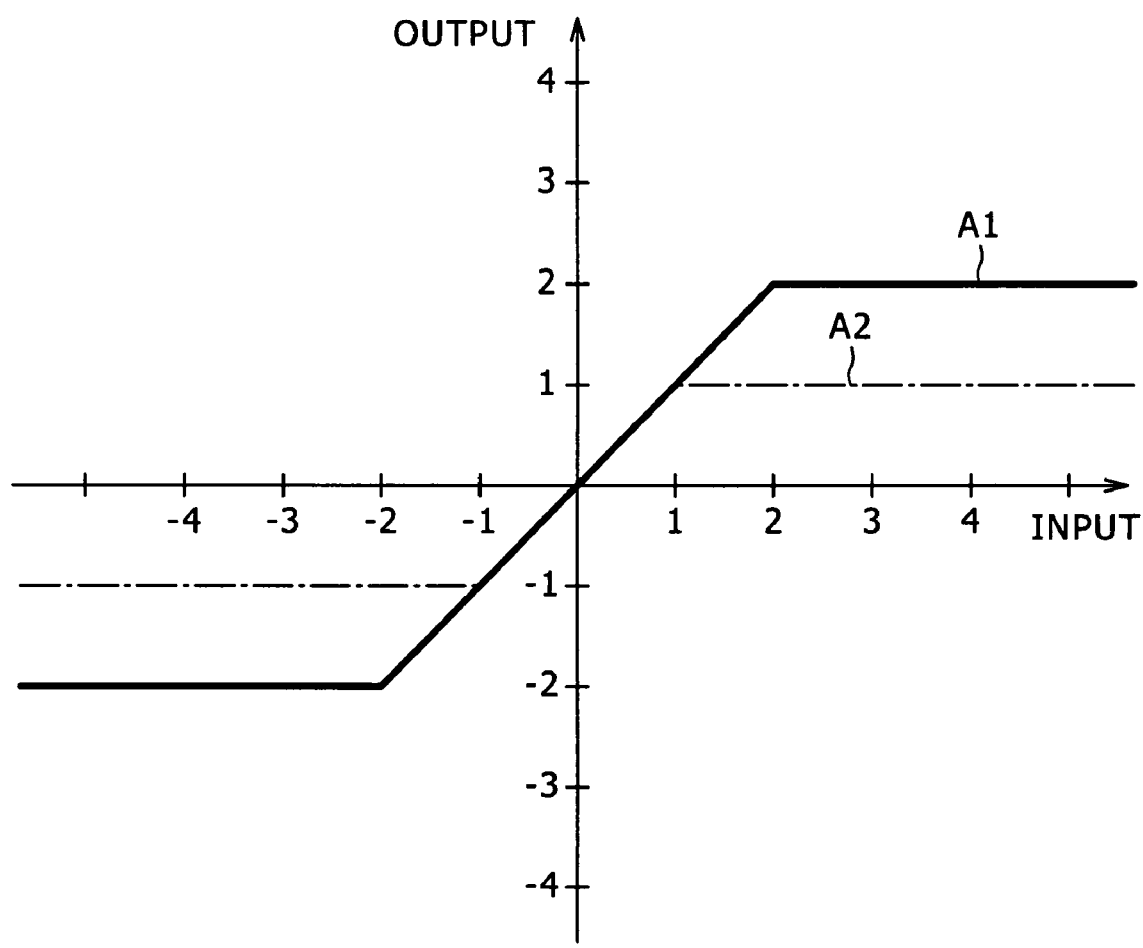
FIG. 6 is a diagram showing a curve A1 representing the input/output characteristic of the BPF according to the first embodiment of the present invention and a curve A2 representing the input/output characteristic of a limiter section according to the first embodiment.

Embodiments of the present invention are explained by referring to diagrams as follows. Each of the embodiments described below implements an image-signal processing apparatus functioning as a recording/reproduction apparatus for recording a video signal received from an input terminal, a tuner or the like onto a recording medium and/or reproducing the image signal from the medium.

FIG. 2 is a block diagram showing a typical internal configuration of a recording/reproduction apparatus 100. The description begins with an explanation of the configuration of a recording system in the recording/reproduction apparatus 100. The recording/reproduction apparatus 100 shown in FIG. 2 employs a line input terminal 1, an analog tuner 2, a selector 3, a video decoder 4, a video graphic processor 30, a selector 5, an MPEG (Moving Picture Experts Group) encoder 6, a stream processor 50, a disk drive 10, a hard-disk drive 11, an HDMI (High Definition Multimedia Interface) terminal 12, an HDV (High-Definition Video) processor 13 and a digital tuner 14.

On the basis of typically an input select operation carried out by the user, the selector 3 selects either a video signal received from the line input terminal 1 or a video signal received from the analog tuner 2 and supplies the selected video signal to the video decoder 4 connected to the selector 3 at a stage succeeding the selector 3. The video signal supplied by the selector 3 to the video decoder 4 is typically an analog signal conforming to the NTSC (National Television Standards Committee) system or another system. The video decoder 4 is a section for converting the analog video signal into a digital video signal having a length of eight bits. Digital video signals generated by the video decoder 4 are a luminance signal and color difference signals. The video decoder 4 is also a section for carrying out a decoding process on the luminance and color difference signals in order to generate base band signals and outputting the base band signals to the selector 5 and the video graphic processor 30. Sampling rates adopted in the video decoder 4 are typically 4:4:4.

The video graphic processor 30 is a section for carrying out various kinds of video signal processing on the video signal received from the video decoder 4. The video signal processing carried out by the video graphic processor 30 includes a scaling process, an image-quality adjustment process and a noise reduction process. The video graphic processor 30 then synthesizes a video signal obtained as a result of the video signal processing with signals such as a graphic signal and outputs an image signal obtained as a result of the synthesis process to the selector 5. In addition, the video graphic processor 30 also carries out a pseudo-contour phenomenon reduction process which will be described later in detail.

On the basis of typically an input select operation carried out by the user, the selector 5 selects either the video signal received from the video decoder 4 or the video signal received from the video graphic processor 30 and outputs the selected video signal to the MPEG encoder 6 connected to the selector 5 at a stage succeeding the selector 5. The MPEG encoder 6 is a section for encoding the video signal received from the selector 5 by adoption of an encoding method such as MPEG1, MPEG2, MPEG4 or MPEG4-AVC/H.264 and outputting an encoded stream obtained as a result of the encoding process to the stream processor 50. The stream processor 50 is a section for carrying out processing on the encoded stream and outputting a processed stream obtained as a result of the processing to the disk drive 10 or the hard-disk drive 11. The processing carried out by the stream processor 50 includes a process to convert the encoded stream into a desired stream proper for the recording medium, which is driven by the disk drive 10 or the hard-disk drive 11, and a multiplexing process.

The stream processor 50 is also connected to the HDV processor 13 and the digital tuner 14 whereas the HDV processor 13 is connected to an IEEE1394 terminal 12. The stream processor 50 is a section for carrying out processing on an input stream supplied by a source by way of the IEEE1394 terminal 12 and the HDV processor 13 or an input stream received from the digital tuner 14 and outputting a stream obtained as a result of the processing to the disk drive 10 and the hard-disk drive 11. The processing carried out by the stream processor 50 includes a process to extract a video stream selected on the basis of typically an input select operation carried out by the user from one of the input streams and a path process.

The disk drive 10 is a section for storing a stream onto a recording medium driven by the disk drive 10 and reading out a stream from the recording medium. Examples of the recording medium driven by the disk drive 10 is a BD (Blu-Ray which is a registered trademark) disk and a DVD (Digital Versatile Disk). By the same token, the hard-disk drive 11 is a section for storing a stream onto a hard disk driven by the hard-disk drive 11 and reading out a stream from the hard disk.

In an operation carried out by the recording/reproduction apparatus 100 having the configuration described above to record a video signal received from the line input terminal 1 or a video signal received from the analog tuner 2 onto a recording medium driven by the disk drive 10 or the hard-disk drive 11, the selector 3 selects one of the video signals and outputs the selected video signal to the video decoder 4. The video decoder 4 carries out a scaling process and video signal processing on the video signal received from the selector 3, outputting a video signal obtained as a result of the scaling process and the video signal processing to the video graphic processor 30 and the selector 5. The selector 5 selects either the video signal received from the video decoder 4 or a video signal received from the video graphic processor 30 and outputs the selected video signal to the MPEG encoder 6.

The MPEG encoder 6 encodes the video signal received from the selector 5 by adoption of an MPEG method determined in advance in order to generate an encoded stream and outputs the encoded stream to the stream processor 50. The stream supplied to the stream processor 50 is subjected to processing such as a multiplexing process and the result of the processing is output to the disk drive 10 or the hard-disk drive 11 to be recorded onto a recording medium driven by the disk drive 10 or the hard-disk drive 11 respectively.

A stream arriving at the IEEE1394 terminal 12 is supplied to the stream processor 50 by way of the HDV processor 13 and a stream arriving at the digital tuner 14 is also supplied to the stream processor 50. On the basis of typically an input select operation carried out by the user, the stream processor 50 selects either the stream supplied by the IEEE1394 terminal 12 by way of the HDV processor 13 or the stream received from the digital tuner 14 and discards the unselected one. The stream processor 50 carries out processing such as a path process on the selected stream and outputs the result of the processing to the disk drive 10 or the hard-disk drive 11 to be recorded onto a recording medium driven by the disk drive 10 or the hard-disk drive 11 respectively. In addition, the stream processor 50 also outputs the result of the processing to MPEG decoders 15a and 15b.

The MPEG decoders 15a and 15b decode the streams supplied thereto and supply a stream obtained as a result of the decoding process to the MPEG encoder 6 by way of the video graphic processor 30 and the selector 5. The MPEG encoder 6 encodes the stream received from the selector 5 by adoption of a desired MPEG method and outputs a stream obtained as a result of the encoding process back to the stream processor 50. The stream supplied by the MPEG encoder 6 to the stream processor 50 is output to the disk drive 10 or the hard-disk drive 11 to be recorded onto a recording medium driven by the disk drive 10 or the hard-disk drive 11 respectively.

Next, the configurations of a reproduction system and a display system are explained also by referring to FIG. 2. In addition to the configuration elements described above, the recording/reproduction apparatus 100 shown in FIG. 2 also employs the MPEG decoders 15a and 15b, an HDMI transmitter 16, an HDMI connector 17, an analog-to-digital converter 18, a component terminal 19 and a composite video terminal 20. In the following description, the HDMI transmitter 16 and the analog-to-digital converter 18 are referred to as an HDMI Tx 16 and a DAC 18 respectively.

Each of the MPEG decoders 15a and 15b is a section for carrying out a decoding process on the streams supplied thereto by the stream processor 50 in order to generate base band signals and outputting the base band signals to the video graphic processor 30. The HDMI transmitter 16 is a section for converting a base band signal received from the video graphic processor 30 into a TMDS (Transition Minimized Differential Signaling) signal and outputting the TMDS signal to the HDMI connector 17.

The DAC 18 is a section for converting a digital base band signal received from the video graphic processor 30 into an analog base band signal. In addition, the DAC 18 also converts an encoded digital video signal received from the video graphic processor 30 as an image signal obtained as a result of a conversion process conforming to the NTSC system into an analog encoded signal. The DAC 18 is connected to the component terminal 19 and the composite video terminal 20 which each serve as an output destination of an image signal generated by the DAC 18. It is to be noted that the recording/reproduction apparatus 100 can also be configured to employ an S terminal in place of the composite video terminal 20.

In an operation carried out by the recording/reproduction apparatus 100 having the configuration described above to display an input video signal supplied thereto from the line input terminal 1 or the analog tuner 2 on an external display unit connected to the HDMI connector 17, the component terminal 19 or the composite video terminal 20, the video signal is supplied to the video graphic processor 30 through the same route as the recording system described earlier.

In an operation to display a base band signal supplied to the video graphic processor 30 on an external display unit connected to the HDMI connector 17, the base band signal is supplied to the HDMI transmitter 16 which converts the image signal into a TMDS signal. The TMDS signal is then supplied to the HDMI connector 17 along with a control signal to be displayed on the display unit connected to the HDMI connector 17.

In an operation to display a base band signal supplied to the video graphic processor 30 on an external display unit as a component signal or a composite video signal, the base band signal is fed to the DAC 18 which converts the base band signal into an analog component signal or an analog composite video signal respectively. The analog component signal generated by the DAC 18 is displayed on an external display unit connected to the component terminal 19 whereas the analog composite video signal generated by the DAC 18 is displayed on an external display unit connected to the composite video terminal 20. It is to be noted that, in place of the composite video terminal 20, an S terminal for handling Y/C separate video signals can be used. The flows of signals and data in the reproduction system are the same as those in the display system described above.

In addition, the recording/reproduction apparatus 100 shown in FIG. 2 employs a CPU (Central Processing Unit) 60 functioning as a control section for executing control of the configuration elements described above and an operation section 70 including buttons and knobs. The CPU 60 is configured to receive an operation input signal from the operation section 70 and, on the basis of typically setting values given as the operation input signal, the CPU 60 executes the control of the configuration elements employed in the recording/reproduction apparatus 100 as described above.

Next, a typical internal configuration of the video graphic processor 30 is explained by referring to FIG. 3. As shown in the figure, the video graphic processor 30 employs a filter 31, a noise reduction section 32, a memory 33, a graphics engine 34, a JPEG (Joint Photographic Experts Group) engine 35 and a display processor 40.

The filter 31 is a section for carrying out a bit decompression process on a digital video signal received from the video decoder 4 or the MPEG decoder 15a or 15b. In addition, the filter 31 also carries out a process to reduce the number of pseudo contours. Details of the filter 31 will be described later. The noise reduction section 32 is a section for carrying out a process to eliminate a variety of noises such as random, block and mosquito noises included in an image signal received from the filter 31 and storing a video signal obtained as a result of the process on a video plane of the memory 33.

The graphics engine 34 is a section for carrying out a process to display graphics at a high speed and storing graphic data obtained as a result of the process on a graphic plane of the memory 33. The JPEG engine 35 is a section for carrying out a decoding process on an input JPEG file supplied thereto and storing JPEG data obtained as a result of the decoding process on a video plane of the memory 33. The display processor 40 is connected to the rear stage of the memory 33.

As shown in the figure, the display processor 40 employs a scaler 41, a blender 42 and a video encoder 43. The scaler 41 is a section for reading out data stored on the planes of the memory 33 and carrying out a scaling process on the data in order to change the size of the data to a size determined in advance. The scaler 41 outputs image data obtained as a result of the scaling process to the blender 42. The blender 42 is a section for blending various kinds of image data read out from the planes of the memory 33 through the scaler 41 and outputting image data obtained as a result of the blending process to the video encoder 43.

In order to convert the image data received from the blender 42 into a video signal having output specifications determined in advance, the video encoder 43 generates timing and synchronization signals and adds the image signals to the image data. Then, the video encoder 43 outputs the video signal including the timing and synchronization signals to the HDMI transmitter 16 and the DAC 18 which are both employed in the recording/reproduction apparatus 100 as shown in FIG. 2.

First Embodiment

Next, details of the filter 31 are explained by referring to the block diagram of FIG. 1. The configuration of the filter 31 according to a first embodiment of the present invention includes a band pass filter 301 (referred to hereafter as a BPF 301), a limiter section 302 functioning as an amplitude limiting section, a gain adjustment section 303 and an adder (or a subtractor) 304.

The BPF 301 changes the bit count of an input video signal (a luminance signal) from eight to ten in a decompression process and extracts signal components in the high-frequency band from the input video signal, passing on the image signal components to the limiter section 302. A typical configuration of the BPF 301 is shown in FIG. 4. To be more specific, FIG. 4A is an explanatory diagram showing a typical configuration of the BPF 301 whereas FIG. 4B is a table showing filter coefficients of the BPF 301. In the BPF 301 shown in FIG. 4A, the most recent pixel signal is placed at the leftmost position. Each time a pixel signal completes one process, the pixel signal is shifted to the adjacent position on the right-hand side of the present position. Each of pixel signals from pixels P2 to P18 is multiplied by a filter coefficient K prepared in advance as shown in the table of FIG. 4B and assigned to a pixel signal. The product obtained as a result of multiplying a pixel signal from the pixel P by the filter coefficient K is cumulatively added to a sum to be output by the BPF 301. In the embodiment, filter coefficients K0 to K16 assigned to pixel signals from the pixels P2 to P18 respectively are shown in FIG. 4B.

As shown in FIG. 4B, with the pixel signal from the observed pixel P10 taken as an observed pixel signal, the filter coefficient K8 assigned to a pixel signal from the observed pixel P10 is set at 192/256. Each of the filter coefficients K6 and K10 assigned respectively to pixel signals from the pixels P8 and P12 in the vicinity of the observed pixel P10 is set at −64/256. Each of the filter coefficients K4 and K12 assigned respectively to pixel signals from the pixels P6 and P14 in the vicinity of the pixels P8 and P12 respectively is set at −32/

256. It is to be noted that the tap count of the BPF 301, the magnitude of each of the filter coefficients K0 to K16 and a pixel signal to which each of the filter coefficients K0 to K16 is assigned can be changed with a high degree of freedom.

FIG. 5 is a plurality of explanatory diagrams showing amplitude waveforms of signals input to and output by the BPF 301. To be more specific, FIG. 5A is an explanatory diagram showing the amplitude of the input video signal supplied to the BPF 301 whereas FIG. 5B is an explanatory diagram showing the amplitude of an image signal generated by the BPF 301. The waveform W1 shown in FIG. 5A is a one step amplitude waveform of the input video signal completing an eight-bit quantization process. On the other hand, the waveform W2 shown in FIG. 5B is a four steps amplitude waveform of an image signal completing a 12-bit quantization process. Thus, FIGS. 5A and 5B indicate that that one step of eight-bit quantization of the image signal corresponds to four steps of ten-bit quantization.

FIG. 5B is an explanatory diagram showing the amplitude waveform W2 of a ten-bit image signal generated by the BPF 301 as a result of the decompression process carried out by the BPF 301 on the image signal having the waveform W1 shown in FIG. 5A. The ten-bit image signal shown in FIG. 5B is a result of a decompression process carried out in order to change the number of bits from eight to ten. FIG. 5B is an explanatory diagram showing a state in which high-frequency signal components of the waveform W1 shown in FIG. 5A are extracted from the waveform W1 and output as a waveform W2 having amplitude levels of ±2. That is to say, the BPF 301 increases the bit count of the input video signal and passes on only signal components each having a small amplitude not exceeding the level of 2. A solid line A1 shown in FIG. 6 represents the input/output characteristic of the BPF 301. As shown in FIG. 6, for any input video signal having an amplitude level in the range of ±2, the BPF 301 outputs an image signal having an amplitude proportional to the amplitude of the input video signal. As for any input video signal having an amplitude level beyond the range of ±2, the BPF 301 outputs an image signal having a fixed amplitude of ±2 respectively.

As described above, the solid line A1 shown in FIG. 6 represents an input/output characteristic exhibited by the BPF 301 as a characteristic to output an image signal having a fixed amplitude of ±2 for any input video signal having an amplitude level beyond the range of ±2. It is to be noted, however, that the image-signal processing apparatus may also employ a filter outputting an image signal having an amplitude of 0 for any input video signal having an amplitude level beyond a range determined in advance. As another alternative, the image-signal processing apparatus may also employ a filter outputting an image signal having an amplitude inversely proportional to the amplitude of the input video signal for any input video signal having an amplitude level beyond a range determined in advance. In this case, the amplitude of the output signal becomes 0 and stays at 0 when the amplitude of the input video signal reaches and exceeds another level determined in advance.

Next, processing carried out by the limiter section 302 is explained by referring to the solid line A1 and a dotted line A2 also shown in FIG. 6. To put it concretely, the limiter section 302 carries out a process to limit the amplitude of a ten-bit signal output by the BPF 301 and limit the gradation thereof to a value not exceeding an eight-bit gradation. The dotted line A2 shown in FIG. 6 represents the input/output signal characteristic of the limiter section 302. As shown in FIG. 6, for any signal received from the BPF 301 as an image signal having an amplitude level in the range of +1, the limiter section 302 outputs an image signal having an amplitude linearly proportional to the amplitude of the input video signal as indicated by the solid line A1 also representing the input/output signal characteristic of the BPF 301. As for any signal received from the BPF 301 as an image signal having an amplitude level beyond the range of ±1, the limiter section 302 outputs an image signal having a fixed amplitude of ±1 respectively as shown by the dotted line A2 in FIG. 6.

FIG. 7A is an explanatory diagram showing the waveform W3 of the amplitude of an image signal output by the limiter section 302. A dashed line W2 shown in FIG. 7A represents the waveform of the amplitude of an image signal output by the BPF 301. The waveform W2 is the waveform W2 shown in FIG. 5B as the waveform of the image signal output by the BPF 301. That is to say, the limiter section 302 further carries out an amplitude limitation process on the image signal output by the BPF 301 as an image signal having the amplitude waveform W2 in order to generate an output signal having the waveform W3 having an amplitude of ±1. The adder 304 subtracts the image signal output by the limiter section 302 as an image signal having a characteristic represented by the waveform W3 from the eight-bit input video signal having a characteristic represented by the dashed-line waveform W1 in FIG. 7B to result in an image signal having a characteristic represented by a waveform W4 shown in FIG. 7B. That is to say, W4=W1−W3. It is to be noted that the waveform W1 shown in FIG. 7B is the waveform W1 shown in FIG. 5A as the waveform of the eight-bit input video signal supplied to the BPF 301 and the adder 304 which are employed in the filter 31 as shown in FIG. 1.

Thus, an image signal output by the filter 31 having the configuration described above is equivalent to an image signal output by a low pass filter applied only to infinitesimal-amplitude image signal components included in the input video signal. Pseudo contours are generated at a portion having a gradual gradation change and a portion having a small signal amplitude. Thus, by applying a low pass filter only to high-frequency signal components of an image signal, only the number of pseudo-contour phenomena is reduced without inevitably taking off the edges of the whole image represented by the image signal.

Figure 8:
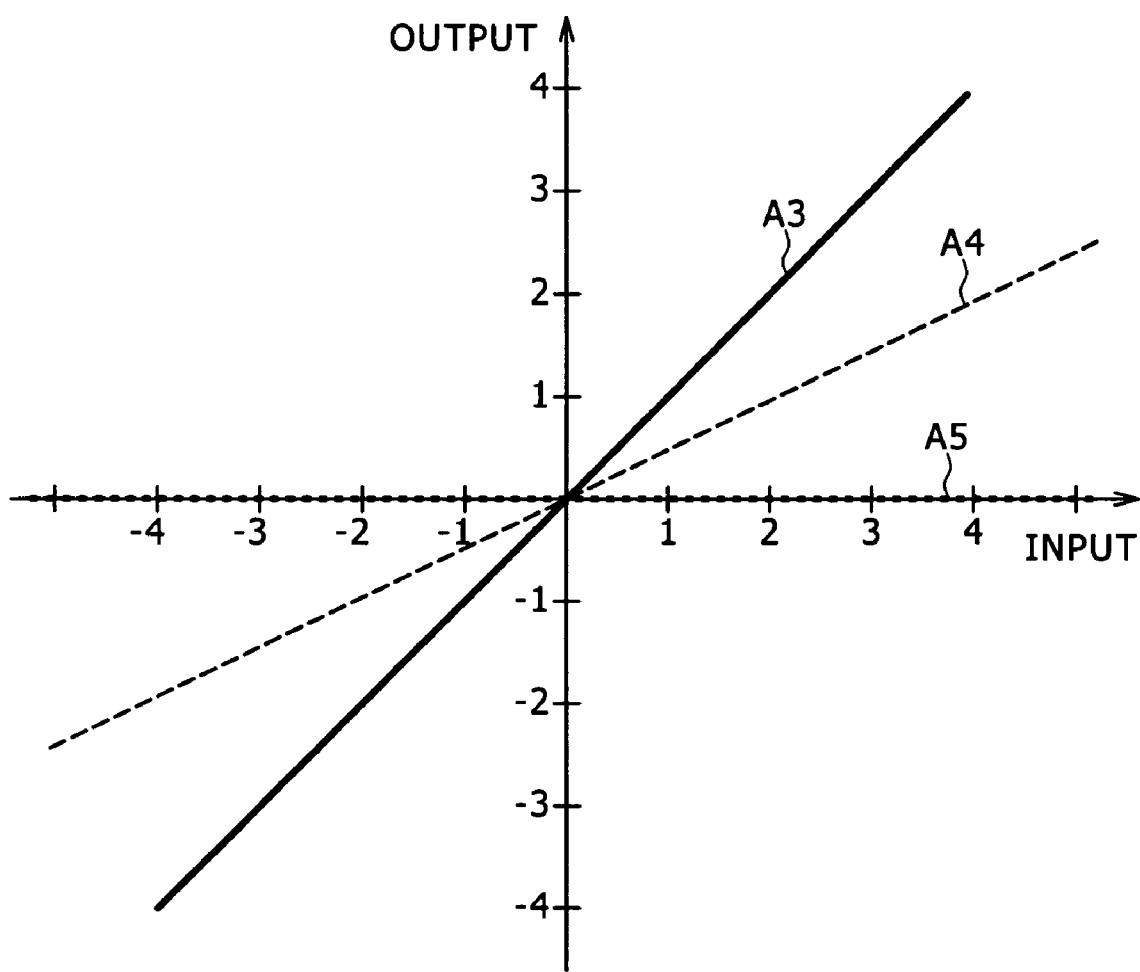
FIG. 8 is a diagram showing curves each representing an input/output characteristic of a gain adjustment section according to the first embodiment of the present invention.

In this embodiment, the gain adjustment section 303 is provided between the limiter section 302 and the adder 304. The gain adjustment section 303 sets the gain of the image signal output by the limiter section 302 as an image signal to be subtracted from the eight-bit input video signal. Thus, the gain adjustment section 303 is capable of adjusting the magnitude of an image signal used as the subtrahend in the subtraction operation carried out by the adder 304. FIG. 8 is a diagram showing typical gain setting processes carried out by the gain adjustment section 303. To be more specific, each of lines A3, A4 and A5 shown in the figure represents the relation between the magnitude of an image signal supplied to the gain adjustment section 303 and the magnitude of an image signal output by the gain adjustment section 303. If the gain adjustment section 303 sets the gain of the image signal output by the limiter section 302 at 1, the gain adjustment section 303 outputs an image signal having a magnitude proportional to the magnitude of the image signal supplied to the gain adjustment section 303 as shown by the solid line A3 in FIG. 8. That is to say, the gain adjustment section 303 sustains the image signal output by the limiter section 302 as it is and supplies the image signal to the adder 304 as a subtrahend to be subtracted by the adder 304 from the eight-bit input video signal.

If the gain adjustment section 303 sets the gain of the image signal output by the limiter section 302 at 0.5, the gain adjustment section 303 outputs an image signal having a magnitude equal to ½ times the magnitude of the image signal supplied to the gain adjustment section 303 as shown by the dashed line A4 in FIG. 8. In this case, the gain adjustment section 303 reduces the magnitude of the image signal output by the limiter section 302 to ½ times the magnitude of the image signal supplied to the gain adjustment section 303. Thus, the subtrahend used in the adder 304 to be subtracted from the eight-bit input video signal also decreases as well.

If the gain adjustment section 303 sets the gain of the image signal output by the limiter section 302 at 0, the gain adjustment section 303 outputs an image signal having a magnitude of 0 without regard to the magnitude of the image signal supplied to the gain adjustment section 303 as shown by the dashed line A5 in FIG. 8. The value of the gain set by the gain adjustment section 303 can be changed in accordance with an operation input entered by the user to typically the operation section 70 employed in the recording/reproduction apparatus 100 shown in FIG. 2. Thus, for example, if it is desired to turn off the effect of the process to reduce the number of pseudo-contour phenomena or to nullify the effect, the value of the gain set by the gain adjustment section 303 can be set at 0.

It is to be noted that the gain set by the gain adjustment section 303 is by no means limited to the three typical values given above. That is to say, the gain set by the gain adjustment section 303 can be set at any arbitrary value. In addition, in the configuration of the embodiment, the gain adjustment section 303 is provided at a stage succeeding the limiter section 302. It is possible, however, to provide a configuration in which the gain adjustment section 303 is provided at a stage preceding the limiter section 302. In addition, it is also possible to provide a configuration in which, instead of providing the gain adjustment section 303 separately from the limiter section 302, the limiter section 302 is provided with the gain adjustment function of the gain adjustment section 303 so that the limiter section 302 is also capable of adjusting the gain of the image signal output thereby. Thus, in this configuration, the gain adjustment section 303 itself is eliminated.

Second Embodiment

Next, a second embodiment of the present invention is explained by referring to FIGS. 9 to 14. The recording/reproduction apparatus 100 according to this embodiment is configured to evaluate the smoothness of the gradation in an area composed of an observed pixel and pixels in the vicinity of the observed pixel in order to produce a result of determination as to whether or not pseudo contours in the area are striking. Then, the value of the gain set by the gain adjustment section 303 is changed in accordance with the result of the determination.

Figure 9:
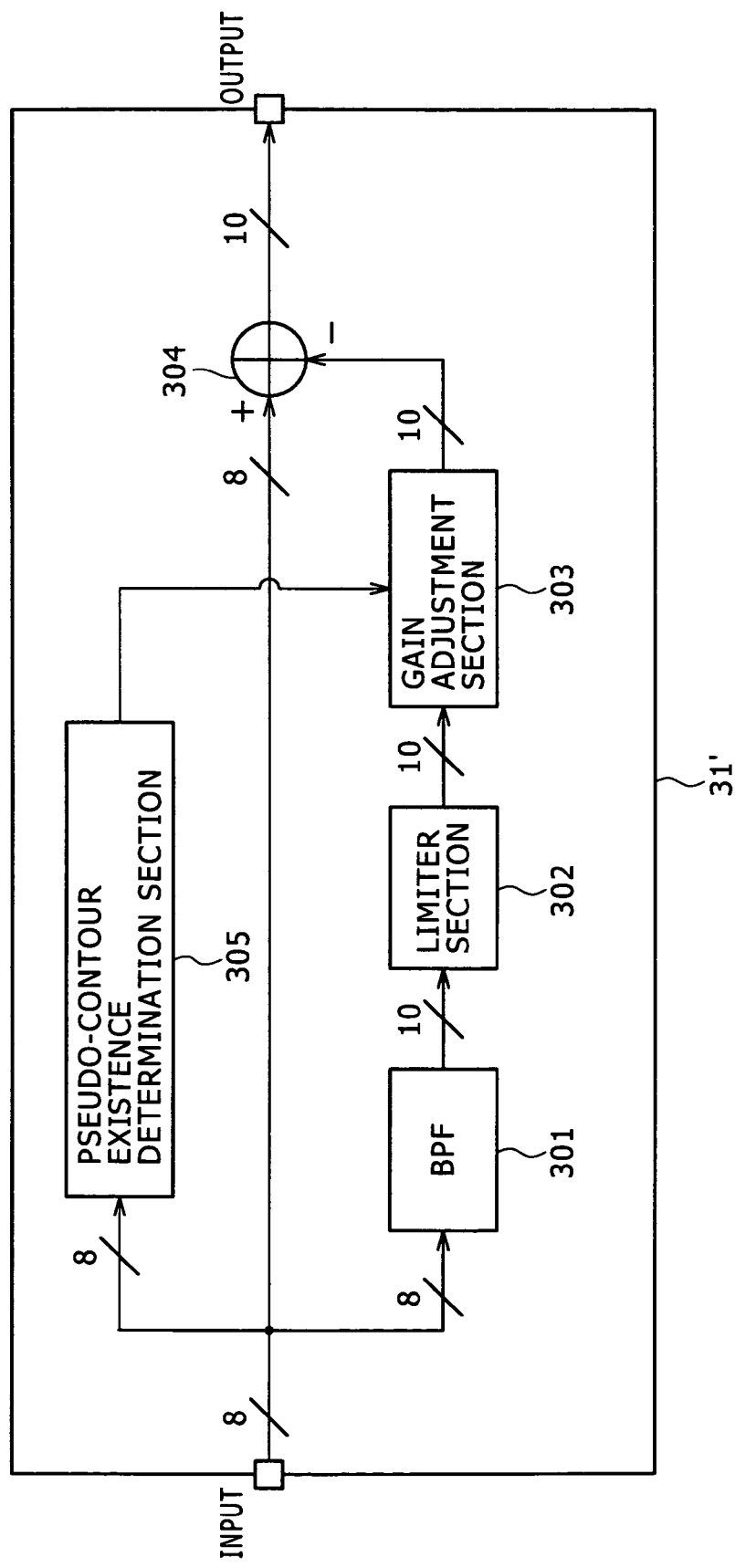
FIG. 9 is a block diagram showing a typical configuration of a filter according to a second embodiment of the present invention.

FIG. 9 is a diagram showing a typical configuration of the filter 31' employed in the recording/reproduction apparatus 100 according to this embodiment. Configuration elements shown in FIG. 9 as elements identical with their counterparts shown in FIG. 1 explained earlier are denoted by the same reference numerals as the counterparts. The basic configuration of the filter 31' employed in the recording/reproduction apparatus 100 according to this embodiment is similar to that shown in FIG. 1. That is to say, the filter 31' employed in the recording/reproduction apparatus 100 according to this embodiment has a BPF 301 for carrying out a bit decompression process on the input video signal and a process to extract high-frequency signal components from the input video signal, passing on the extracted high-frequency signal components to a limiter section 302 also included in the filter 31'. The limiter section 302 is a section for carrying out a process to limit the amplitude of an image signal received from the BPF 301. On top of that, the filter 31' also has a gain adjustment section 303 for adjusting the level of an image signal output by the limiter section 302 and an adder 304 for subtracting an image signal output by the gain adjustment section 303 from the input video signal.

However, the embodiment is characterized in that, in addition to the configuration elements described above, the configuration of the embodiment also includes a pseudo-contour existence determination section 305 for detecting the input video signal in order to produce a result of determination as to whether or not pseudo contours have been generated in the input video signal. The pseudo-contour existence determination section 305 supplies the result of the determination to the gain adjustment section 303 which then changes the value of the gain thereof in accordance with the result received from the pseudo-contour existence determination section 305.

The pseudo-contour existence determination section 305 sets an observed pixel in an input image and evaluates relations between the observed pixel and vicinity pixels forming a horizontal vicinity array in close proximity to the observed pixel in order to produce a result of determination as to whether or not pseudo contours in an area used in the evaluation as an area including the observed pixel and the vicinity pixels are striking. The determination as to whether or not pseudo contours are striking is based on three determination criterions and is executed in accordance with a procedure represented by a flowchart shown in FIG. 10. First of all, at a step S1 of the flowchart, the levels of signals appearing at the vicinity pixels located in close proximity to the observed pixel are examined in order to produce a result of determination as to whether or not the signal levels are monotonously increasing or decreasing. If the determination result produced at the step S1 is "Yes" indicating that the levels of signals appearing at the vicinity pixels close to the observed pixel are monotonously increasing or decreasing, the flow of the pseudo-contour existence determination processing goes on to a step S4 at which the gain of the gain adjustment section 303 is set at a predetermined value such as 1 and the pseudo-contour existence determination processing is ended.

If the determination result produced at the step S1 is "No", on the other hand, the flow of the pseudo-contour existence determination processing goes on to a step S2 at which the activity of an area including the observed pixel and the pixels adjacent to the observed pixel on the left-hand and right-hand sides of the observed pixel is compared with the activity of a wider area composed of pixels in the vicinity of the observed pixel in order to produce a result of determination as to whether or not the activity of the area including the observed pixel and the adjacent pixels is greater than the activity of the wider area. The activity of an area is defined as the sum of the absolute values of the differences in signal level between every two adjacent pixels in the area. If the determination result produced at the step S2 is "Yes" indicating that the activity of the area including the observed pixel and the adjacent pixels is greater than the activity of the wider area, the flow of the pseudo-contour existence determination processing goes on to the step S4 at which the gain of the gain adjustment section 303 is set at a predetermined value and the pseudo-contour existence determination processing is ended.

If the determination result produced at the step S2 is "No", on the other hand, the flow of the pseudo-contour existence determination processing goes on to a step S3 at which the activity of an even wider area composed of even more pixels in the vicinity of the observed pixel is compared with a value determined in advance as a threshold value in order to produce a result of determination as to whether or not the activity of the even wider area composed of the vicinity pixels does not exceed the threshold value. If the determination result produced at the step S3 is "Yes" indicating that the activity of the even wider area composed of the vicinity pixels does not exceed the threshold value, the flow of the pseudo-contour existence determination processing goes on to the step S4 at which the gain of the gain adjustment section 303 is set at a predetermined value and the pseudo-contour existence determination processing is ended.

If the determination result produced at even only any one of the steps S1, S2 and S3 is "Yes", the pseudo-contour existence determination section 305 regards the result of the determination as a result indicating that pseudo contours have been generated in the input video signal. In this case, the gain of the gain adjustment section 303 is set at a predetermined value. As is obvious from the flowchart shown in FIG. 10, the application of the monotonous-change criterion to the determination process carried out at the step S1 is followed by the application of the activity criterion to the determination process carried out at the step S2 which is followed by the application of the threshold-value criterion to the determination process carried out at the step S3. It is to be noted that the order of the applications of the criteria does not have to be the order shown in the flowchart. In addition, the three criteria can also be applied at the same time.

Next, the determination processes carried out at the steps S1, S2 and S3 on the basis of the criteria are explained in detail by referring to FIGS. 11 to 14. A criterion is applied to each of the steps by, first of all, finding a difference in signal level between any two adjacent pixels used in the determination process and applying a conditional relation determined in advance to the differences. FIG. 11 is a diagram showing relations between the positions of an observed pixel P10 and ten vicinity pixels forming a horizontal vicinity array on the left-hand side of the observed pixel P10 and ten vicinity pixels forming a horizontal vicinity array on the right-hand side of the observed pixel P10. Notation diff_Ln where suffix n is an integer in the range 0 to nine denotes a difference in signal level between any two adjacent pixels on the left-hand side of the observed pixel P10. On the other hand, notation diff_Rn where suffix n is an integer in the range 0 to 9 denotes a difference in signal level between any two adjacent pixels on the right-hand side of the observed pixel P10. For the suffix n of 0 in particular, notation diff_L0 denotes a difference in signal level between the observed pixel P10 and a pixel P9 adjacent to the observed pixel P10 on the left-hand side of the observed pixel P10. By the same token, notation diff_R0 denotes a difference in signal level between the observed pixel P10 and a pixel P11 adjacent to the observed pixel P10 on the right-hand side of the observed pixel P10.

Let notation 'in' denote an image signal level at a pixel whereas notation x denote a position separated away from the position of the observed pixel P10 in the horizontal direction. In this case, the differences diff_Ln and diff_Rn are expressed by the following equations:

diff_L9=in[x−10]−in[x−9]

diff_L8=in[x−9]−in[x−8]

diff_L7=in[x−8]−in[x−7]

diff_L6=in[x−7]−in[x−5]

diff_L5=in[x−6]−in[x−5]

diff_L4=in[x−5]−in[x−4]

diff_L3=in[x−4]−in[x−3]

diff_L2=in[x−3]−in[x−2]

diff_L1=in[x−2]−in[x−1]

diff_L0=in[x−1]−in[x]

diff_R0=in[x]−in[x+1]

diff_R1=in[x+1]−in[x+2]

diff_R2=in[x+2]−in[x+3]

diff_R3=in[x+3]−in[x+4]

diff_R4=in[x+4]−in[x+5]

diff_R5=in[x+5]−in[x+16]

diff_R6=in[x+6]−in[x+7]

diff_R7=in[x+7]−in[x+8]

diff_R8=in[x+8]−in[x+9]

diff_R9=in[x+9]−in[x+10]

At the step S1 of the flowchart shown in FIG. 10, the levels of signals appearing at the vicinity pixels close to the observed pixel P10 are typically examined in order to produce a result of determination as to whether or not the signal levels are monotonously increasing or decreasing as follows. The three vicinity pixels P7, P8 and P9 on the left-hand side of the observed pixel P10 and the three vicinity pixels P11, P12 and P13 on the right-hand side of the observed pixel P10 are taken as subjects of the examination. First of all, differences diff_L0, diff_L1 and diff_L2 in signal level between every two adjacent pixels on the left-hand side of the observed pixel P10 as well as differences diff_R0, diff_R1 and diff_R2 in signal level between every two adjacent pixels on the right-hand side of the observed pixel P10 are found. Then, the differences are examined in order to produce a result of determination as to whether or not the differences are all 0 or greater than 0 (or smaller than 0). That is to say, a difference conditional relation given below as a relation actually used in a process to produce a result of determination is applied to the differences. If the differences satisfy the difference conditional relation, a variable det_slope_h is set at 1. If the differences do not satisfy the difference conditional relation, on the other hand, the variable det_slope_h is set at 0. Thus, the value of the variable det_slope_h indicates whether or not the differences satisfy the difference conditional relation. The following difference conditional statement expresses the application of the difference conditional relation to the differences and an operation to set the value of the variable det_slope_h at 1 or 0:

```
If (((diff_L2 >=0)&&(diff_L1 >=0)&&
    (diff_L0 >=0)&&(diff_R0 >=0)&&
    (diff_R1 >=0)&&(diff_R2 >=0)) ||
   ((diff_L2 <=0)&&(diff_L1 <=0)&&
    (diff_L0 <=0)&&(diff_R0 <=0)&&
    (diff_R1 <=0)&&(diff_R2 <=0))) {
    det_slope_h= 1;
} else {
    det_slope_h= 0;
}
```

Figure 10:
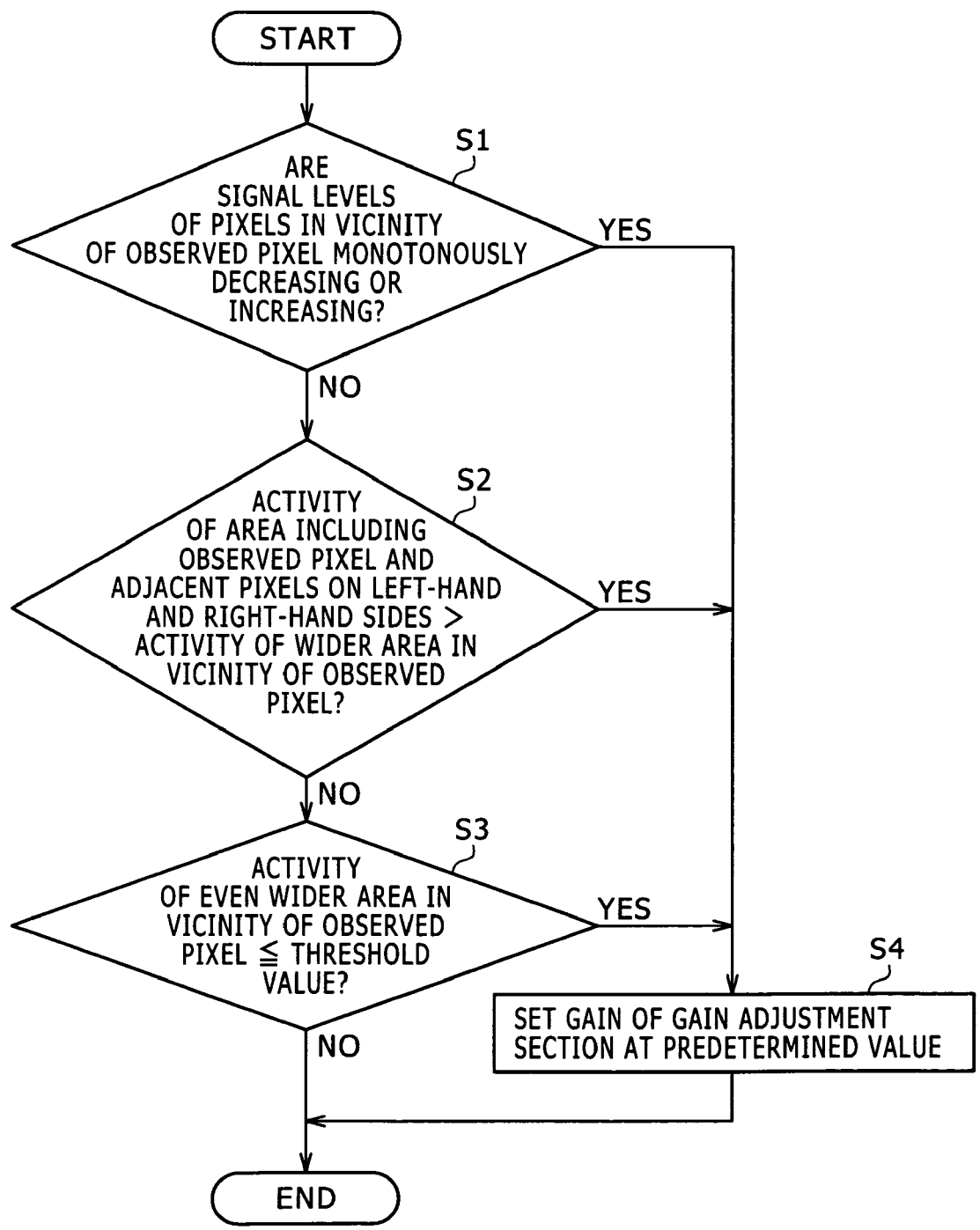
FIG. 10 is a flowchart representing typical processing carried out by a pseudo-contour existence determination section according to the second embodiment of the present invention to determine existence of pseudo contours in a video signal.

With the variable det_slope_h set at 1, the pseudo-contour existence determination section 305 sets the gain at a value determined in advance at the step S4 of the flowchart shown in FIG. 10 and outputs the gain to the gain adjustment section 303.

Figure 12A:
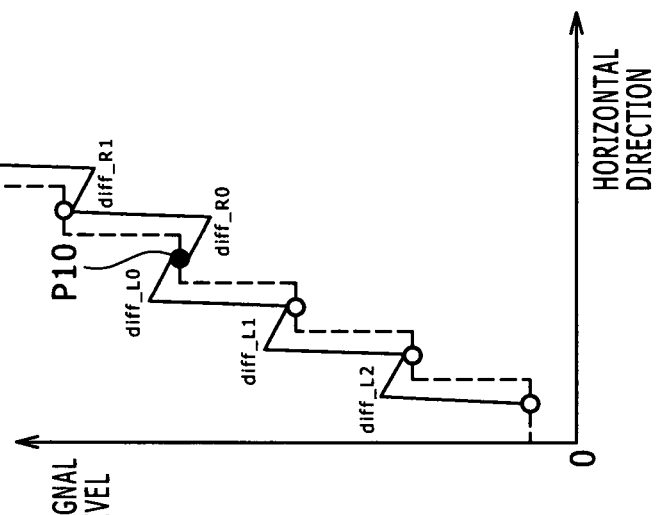
FIGS. 12A to 12D are explanatory diagrams each to be referred to in description of a case in which differences in signal level according to the second embodiment of the present invention.

Each of FIGS. 12A to 12D is an explanatory diagram showing a typical concrete case in which the differences satisfy the difference conditional relation. In FIG. 12, the vertical axis represents the level of the image signal whereas the horizontal axis represents pixel positions spread in the horizontal direction in the vicinity of the observed pixel P10. To be more specific, FIG. 12A is an explanatory diagram showing a typical case in which only diff_R0 is −1 whereas diff_R1, diff_R2, diff_L0, diff_L1 and diff_L2 are all 0. As shown in the figures, diff_R0 is a difference in signal level between the observed pixel P10 and the pixel P11 adjacent to the observed pixel P10 on the right-hand side of the observed pixel P10 whereas diff_L0 is a difference in signal level between the observed pixel P10 and the pixel P9 adjacent to the observed pixel P10 on the left-hand side of the observed pixel P10. By the same token, diff_R1 is a difference in signal level between the adjacent pixel P11 and the vicinity pixel P12 on the right-hand side whereas diff_L1 is a difference in signal level between the adjacent pixel P9 and the vicinity pixel P8 on the left-hand side. In the same way, diff_R2 is a difference in signal level between the vicinity pixels P12 and P13 on the right-hand side whereas diff_L2 is a difference in signal level between the vicinity pixels P8 and P7 on the left-hand side. Thus, since the differences are 0 or smaller than 0, FIG. 12A is an explanatory diagram showing a typical case in which the differences satisfy the difference conditional relation.

Figure 12B:
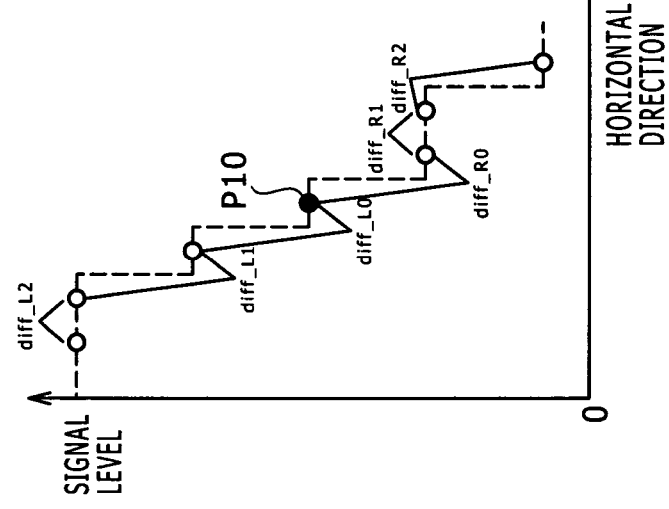
Figure 12C:
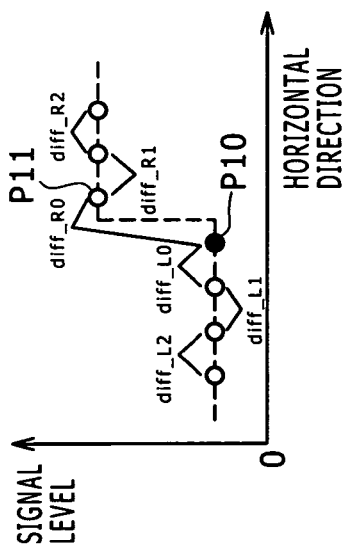
Figure 12D:
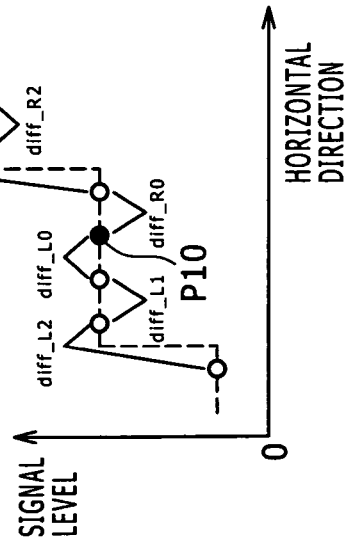

FIG. 12B is an explanatory diagram showing a typical case in which diff_L2 and diff_R1 are −1 whereas diff_R0, diff_R2, diff_L0 and diff_L1 are all 0. Also in this case, since the differences are 0 or smaller than 0, FIG. 12B is an explanatory diagram showing a typical case in which the differences satisfy the difference conditional relation. FIG. 12C is an explanatory diagram showing a typical case in which diff_L1, diff_L0, diff_R0 and diff_R2 are 1 whereas diff_R1 and diff_L2 are all 0. Thus, in this case, since the differences are 0 or greater than 0, FIG. 12C is an explanatory diagram showing a typical case in which the differences satisfy the difference conditional relation. FIG. 12D is an explanatory diagram showing a typical case in which diff_L1, diff_L0, diff_L2, diff_R0, diff_R1 and diff_R2 are all 1. Thus, in this case, since the differences are all 1, FIG. 12D is an explanatory diagram showing a typical case in which the differences satisfy the difference conditional relation.

The following description explains details of the determination processes carried out at the steps S2 and S3 of the flowchart shown in FIG. 10. In order to carry out the determination processes, first of all, the pseudo-contour existence determination section 305 finds the activities of the following three areas:

1: A first area composed of the observed pixel P10 and two pixels adjacent to the observed pixel P10 on respectively the left-hand and right-hand sides of the observed pixel P10.

2: A second wider area composed of three vicinity pixels forming a horizontal vicinity array on the left-hand side of the observed pixel P10 and three vicinity pixels forming a horizontal vicinity array on the right-hand side of the observed pixel P10.

3: A third even wider area composed of ten vicinity pixels forming a horizontal vicinity array on the left-hand side of the observed pixel P10 and ten vicinity pixels forming a horizontal vicinity array on the right-hand side of the observed pixel P10.

As described earlier, the activity of an area is defined as the sum of the absolute values of differences in signal level between every two adjacent pixels in the area. The activities of the three areas defined above are expressed respectively by three equations given below. In the equations, act0_h is the name of a variable used for storing the activity of the first area, act1_2_h is the name of a variable used for storing the activity of the second wider area whereas act1_9_h is the name of a variable used for storing the activity of the third even wider area. In addition, notation abs is the name of a function to find the absolute value of the argument of the function.

$$act0\_h = abs(\text{diff}\_L0) + abs(\text{diff}\_R0)$$

$$act1\_2\_h = abs(\text{diff}\_L2) + abs(\text{diff}\_L1) + abs(\text{diff}\_R1) + abs(\text{diff}\_R2)$$

$$act1\_9\_h = abs(\text{diff}\_L9) + abs(\text{diff}\_L8) + abs(\text{diff}\_L7) + abs(\text{diff}\_L6) +$$

$$abs(\text{diff}\_L5) + abs(\text{diff}\_L4) + abs(\text{diff}\_L3) + abs(\text{diff}\_L2) +$$

$$abs(\text{diff}\_L1) + abs(\text{diff}\_R\_1) + abs(\text{diff}\_R2) + abs(\text{diff}\_R3) +$$

$$abs(\text{diff}\_R4) + abs(\text{diff}\_R5) + abs(\text{diff}\_R6) + abs(\text{diff}\_R7) +$$

$$abs(\text{diff}\_R_8) + abs(\text{diff}\_R9)$$

The above equations expressing act1_2_h and act1_9_h do not include the term diff_L0 expressing the difference in signal level between the observed pixel P10 and the pixel P9 adjacent to the observed pixel P10 on the left-hand side of the observed pixel P10 and the term diff_R0 expressing the difference in signal level between the observed pixel P10 and the pixel P11 adjacent to the observed pixel P10 on the right-hand side of the observed pixel P10 because each of the second wider area and the third even wider area is defined as an area excluding the observed pixel P10. It is to be noted, however, that each of the second wider area and the third even wider area can also be defined as an area including the observed pixel P10. In this case, each of the above equations expressing act1_2_h and act1_9_h includes the term diff_L0 and the term diff_R0.

As described earlier, in the determination process carried out at the step S2 of the flowchart shown in FIG. 10, the activity of an area composed of the observed pixel P10 and two pixels adjacent to the observed pixel P10 on respectively the left-hand and right-hand sides of the observed pixel P10 is compared with the activity of a wider area in order to produce a result of determination as to whether or not the activity of the area including the observed pixel and the adjacent pixels is greater than the activity of the wider area. As explained before, the activity of an area is defined as the sum of the absolute values of the differences in signal level between every two adjacent pixels in the area. The area cited serving as a subject of the determination process carried out at the step S2 is the first area described above. On the other hand, the wider area serving as a subject of the determination process carried out at the step S2 is the second wider area defined earlier as an area composed of three vicinity pixels forming a horizontal vicinity array on the left-hand side of the observed pixel P10 and three vicinity pixels forming a horizontal vicinity array on the right-hand side of the observed pixel P10. An activity conditional relation given below is applied to the activities. If the activities satisfy the activity conditional relation, a variable det_act1_2_h is set at 1. If the activities do not satisfy the activity conditional relation, on the other hand, the variable det_act1_2_h is set at 0. Thus, the value of the variable det_act1_2_h indicates whether or not the activities satisfy the activity conditional relation. The following activity conditional statement expresses the application of the activity conditional relation to the activities and an operation to set the value of the variable det_act1_2_h at 1 or 0:

```
If (act0_h > act1_2_h) {
    det_act1_2_h = 1;
} else {
    det_act1_2_h = 0;
}
```

In accordance with the above activity conditional statement, if the value of the activity act0_h representing the activity of the first area composed of the observed pixel P10 and two pixels adjacent to the observed pixel P10 on respectively the left-hand and right-hand sides of the observed pixel P10 is greater than the value of the activity act1_2_h representing the activity of the second wider area composed of three vicinity pixels forming a horizontal vicinity array on the left-hand side of the observed pixel P10 and three vicinity pixels forming a horizontal vicinity array on the right-hand side of the observed pixel P10, the variable det_act1_2_h is set at 1. If the value of the activity act0_h is not greater than the value of the activity act1_2_h, on the other hand, the variable det_act1_2_h is set at 0. That is to say, if the gradation change in the second wider area composed of three vicinity pixels forming a horizontal vicinity array on the left-hand side of the observed pixel P10 and three vicinity pixels forming a horizontal vicinity array on the right-hand side of the observed pixel P10 is smoother than the gradation change in the first area composed of the observed pixel P10 and two pixels adjacent to the observed pixel P10 on respectively the left-hand and right-hand sides of the observed pixel P10, the variable det_act1_2_h is set at 1. With the variable det_act1_2_h set at 1, the pseudo-contour existence determination section 305 sets the gain at a value determined in advance at the step S4 of the flowchart shown in FIG. 10 and outputs the gain to the gain adjustment section 303.

Figure 13A:
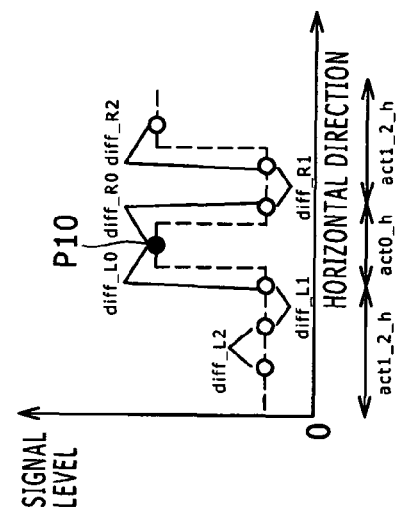
FIGS. 13A to 13E are explanatory diagrams each to be referred to in description of a case in which activities satisfy an activity conditional relation according to the second embodiment of the present invention.

Each of FIGS. 13A to 13E is an explanatory diagram showing a typical concrete case in which the activities satisfy the activity conditional relation. Also in FIG. 13, the vertical axis represents the level of the image signal whereas the horizontal axis represents pixel positions spread in the horizontal direction in the vicinity of the observed pixel P10. To be more specific, FIG. 13A is an explanatory diagram showing a typical case in which only diff_R0 is −1 whereas diff_R1, diff_R2, diff_L0, diff_L1 and diff_L2 are all 0. That is to say, the activities act0_h and act1_2_h satisfy the activity conditional relation of act0_h>act1_2_h.

Figure 13C:
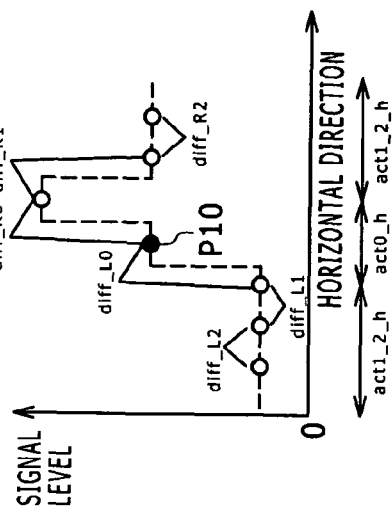
Figure 13D:
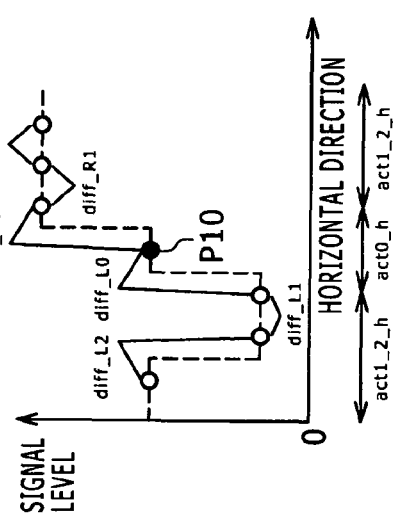
Figure 13B:
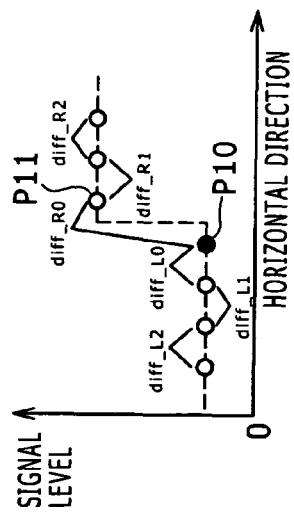

FIG. 13B is an explanatory diagram showing a typical case in which:

act0_h=1 (the absolute value of diff_L0)+1 (the absolute value of diff_R0)

=2 whereas act1_2_h=0 (the absolute value of diff_L2)+1 (the absolute value of diff_L1)

+0 (the absolute value of diff_R1)+0 (the absolute value of diff_R2)

=1

Thus, the activities act0_h and act1_2_h satisfy the activity conditional relation of act0_h>act1_2_h.

FIG. 13C is an explanatory diagram showing a typical case in which:

act0_h=1 (the absolute value of diff_L0)+1 (the absolute value of diff_R0)

=2 whereas act1_2_h=0 (the absolute value of diff_L2)+0 (the absolute value of diff_L1)

+1 (the absolute value of diff_R1)+0 (the absolute value of diff_R2)

=1

Thus, the activities act0_h and act1_2_h satisfy the activity conditional relation of act0_h>act1_2_h.

FIG. 13D is an explanatory diagram showing a typical case in which:

act0_h=1 (the absolute value of diff_L0)+1 (the absolute value of diff_R0)

=2 whereas act1_2_h=1 (the absolute value of diff_L2)+0 (the absolute value of diff_L1)

+0 (the absolute value of diff_R1)+0 (the absolute value of diff_R2)

=1

Thus, the activities act0_h and act1_2_h satisfy the activity conditional relation of act0_h>act1_2_h.

Figure 13E:
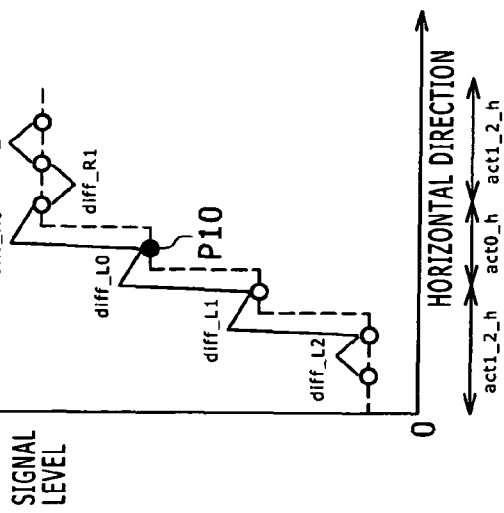

FIG. 13E is an explanatory diagram showing a typical case in which:

act0_h=1 (the absolute value of diff_L0)+1 (the absolute value of diff_R0)

=2 whereas act1_2_h=0 (the absolute value of diff_L2)+0 (the absolute value of diff_L1)

+0 (the absolute value of diff_R1)+1 (the absolute value of diff_R2)

=1

Thus, the activities act0_h and act1_2_h satisfy the activity conditional relation of act0_h>act1_2_h.

It is to be noted that the size of the area covered by the activity act0_h is different from the size of the area covered by the activity act1_2_h. Thus, in the process to compare the activities act0_h and act1_2_h with each other, it is nice to handle the activities act0_h and act1_2_h equally by multiplying one of these activities by a weight. In this embodiment, the number of added terms in an expression representing by the activity act0_h is 2 whereas the number of added terms in an expression representing the activity act1_2_h is 4. Thus, the activity act1_2_h can be multiplied by a weight of 0.5.

At the step S3 of the flowchart shown in FIG. 10, the activity det_act1_9_h of an even wider area composed of the vicinity pixels is compared with a value determined in advance as a threshold value in order to produce a result of determination as to whether or not the activity t_act1_9_h of the even wider area composed of the vicinity pixels does not exceed the threshold value. In this case, the even wider area is the third even wider area composed of ten vicinity pixels forming a horizontal vicinity array on the left-hand side of the observed pixel P10 and ten vicinity pixels forming a horizontal vicinity array on the right-hand side of the observed pixel P10. A threshold conditional relation given below is applied to the activity t_act1_9_h and the predetermined threshold value denoted by notation DET_ACT1_9_TH. If the activity and the threshold value determined in advance satisfy the threshold conditional relation, a variable det_act1_9_h is set at 1. If the activity and the predetermined threshold value do not satisfy the activity conditional relation, on the other hand, the variable det_act1_9_h is set at 0. Thus, the value of the variable det_act1_9_h indicates whether or not the activity and the threshold value determined in advance satisfy the threshold conditional relation. The predetermined threshold value DET_ACT1_9_TH is typically 3. The following threshold conditional statement expresses the application of the threshold conditional relation to the activity and the predetermined threshold value and also expresses an operation to set the value of the variable det_act1_9_h at 1 or 0:

```
If (act1_9_h <= DET_ACT1_9_TH) {
    det_act1_9_h = 1;
} else {
    det_act1_9_h = 0;
}
```

In accordance with the above threshold conditional statement, if the value of the activity act1_9_h representing the activity of the third even wider area composed of ten vicinity pixels forming a horizontal vicinity array on the left-hand side of the observed pixel P10 and ten vicinity pixels forming a horizontal vicinity array on the right-hand side of the observed pixel P10 is not greater than the predetermined threshold value DET_ACT1_9_TH of typically 3, the variable det_act1_9_h is set at 1. That is to say, if the gradation change in the third even wider area in the vicinity of the observed pixel P10 is smooth, the variable det_act1_9_h is set at 1. If the value of the activity act1_9_h is greater than the predetermined threshold value DET_ACT1_9_TH, on the other hand, the variable det_act1_9_h is set at 0. With the variable det_act1_9_h set at 1, the pseudo-contour existence determination section 305 sets the gain at a value determined in advance at the step S4 of the flowchart shown in FIG. 10 and outputs the gain to the gain adjustment section 303.

Figure 14A:
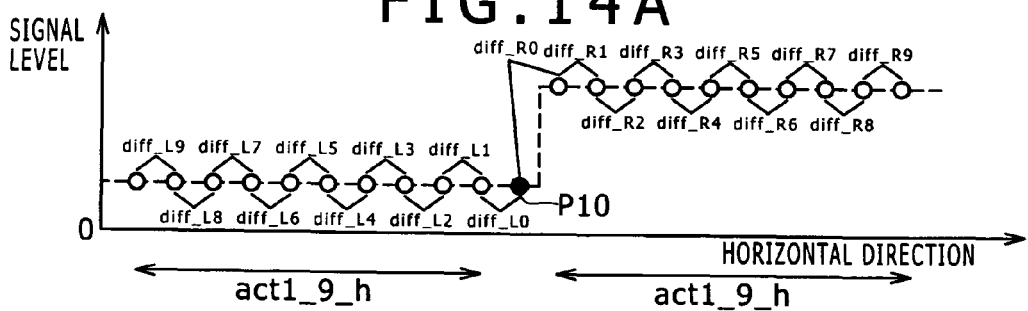
FIGS. 14A to 14D are explanatory diagrams each to be referred to in description of a case in which a specific activity and a threshold value determined in advance satisfy a threshold conditional relation according to the second embodiment of the present invention.

Each of FIGS. 14A to 14D is an explanatory diagram showing a typical concrete case in which the activity act1_9_h and the threshold value determined in advance satisfy the threshold conditional relation. Also in FIG. 14, the vertical axis represents the level of the image signal whereas the horizontal axis represents pixel positions spread in the horizontal direction in the vicinity of the observed pixel P10. To be more specific, FIG. 14A is an explanatory diagram showing a typical case in which diff_R0 is 1 but is not used in the equation for finding the value of the activity act1_9_h. Thus, the value of the activity act1_9_h is 0. That is to say, the activity act1_9_h and the threshold value determined in advance satisfy the threshold conditional relation of act1_9_h≦DET_ACT1_9_TH (=3).

Figure 14B:
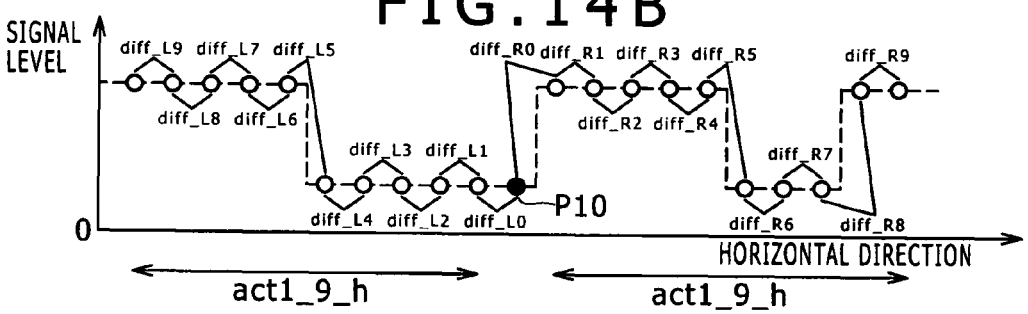

FIG. 14B is an explanatory diagram showing a typical case in which:

act1_9_h=0 (the absolute value of diff_L9)+0 (the absolute value of diff_L8)+0 (the absolute value of diff_L7)
+0 (the absolute value of diff_L6)+1 (the absolute value of diff_L5)+0 (the absolute value of diff_L4)
+0 (the absolute value of diff_L3)+0 (the absolute value of diff_L2)+0 (the absolute value of diff_L1)
+0 (the absolute value of diff_R1)+0 (the absolute value of diff_R2)+0 (the absolute value of diff_R3)
+0 (the absolute value of diff_R4)+1 (the absolute value of diff_R5)+0 (the absolute value of diff_R6)
+0 (the absolute value of diff_R7)+1 (the absolute value of diff_R8)+0 (the absolute value of diff_R9)
=3

Thus, the activity act1_9_h and the threshold value determined in advance satisfy the threshold conditional relation of act1_9_h≦DET_ACT1_9_TH (=3).

Figure 14C:
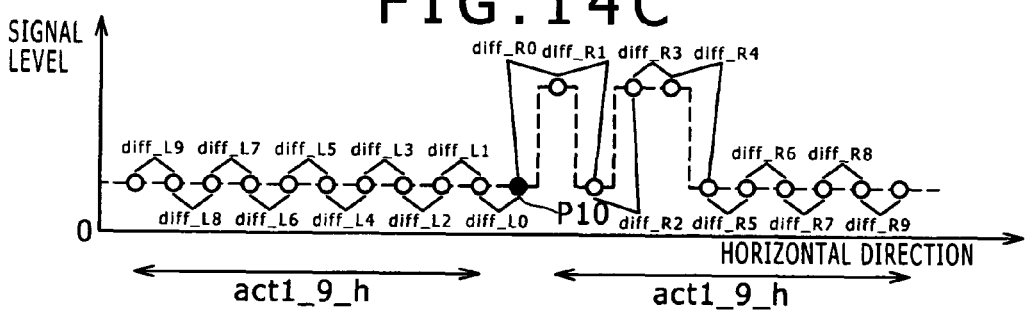

FIG. 14C is an explanatory diagram showing a typical case in which:

act1_9_h=0 (the absolute value of diff_L9)+0 (the absolute value of diff_L8)+0 (the absolute value of diff_L7)
+0 (the absolute value of diff_L6)+0 (the absolute value of diff_L5)+0 (the absolute value of diff_L4)
+0 (the absolute value of diff_L3)+0 (the absolute value of diff_L2)+0 (the absolute value of diff_L1)
+1 (the absolute value of diff_R1)+1 (the absolute value of diff_R2)+0 (the absolute value of diff_R3)
+1 (the absolute value of diff_R4)+0 (the absolute value of diff_R5)+0 (the absolute value of diff_R6)
+0 (the absolute value of diff_R7)+0 (the absolute value of diff_R8)+0 (the absolute value of diff_R9)
=3

Thus, the activity act1_9_h and the threshold value determined in advance satisfy the threshold conditional relation of act1_9_h≦DET_ACT1_9_TH (=3).

Figure 14D:
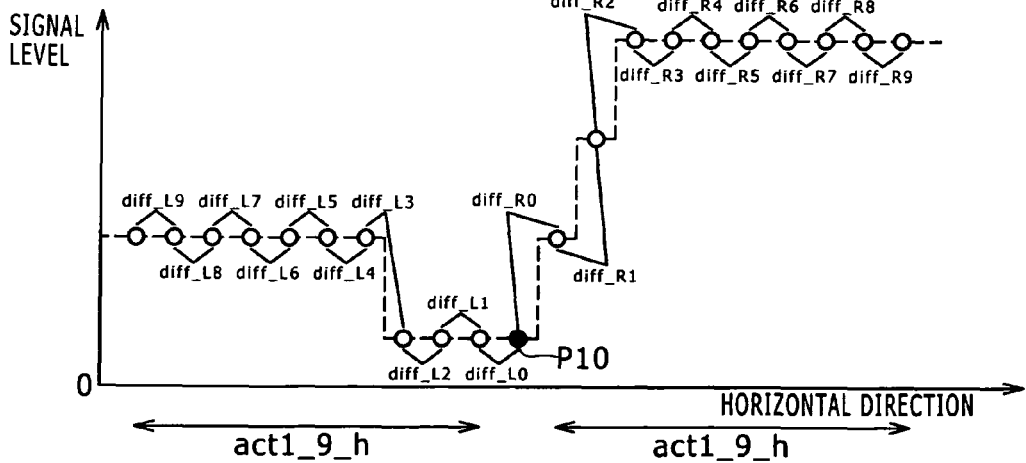

FIG. 14D is an explanatory diagram showing a typical case in which:

act1_9_h=0 (the absolute value of diff_L9)+0 (the absolute value of diff_L8)+0 (the absolute value of diff_L7)
+0 (the absolute value of diff_L6)+0 (the absolute value of diff_L5)+0 (the absolute value of diff_L4)
+1 (the absolute value of diff_L3)+0 (the absolute value of diff_L2)+0 (the absolute value of diff_L1)
+1 (the absolute value of diff_R1)+1 (the absolute value of diff_R2)+0 (the absolute value of diff_R3)
+0 (the absolute value of diff_R4)+0 (the absolute value of diff_R5)+0 (the absolute value of diff_R6)
+0 (the absolute value of diff_R7)+0 (the absolute value of diff_R8)+0 (the absolute value of diff_R9)
=3

Thus, the activity act1_9_h and the threshold value determined in advance satisfy the threshold conditional relation of act1_9_h≦DET_ACT1_9_TH (=3).

If even only any one of the variables det_slope_h, det_act1_2_h and det_act1_9_h is set at 1 as a result of the execution of the conditional statements described above, the pseudo-contour existence determination section 305 regards the values of the variables as values indicating that pseudo contours have been generated in the input video signal. In this case, the pseudo-contour existence determination section 305 passes on a gain to the gain adjustment section 303 as an argument. A conditional program statement for verifying the variables det_slope_h, det_act1_2_h and det_act1_9_h as well as setting a gain GAIN_LPF_H in the argument gain_h in accordance with the result of the verification is written as follows.

```
If ((det_slope_h == 1) ||
    (det_act1_2_h == 1) ||
    (det_act1_9_h == 1)) {
    gain_h = GAIN_LPF_H;
} else {
    gain_h = 0;
}
```

In accordance with the above conditional program statement, if the value of the variable det_slope_h, det_act1_2_h or det_act1_9_h is equal to 1, the argument gain_h is set at the gain GAIN_LPF_H. Typically, the gain GAIN_LPF_H is in the range 0 to 1. If the values of the variables det_slope_h, det_act1_2_h and det_act1_9_h are all equal to 0, on the other hand, the argument gain_h is set at 0.

In accordance with the above conditional program statement, if the value of the variable det_slope_h, det_act1_2_h or det_act1_9_h is equal to 1, the argument gain_h is set at the gain GAIN_LPF_H. That is to say, the condition demanding that the value of the variable det_slope_h be equal to 1, the condition demanding that the value of the variable det_act1_2_h be equal to 1 and the condition demanding that the value of the variable det_act1_9_h be equal to 1 are combined with each other to form an OR (logical sum) expression in the above conditional program statement. It is to be noted, however, that the combination of the three conditions is by no means limited to the OR (logical product) expression. For example, the three conditions can also be combined with each other to form an AND (logical product) expression in the above conditional program statement. As another alternative, the three conditions can also be combined with each other to form a mixed expression composing of an OR (logical sum) partial expression and an AND (logical product) partial expression in the above conditional program statement. To put it concretely, the three conditions can also be combined with each other to form a mixed expression composing of an OR (logical sum) partial expression and an AND (logical product) partial expression in the above conditional program statement as follows:

```
If (((det_slope_h == 1) ||
     (det_act1_2_h == 1)) &&
     (det_act1_9_h == 1)) {
    gain_h = GAIN_LPF_H;
} else {
    gain_h = 0;
}
```

As an alternative, the three conditions can also be combined with each other to form an AND (logical product) expression in the above conditional program statement as follows:

```
If ((det_slope_h == 1) &&
    (det_act1_2_h == I) &&
    (det_act1_9_h == 1)) {
    gain_h = GAIN_LPF_H;
} else {
    gain_h = 0;
}
```

As is obvious from the above description, the value of the argument gain_h can be one of the two values, i.e., 0 and the value of GAIN_LPF_H. It is to be noted, however, that any plurality of constants can be prepared in advance for the argument gain_h and any one of the constants can be selected in accordance with a determination result produced by the pseudo-contour existence determination section 305.

In the configuration described above, the pseudo-contour existence determination section 305 determines that pseudo contours have been generated in the input video signal if:

at the step S1 of the flowchart shown in FIG. 10, the levels of signals appearing at the vicinity pixels of a vicinity area close to the observed pixel are found monotonously increasing or decreasing;

at the step S2 of the flowchart shown in FIG. 10, the gradation change in a second wider area composed of three vicinity pixels forming a horizontal vicinity array on the left-hand side of the observed pixel P10 and three vicinity pixels forming a horizontal vicinity array on the right-hand side of the observed pixel P10 is found smaller than the gradation change in a first area composed of the observed pixel P10 and two pixels adjacent to the observed pixel P10 on respectively the left-hand and right-hand sides of the observed pixel P10; or at the step S3 of the flowchart shown in FIG. 10, the gradation change in a third even wider area composed of ten vicinity pixels forming a horizontal vicinity array on the left-hand side of the observed pixel P10 and ten vicinity pixels forming a horizontal vicinity array on the right-hand side of the observed pixel P10 is found smooth.

In either of the above cases, the gain of the gain adjustment section 303 is set at a value determined in advance.

With the gain of the gain adjustment section 303 set at a value determined in advance, the adder 304 receives a ten-bit infinitesimal-amplitude image signal with a gradation limited to a value not exceeding the eight-bit gradation from the gain adjustment section 303 which has received the ten-bit image signal from the BPF 301 through the limiter section 302. Then, the adder 304 subtracts the ten-bit infinitesimal-amplitude image signal from the eight-bit input video signal. Thus, an image signal output by the adder 304 is a bit-decompressed signal having infinitesimal-amplitude image signal components thereof smoothed. A bit-decompressed signal is an image signal having more bits per word than the input video signal prior to a decompression process. As a result, a reproduced video displayed on typically a display unit shown in none of the figures has fewer pseudo contours.

In accordance with the embodiment described above, the BPF 301 decompresses an eight-bit input video signal into a ten-bit signal. It is to be noted, however, that the bit count of the image signal obtained as a result of the decompression process is by no means limited to ten. For example, the BPF 301 may also decompress the eight-bit input video signal into a 12-bit or 14-bit signal. If the BPF 301 decompresses the eight-bit input video signal into a 12-bit signal, the BPF 301, the limiter section 302 and the gain adjustment section 303 carry out processes which are explained by referring to FIGS. 15 to 18.

FIG. 15 is a plurality of explanatory diagrams showing amplitude waveforms of signals input to and output by the BPF 301. To be more specific, FIG. 15A is an explanatory diagram showing the amplitude of the input video signal supplied to the BPF 301 whereas FIG. 15B is an explanatory diagram showing the amplitude of an image signal generated by the BPF 301. The waveform W1, shown in FIG. 15A is a one step amplitude waveform of the input video signal completing an eight-bit quantization process. On the other hand, the waveform W2' shown in FIG. 15B is a four steps amplitude waveform of an image signal completing a 12-bit quantization process. Thus, FIGS. 15A and 15B indicate that that one step of eight-bit quantization of the image signal corresponds to four steps of 12-bit quantization.

Figure 16:
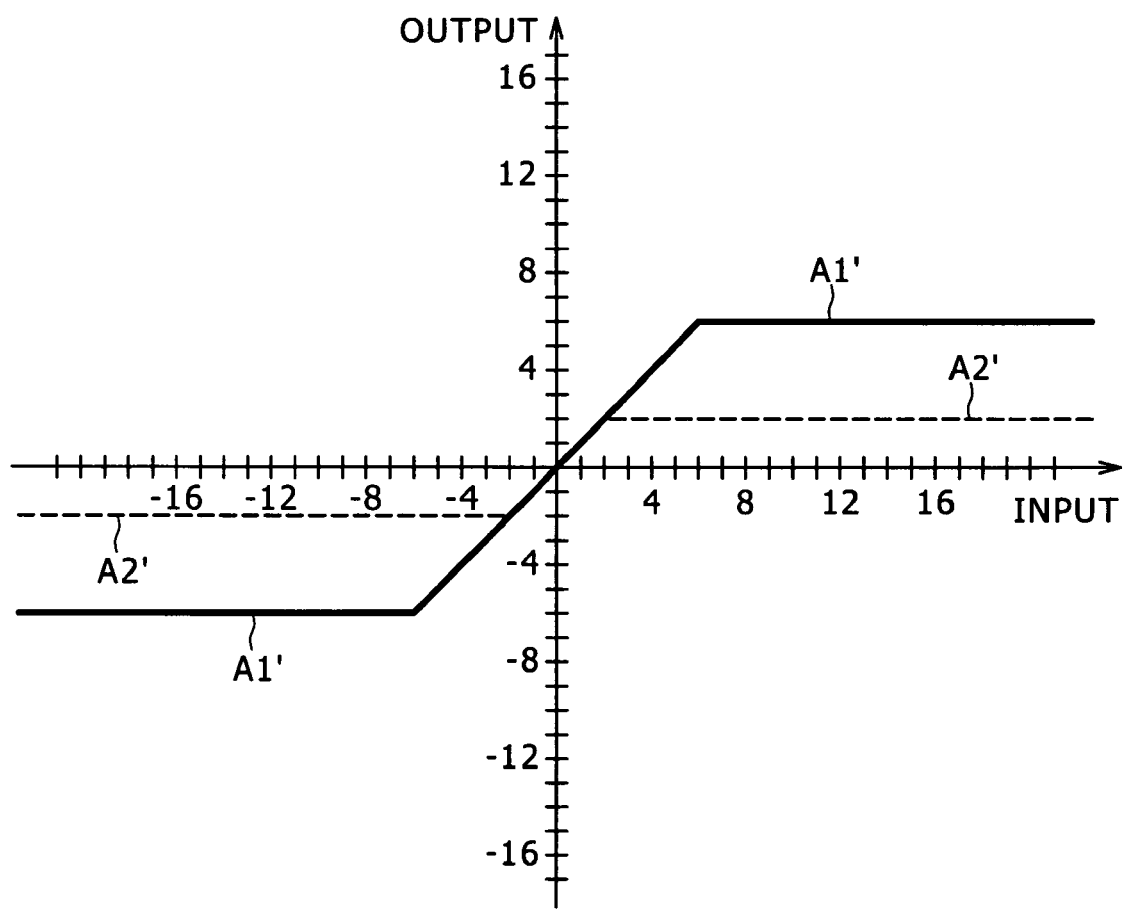
FIG. 16 is a diagram showing a curve A1' representing the input/output characteristic of the BPF according to the second embodiment of the present invention and a curve A2' representing the input/output characteristic of a limiter section according to the second embodiment.

FIG. 15B is an explanatory diagram showing the amplitude waveform W2' of an image signal generated by the BPF 301 as a result of the decompression process carried out by the BPF 301 on the image signal having the waveform W1' shown in FIG. 15A. The image signal shown in FIG. 15B is a result of a decompression process carried out in order to change the number of bits from eight to twelve. FIG. 15B is an explanatory diagram showing a state in which high-frequency signal components of the waveform W1' shown in FIG. 15A are extracted from the waveform W1' and output as a waveform W2' having amplitude levels of ±4. That is to say, the BPF 301 increases the bit count of the input video signal and passes on only signal components each having a small amplitude not exceeding the level of 4. A solid line A1' shown in FIG. 16 represents the input/output characteristic of the BPF 301. As shown in FIG. 16, for any input video signal having an amplitude level in the range of ±6, the BPF 301 outputs an image signal having an amplitude proportional to the amplitude of the input video signal. As for any input video signal having an amplitude level beyond the range of ±6, the BPF 301 outputs an image signal having a fixed amplitude of ±6 respectively.

The limiter section 302 carries out a process to limit the amplitude of a 12-bit signal output by the BPF 301 and limit the gradation thereof to a value not exceeding an eight-bit gradation. A dashed line A2' shown in FIG. 16 represents the input/output signal characteristic of the limiter section 302. As shown in FIG. 16, for any signal received from the BPF 301 as an image signal having an amplitude level in the range of ±2, the limiter section 302 outputs an image signal having an amplitude linearly proportional to the amplitude of the input video signal as indicated by the solid line A1' also representing the input/output signal characteristic of the BPF 301. As for any signal received from the BPF 301 as an image signal having an amplitude level beyond the range of ±2, the limiter section 302 outputs an image signal having a fixed amplitude of +2 respectively as shown by the dashed line A2' in FIG. 16.

FIG. 17A is an explanatory diagram showing the waveform of the amplitude of an image signal output by the limiter section 302. A dashed line W2' shown in FIG. 17A represents the waveform of the amplitude of an image signal output by the BPF 301. The waveform W2' is the waveform W2' shown in FIG. 15B as the waveform of the image signal output by the BPF 301. That is to say, the limiter section 302 further carries out an amplitude limitation process on the image signal output by the BPF 301 as an image signal having the amplitude waveform W2' in order to generate an output signal having the waveform W3' having an amplitude of ±2. The adder 304 subtracts the image signal output by the limiter section 302 as an image signal having a characteristic represented by the waveform W3' from the eight-bit input video signal having a characteristic represented by the waveform W1' in FIG. 17B to result in an image signal having a characteristic represented by a waveform W4' shown in FIG. 17B. That is to say, W4'=W1'−W3'. It is to be noted that the waveform W1' shown in FIG. 17B is the waveform W1' shown in FIG. 15A as the waveform of the eight-bit input video signal supplied to the BPF 301 and the adder 304, which are employed in the filter 31 as shown in FIG. 9.

Figure 18:
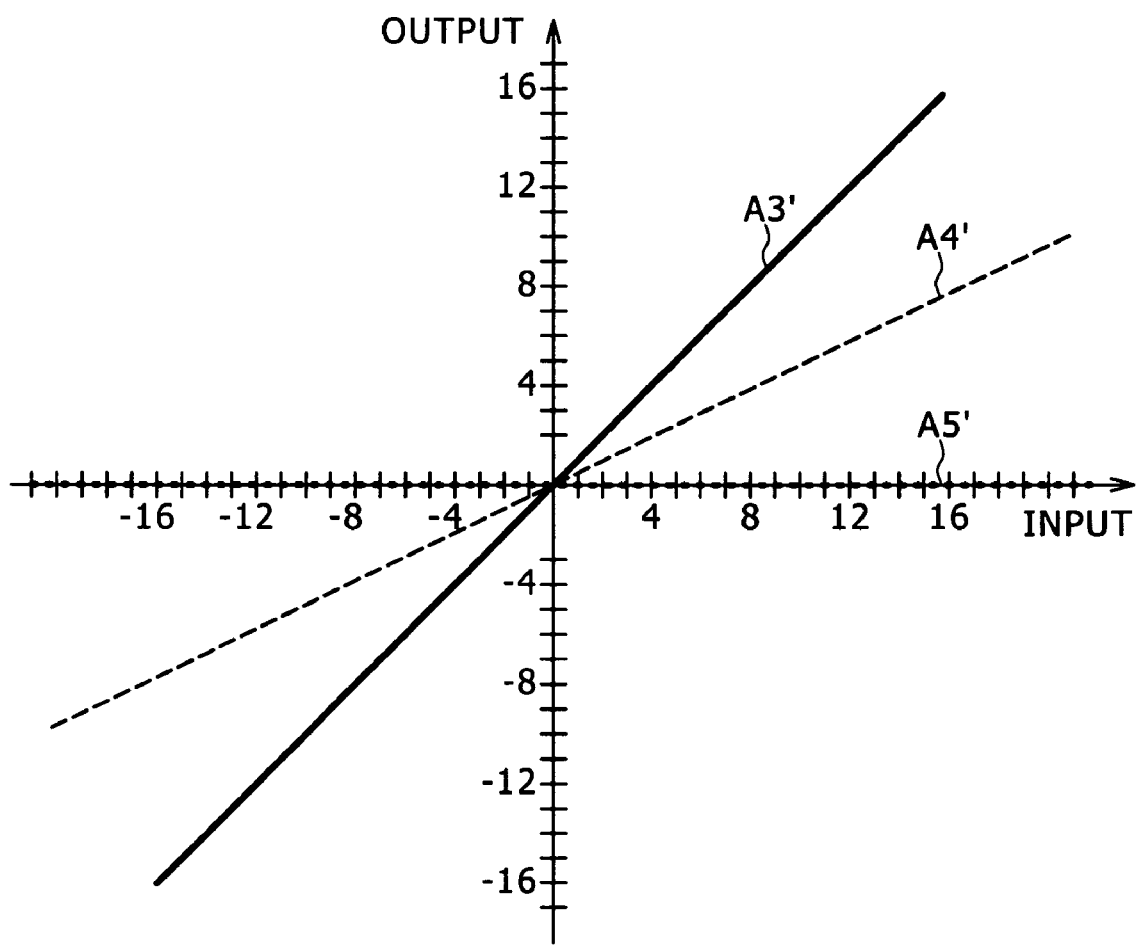
FIG. 18 is a diagram showing curves each representing an input/output characteristic of a gain adjustment section according to the second embodiment of the present invention.

FIG. 18 is a diagram showing typical gain setting processes carried out by the gain adjustment section 303. To be more specific, each of lines A3', A4' and A5' shown in the figure represents the relation between the magnitude of an image signal supplied to the gain adjustment section 303 and the magnitude of an image signal output by the gain adjustment section 303. If the gain adjustment section 303 sets the gain of the image signal output by the limiter section 302 at 1, the gain adjustment section 303 outputs an image signal having a magnitude proportional to the magnitude of the image signal supplied to the gain adjustment section 303 as shown by the solid line A3' in FIG. 18. That is to say, the gain adjustment section 303 sustains the image signal output by the limiter section 302 as it is and supplies the image signal to the adder 304 as a subtrahend to be subtracted by the adder 304 from the eight-bit input video signal. If the gain adjustment section 303 sets the gain of the image signal output by the limiter section 302 at 0.5, the gain adjustment section 303 outputs an image signal having a magnitude equal to ½ times the magnitude of the image signal supplied to the gain adjustment section 303 as shown by the dashed line A4, in FIG. 18. In this case, the gain adjustment section 303 reduces the magnitude of the image signal output by the limiter section 302 to ½ times the magnitude of the image signal supplied to the gain adjustment section 303. For example, if the level of the image signal supplied to the gain adjustment section 303 is 16, the level of the image signal output by the gain adjustment section 303 is 8.

Figure 19:
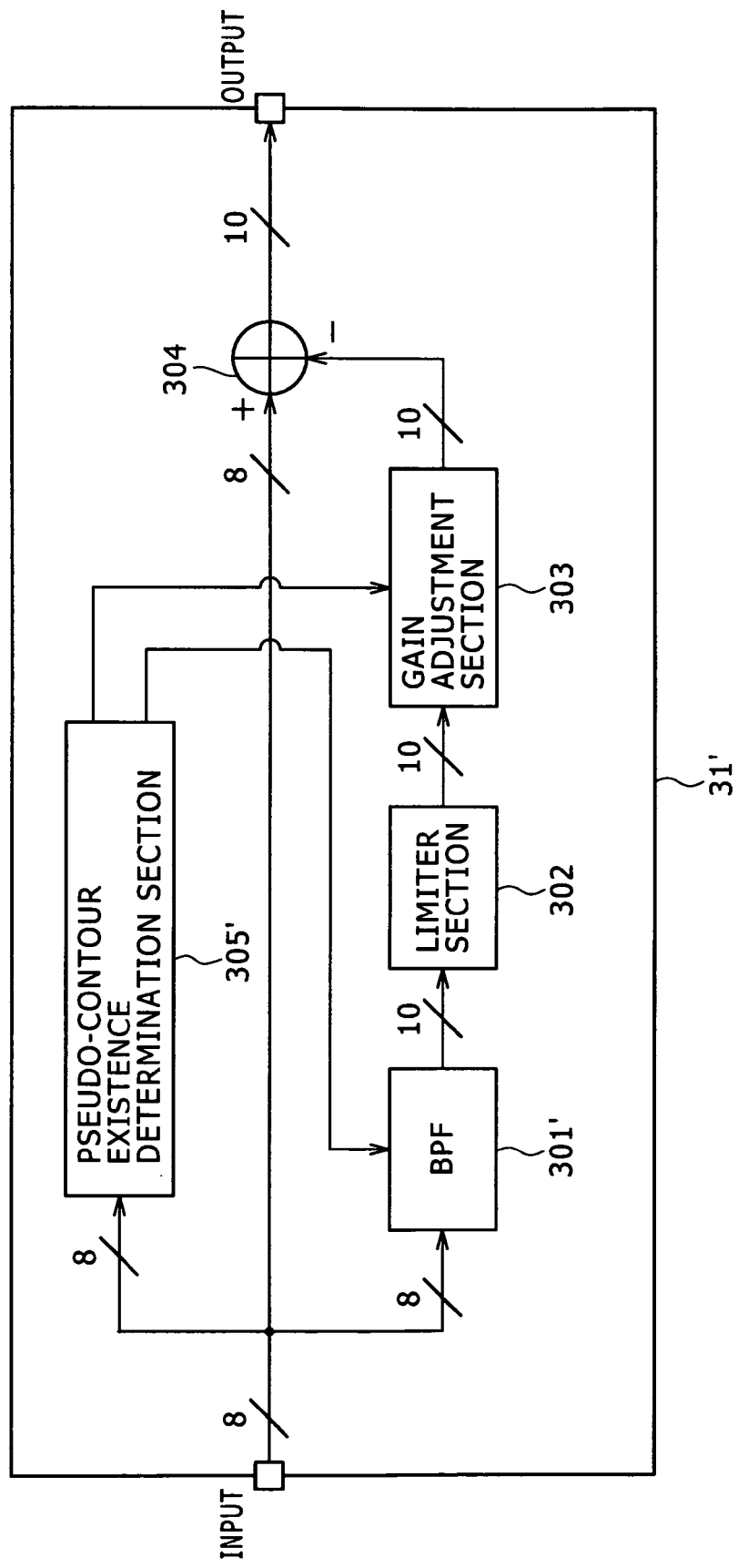
FIG. 19 is a block diagram showing another typical configuration of the filter according to the second embodiment of the present invention.

In the embodiment described above, each of filter coefficients used by the BPF 301 is a constant. However, the area in the vicinity of the observed pixel P10 includes a sub-area with no changes in gradation and, in accordance with the size of the sub-area, each of the filter coefficients used by the BPF 301 may be changed from one value to another. The size of such a sub-area included in the area in the vicinity of the observed pixel P10 is also referred to as the flatness of the area. FIG. 19 is a block diagram showing a typical configuration of the filter 31 employing a BPF 301 capable of changing each of the filter coefficients from one value to another. Configuration elements shown in FIG. 19 as elements identical with their counterparts shown in FIGS. 1 and 9 explained earlier are denoted by the same reference numerals as the counterparts. The basic configuration of the filter 31' shown in FIG. 19 is similar to the filter 31 shown in FIG. 9. That is to say, the filter 31' shown in FIG. 19 has a BPF 301' for carrying out a bit decompression process on the input video signal and a process to extract high-frequency signal components from the input video signal, passing on the extracted high-frequency signal components to a limiter section 302 also included in the filter 31. The limiter section 302 is a section for carrying out a process to limit the amplitude of an image signal received from the BPF 301'. On top of that, the filter 31' also has a gain adjustment section 303 for adjusting the level of an image signal output by the limiter section 302 and an adder 304 for subtracting an image signal output by the gain adjustment section 303 from the input video signal. In addition to the configuration elements described above, the configuration of the filter 31' also includes a pseudo-contour existence determination section 305' for detecting the input video signal in order to produce a result of determination as to whether or not pseudo contours have been generated in the input video signal. The pseudo-contour existence determination section 305' supplies a result of the determination to the gain adjustment section 303 which then changes the value of the gain thereof in accordance with the result received from the pseudo-contour existence determination section 305'.

The filter 31' shown in FIG. 19 is characterized in that the pseudo-contour existence determination section 305' supplies a result of the determination also to the BPF 301' which then changes the value of the filter coefficients used thereby in accordance with the result received from the pseudo-contour existence determination section 305'.

FIG. 20 is a diagram showing typical filter coefficients used by the BPF 301'. It is to be noted that the filter coefficients K0 to K16 are associated with the horizontal-direction positions of vicinity pixels as shown in FIG. 4A. Notation M0 shown in FIG. 20 denotes a set of filter coefficients. In the filter-coefficient set M0 shown in FIG. 20, with the pixel signal from the observed pixel P10 taken as an observed pixel signal, the filter coefficient K8 assigned to a pixel signal from the observed pixel P10 is set at 192/256. Each of the filter coefficients K4 and K12 assigned respectively to pixel signals from the pixels P6 and P14 in the vicinity of the observed pixel P10 is set at −64/256. To be more specific, the pixels P6 and P14 are separated from the observed pixel P10 in the left and right directions respectively by four pixel pitches. Each of the filter coefficients K0 and K16 assigned respectively to pixel signals from the pixels P2 and P18 in the vicinity of the pixels P6 and P14 respectively is set at −32/256. To be more specific, the pixels P2 and P18 are separated from the observed pixel P10 in the left and right directions respectively by eight pixel pitches. Notation M1 shown in FIG. 20 denotes another set of filter coefficients. In the filter-coefficient set M1 shown in FIG. 20, with the pixel signal from the observed pixel P10 taken as an observed pixel signal, the filter coefficient K8 assigned to a pixel signal from the observed pixel P10 is set at 192/256. Each of the filter coefficients K6 and K10 assigned respectively to pixel signals from the pixels P8 and P12 in the vicinity of the observed pixel P10 is set at −64/256. To be more specific, the pixels P8 and P12 are separated from the observed pixel P10 in the left and right directions respectively by two pixel pitches. Each of the filter coefficients K4 and K12 assigned respectively to pixel signals from the pixels P6 and P14 in the vicinity of the pixels P8 and P12 respectively is set at −32/256. To be more specific, the pixels P6 and P14 are separated from the observed pixel P10 in the left and right directions respectively by four pixel pitches. In the following description, notations M0 and M1 are also used for denoting the BPF 301' which functions as a filter having the filter-coefficient sets M0 and M1 respectively. As is obvious from the above description, the filter M0 has a time constant different from the time constant of the filter M1. The BPF 301' is switched from the function of the filter M0 to the function of the filter M1 and vice versa in accordance with the processing result output by the pseudo-contour existence determination section 305' as a result representing the state of the input video signal.

Figure 21:
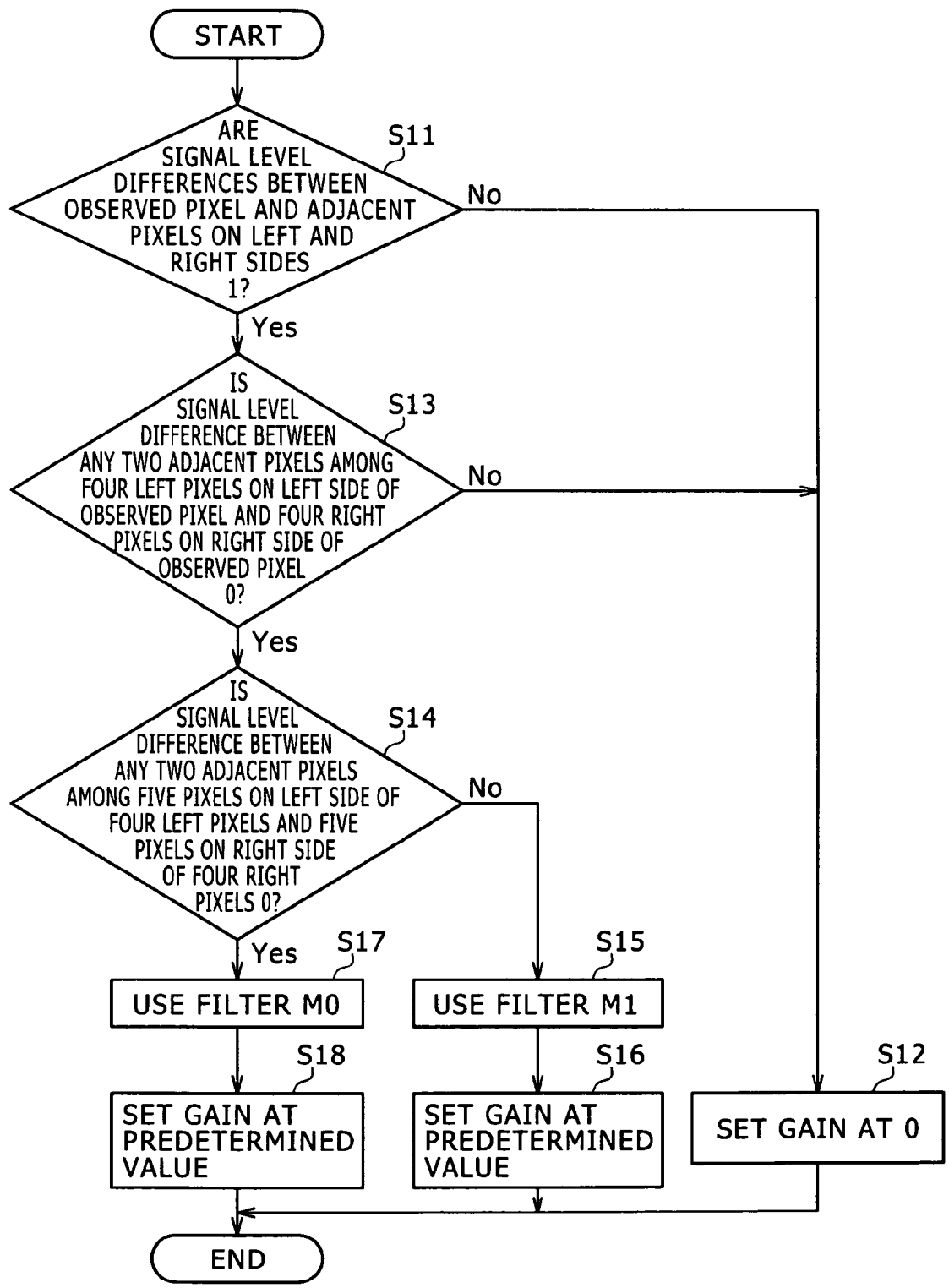
FIG. 21 is a flowchart representing typical processing carried out by the pseudo-contour existence determination section according to the second embodiment of the present invention.

FIG. 21 is a diagram showing a flowchart representing typical processing carried out by the pseudo-contour existence determination section 305' in order to produce a result of determination as to whether to set the BPF 301' to function as the filter M0 or M1 or to turn off the function of the BPF 301'. As shown in the figure, the flowchart representing the processing carried out by the pseudo-contour existence determination section 305' begins with a step S11 at which the pseudo-contour existence determination section 305' produces a result of determination as to whether or not each of the differences in signal level between the observed pixel P10 and the adjacent pixels P9 and P11 on respectively the left and right sides of the observed pixel P10 is 1. As shown in FIG. 11, the difference in signal level between the observed pixel P10 and the adjacent pixel P9 is diff_L0 whereas the difference in signal level between the observed pixel P10 and the adjacent pixel P11 is diff_R0. If the determination result produced at the step S11 is "No" indicating that the difference diff_L0 in signal level between the observed pixel P10 and the adjacent pixel P9 as well as the difference diff_R0 in signal level between the observed pixel P10 and the adjacent pixel P11 are not 1, the flow of the processing goes on to a step S12 at which the pseudo-contour existence determination section 305' sets the gain of the gain adjustment section 303 at 0. That is to say, the pseudo-contour existence determination section 305' turns off the function of the BPF 301'.

If the determination result produced at the step S11 is "Yes" indicating that the difference diff_L0 in signal level between the observed pixel P10 and the adjacent pixel P9 as well as the difference diff_R0 in signal level between the observed pixel P10 and the adjacent pixel P11 are both 1, on the other hand, the flow of the processing goes on to a step S13 at which the pseudo-contour existence determination section 305' produces a result of determination as to whether or not the difference in signal level between any two adjacent pixels among the four pixels P6, P7, P8 and P9 on the left side of the observed pixel P10 and the four pixels P11, P12, P13 and P14 on the right side of the observed pixel P10 is 0. As shown in FIG. 11, the differences in signal level between any two adjacent pixels among the four pixels P6, P7, P8 and P9 are diff_L3, diff_L2 and diff_L1 whereas the differences in signal level between any two adjacent pixels among the four pixels P11, P12, P13 and P14 are diff_R1, diff_R2 and diff_R3. Thus, at the step S13, the pseudo-contour existence determination section 305' produces a result of determination as to whether or not each of the differences diff_L3, diff_L2, diff_L1, diff_R1, diff_R2 and diff_R3 is 0. If the determination result produced at the step S13 is "No" indicating that at least one of the differences diff_L3, diff_L2, diff_L1, diff_R1, diff_R2 and diff_R3 is not 0, the flow of the processing goes on to the step S12 at which the pseudo-contour existence determination section 305' sets the gain of the gain adjustment section 303 at 0. That is to say, the pseudo-contour existence determination section 305' turns off the function of the BPF 301'.

If the determination result produced at the step S13 is "Yes" indicating that each of the differences diff_L3, diff_L2, diff_L1, diff_R1, diff_R2 and diff_R3 is 0, on the other hand, the flow of the processing goes on to the step S14 at which the pseudo-contour existence determination section 305' produces a result of determination as to whether or not the difference in signal level between any two adjacent pixels among the five pixels P2, P3, P4, P5 and P6 on the left side of the observed pixel P10 and the five pixels P14, P15, P16, P17 and P18 on the right side of the observed pixel P10 is 0. As shown in FIG. 11, the differences in signal level between any two adjacent pixels among the five pixels P2, P3, P4, P5 and P6 are diff_L7, diff_L6, diff_L5 and diff_L4 whereas the differences in signal level between any two adjacent pixels among the five pixels P14, P15, P16, P17 and P18 are diff_R4, diff_R5, diff_R6 and diff_R7. Thus, at the step S14, the pseudo-contour existence determination section 305' produces a result of determination as to whether or not each of the differences diff_L7, diff_L6, diff_L5 and diff_L4, diff_R4, diff_R5, diff_R6 and diff_R7 is 0. If the determination result produced at the step S14 is "No" indicating that at least one of the differences diff_L7, diff_L6, diff_L5 and diff_L4, diff_R4, diff_R5, diff_R6 and diff_R7 is not 0, the flow of the processing goes on to a step S15 at which the pseudo-contour existence determination section 305' sets the BPF 301' to function as the filter M1. Then, at the next step S16, the pseudo-contour existence determination section 305' sets the gain of the gain adjustment section 303 at a value determined in advance.

If the determination result produced at the step S14 is "Yes" indicating that each of the differences diff_L7, diff_L6, diff_L5 and diff_L4, diff_R4, diff_R5, diff_R6 and diff_R7 is 0, on the other hand, the flow of the processing goes on to a step S17 at which the pseudo-contour existence determination section 305' sets the BPF 301' to function as the filter M0. Then, at the next step S18, the pseudo-contour existence determination section 305' sets the gain of the gain adjustment section 303 at a value determined in advance.

With the configuration described above, if a sub-area included in an area in the vicinity of the observed pixel P10 as a sub-area having no changes in gradation is large, the BPF 301' is set to function as the filter M0 having a relatively large time constant. If the sub-area having no changes in gradation is not very large, on the other hand, the BPF 301' is set to function as the filter M1 having a relatively small time constant. FIG. 22 is a plurality of explanatory diagrams showing two typical concrete cases in which the BPF 301' is set to function as the filters M0 and M1 respectively. In FIG. 22, a dashed line represents the gradation of the eight-bit input video signal whereas a solid line represents the gradation of an image signal obtained as a result of the bit-decompression process. Notation Wd1 is the magnitude of 1LSB (Least Significant Bit) of the eight-bit input video signal. In the cases shown in FIG. 22, the eight-bit input video signal is decompressed into a twelve-bit signal.

FIG. 22A is an explanatory diagram showing a case in which the difference in signal level between the observed pixel P10 and the pixel P11 adjacent to the observed pixel P10 on the right side of the observed pixel P10 is 1LSB (or one signal level unit) but there are no changes in gradation in the area in the vicinity of the observed pixel P10. In such a case, the BPF 301' is set to function as the filter M0 having a relatively large time constant in order to seamlessly join the step between the pixels P10 and P11 to the flat area in the vicinity of the observed pixel P10. FIG. 22B is a diagram showing a case in which the difference in signal level between the observed pixel P10 and the pixel P11 adjacent to the observed pixel P10 on the right side of the observed pixel P10 is 1LSB (or one signal level unit) and the difference in signal level between other adjacent pixels in the vicinity of the observed pixel P10 is also 1LSB (or one signal level unit). In such a case, the BPF 301' is set to function as the filter M1 having a relatively small time constant in order to seamlessly join the step between the pixels P10 and P11 to an area composed of the step and a smooth sub-area. FIGS. 21 and 22 show respectively a flowchart and cases in which the function of the BPF 301' is switched from that of the filter M0 serving as one of the two filters to that of the filter M1 serving as the other filter or vice versa. It is to be noted, however, that the number of filters can be more than two, depending on the flatness of an area in the vicinity of the observed pixel P10.

In addition, the embodiment described above adopts a sampling rate of 4:4:4. It is to be noted, however, that another sampling rate such as a sampling rate of 4:2:2 can also be adopted. In the case of a sampling rate of 4:2:2, all pixels have the data of the luminance signal Y but only odd-numbered pixels (or even-numbered pixels) have the data of the color-difference signals Cb and Cr. Thus, the spatial processing area of the luminance signal Y is different from that of the color-difference signals Cb and Cr. In this embodiment, processing is carried out by making the spatial processing area for the color-difference signals Cb and Cr the same as that of the luminance signal Y.

Figures 23A, 23B:
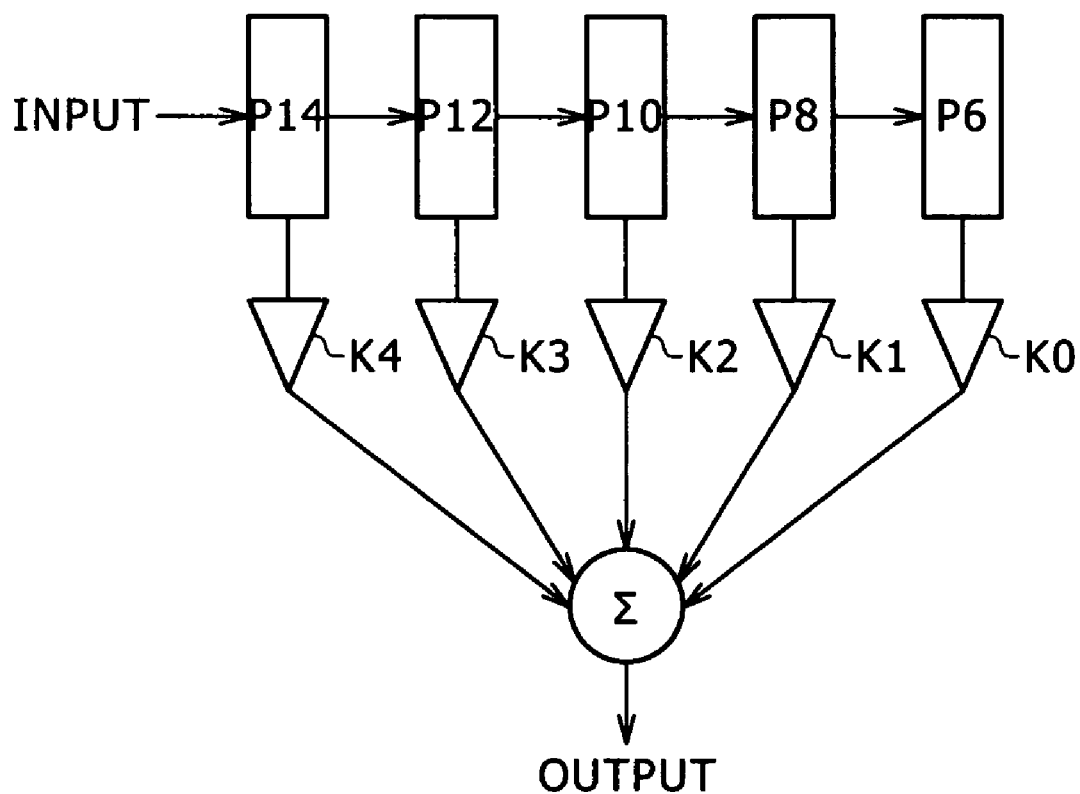
FIG. 23A is an explanatory diagram showing a typical configuration of the BPF.
FIG. 23B is a table showing filter coefficients used in the BPF.

FIG. 23A is a diagram showing a typical configuration of the BPF 301 according to the embodiment whereas FIG. 23B is a diagram showing typical filter coefficients of the BPF 301. As shown in FIG. 23A, a pixel P8 is supplied after a pixel P6 and a pixel P10 is supplied after the pixel P8 so as to extract pixel data every other pixel. Then, every supplied pixel data is multiplied by a filter coefficient. Filter coefficients each used as a multiplier for pixel data serving as a multiplicand are typically assigned to pixels as follows. For example, a filter coefficient K2 of 192/256 is assigned to the observed pixel P10, a filter coefficient K1 of −64/256 is assigned to the pixel P8 immediately preceding the observed pixel P10 and a filter coefficient K3 of −64/256 is assigned to the pixel P12 immediately succeeding the observed pixel P10. A filter coefficient K0 of −32/256 is assigned to the pixel P6 immediately preceding the pixel P8 and a filter coefficient K4 of −32/256 is assigned to the pixel P14 immediately succeeding the pixel P12.

Figure 24:
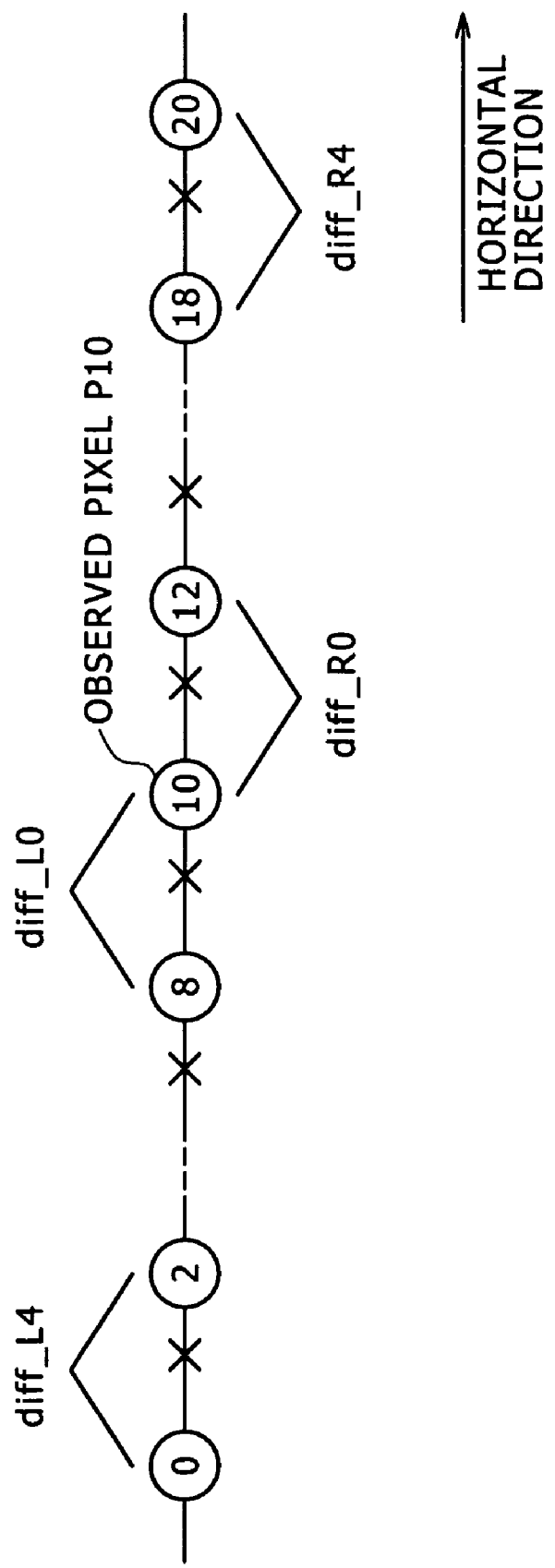
FIG. 24 is a diagram showing horizontal-direction relations between positions of the observed pixels and pixels in the vicinity of the observed pixel in the second embodiment of the present invention.

FIG. 24 is a diagram showing a typical process of determining the values of diff_Ln and diff_Rn used as a basis of pseudo-contour existence determination processing carried out by the pseudo-contour existence determination section 305. As described before, the data of the color-difference signals Cb and Cr exists in every other pixel. For example, on the right-hand side of the observed pixel P10, the data of the color-difference signals Cb and Cr exists in the pixel P12. On the left-hand side of the observed pixel P10, on the other hand, the data of the color-difference signals Cb and Cr exists in the pixel P8. Thus, on the left-hand side of the observed pixel P10, diff_L0 is set at the difference in signal level between the pixel P8 and the observed pixel P10 whereas diff_L4 is set at the difference in signal level between the pixel P0 and the pixel P2. By the same token, on the right-hand side of the observed pixel P10, diff_R0 is set at the difference in signal level between the pixel P12 and the observed pixel P10 whereas diff_R4 is set at the difference in signal level between the pixel P20 and the pixel P18.

Let notation 'in' denote an image signal level at a pixel whereas notation x denote a pixel position separated away from the position of the observed pixel P10 in the horizontal direction. In this case, the differences diff_Ln and diff_Rn are expressed by equations listed below. It is to be noted that, in the equations, instead of making use of notation diff_Ln, notations Cb_diff_Ln and Cr_diff_Ln are deliberately used in order to distinguish the differences for the color-difference signals Cb and Cr from each other. By the same token, instead of making use of notation diff_Rn, notations Cb_diff_Rn and Cr_diff_Rn are deliberately used in order to distinguish the differences for the color-difference signals Cb and Cr from each other. In addition, instead of making use notation 'in', notations Cb_in and Cr_in are used in order to distinguish the pixel positions for the color-difference signals Cb and Cr from each other.

$Cb\_diff\_L4 = Cb\_in[x-10] - Cb\_in[x-8]$ $Cb\_diff\_L3 = Cb\_in[x-8] - Cb\_in[x-6]$ $Cb\_diff\_L2 = Cb\_in[x-6] - Cb\_in[x-4]$ $Cb\_diff\_L1 = Cb\_in[x-4] - Cb\_in[x-2]$ $Cb\_diff\_L0 = Cb\_in[x-2] - Cb\_in[x]$ $Cb\_diff\_R0 = Cb\_in[x] - Cb\_in[x+2]$ $Cb\_diff\_R1 = Cb\_in[x+2] - Cb\_in[x+4]$ $Cb\_diff\_R2 = Cb\_in[x+4] - Cb\_in[x+6]$ $Cb\_diff\_R3 = Cb\_in[x+6] - Cb\_in[x+8]$ $Cb\_diff\_R4 = Cb\_in[x+8] - Cb\_in[x+10]$ $Cr\_diff\_L4 = Cr\_in[x-10] - Cr\_in[x-8]$ $Cr\_diff\_L3 = Cr\_in[x-8] - Cr\_in[x-6]$ $Cr\_diff\_L2 = Cr\_in[x-6] - Cr\_in[x-4]$ $Cr\_diff\_L1 = Cr\_in[x-4] - Cr\_in[x-2]$ $Cr\_diff\_L0 = Cr\_in[x-2] - Cr\_in[x]$ $Cr\_diff\_R0 = Cr\_in[x] - Cr\_in[x+2]$ $Cr\_diff\_R1 = Cr\_in[x+2] - Cr\_in[x+4]$ $Cr\_diff\_R2 = Cr\_in[x+4] - Cr\_in[x+6]$ $Cr\_diff\_R3 = Cr\_in[x+6] - Cr\_in[x+8]$ $Cr\_diff\_R4 = Cr\_in[x+8] - Cr\_in[x+10]$ Also in this case, the procedure represented by the flowchart shown in FIG. 10 can be executed in order to produce a result of determination as to whether pseudo contours have been generated in the input video signal. At the step S1 of the flowchart shown in FIG. 10, the levels of signals appearing at the vicinity pixels close to the observed pixel P10 are typically examined in order to produce a result of determination as to whether or not the levels are monotonously increasing or decreasing as follows. First of all, differences in signal level between every two adjacent pixels on the left-hand side of the observed pixel P10 as well as differences in signal level between every two adjacent pixels on the right-hand side of the observed pixel P10 are found. Then, the differences are examined in order to produce a result of determination as to whether or not each of the differences is 0 or greater than 0 (or is 0 or smaller than 0). That is to say, a difference conditional relation given below as a relation actually used in the determination process is applied to the differences. If the differences satisfy the difference conditional relation, a variable C_det_slope_h is set at 1. If the differences do not satisfy the difference conditional relation, on the other hand, the variable C_det_slope_h is set at 0. Thus, the value of the variable C_det_slope_h indicates whether or not the differences satisfy the difference conditional relation. The following difference conditional statement expresses the application of the difference conditional relation to the differences and an operation to set the variable C_det_slope_h at 1 or 0:

```
If (((Cb_diff_L2 >=0)&&(Cb_diff_L1 >=0)&&
     (Cb_diff_L0 >=0)&&(Cb_diff_R0 >=0)&&
     (Cb_diff_R1 >=0)&&(Cb_diff_R2 >=0)) ||
    ((Cb_diff_L2 <=0)&&(Cb_diff_L1 <=0)&&
     (Cb_diff_L0 <=0)&&(Cb_diff_R0 <=0)&&
     (Cb_diff_R1 <=0)&&(Cb_diff_R2 <=0)) ||
    ((Cr_diff_L2 >=0)&&(Cr_diff_L1 >=0)&&
     (Cr_diff_L0 >=0)&&(Cr_diff_R0 >=0)&&
     (Cr_diff_R1 >=0)&&(Cr_diff_R2 >=0)) ||
    ((Cr_diff_L2 <=0)&&(Cr_diff_L1 <=0)&&
     (Cr_diff_L0 <=0)&&(Cr_diff_R0 <=0)&&
     (Cr_diff_R1 <=0)&&(Cr_diff_R2 <=0))) {
    C_det_slope_h = 1;
} else {
    C_det_slope_h = 0;
}
```

As shown in the above difference conditional statement, if each of the differences diff_L0, diff_L1 and diff_L2 in signal level between every two adjacent pixels on the left-hand side of the observed pixel P10 as well as differences diff_R0, diff_R1 and diff_R2 on the right-hand side of the observed pixel P10 for the color-difference signals Cb and Cr is 0 or greater than 0 (or is 0 or smaller than 0), the variable C_det_slope_h is set at 1. Otherwise, the variable C_det_slope_h is set at 0.

The activities act0_h, act1_2h and act1_9h used in the determination process carried out at the steps S2 and S3 of the flowchart shown in FIG. 10 are found in accordance with equations given below. Since each of the activities is found from differences for the color-difference signals Cb and Cr, however, notations C_act0_h, C_act1_2h and C_act1_9h are used in the equations in place of notations act0_h, act1_2h and act1_9h respectively as follows:

$C\_act0\_h = abs(Cb\_diff\_L0) + abs(Cb\_diff\_R0) + abs(Cr\_diff\_L0) + abs(Cr\_diff\_R0);$ $C\_act1\_2\_h = abs(Cb\_diff\_L2) + abs(Cb\_diff\_R1) +$ $abs(Cb\_diff\_R1) + abs(Cb\_diff\_R2) +$ $abs(Cr\_diff\_L2) + abs(Cr\_diff\_R1) +$ $abs(Cr\_diff\_R1) + abs(Cr\_diff\_R2);$ $C\_act1\_9\_h = abs(Cb\_diff\_L4) + abs(Cb\_diff\_L3) +$ $abs(Cb\_diff\_L2) + abs(Cb\_diff\_L1) +$ $abs(Cb\_diff\_R1) + abs(Cb\_diff\_R2) +$ $abs(Cb\_diff\_R3) + abs(Cb\_diff\_R4) +$ $abs(Cr\_diff\_L4) + abs(Cr\_diff\_L3) +$ $abs(Cr\_diff\_L2) + abs(Cr\_diff\_L1) +$ $abs(Cr\_diff\_R1) + abs(Cr\_diff\_R2)$ $abs(Cr\_diff\_R3) + abs(Cr\_diff\_R4);$ At the step S2 of the flowchart shown in FIG. 10, an activity conditional relation given below is applied to the activities. If the activities satisfy the activity conditional relation, a variable C_det_act1_2_h is set at 1. If the activities do not satisfy the activity conditional relation, on the other hand, the variable C_det_act1_2_h is set at 0. Thus, the value of the variable C_det_act1_2_h indicates whether or not the activities satisfy the activity conditional relation. The following activity conditional statement expresses the application of the activity conditional relation to the activities and an operation to set the variable C_det_act1_2_h at 1 or 0:

```
If (C_act0_h > C_act1_2_h) {
    C_det_act1_2_h = 1;
} else {
    C_det_act1_2_h = 0;
}
```

It is to be noted that the size of the area covered by the activity C_act0_h is different from the size of the area covered by the activity C-act1_2_h. Thus, in the process to compare the activities C_act0_h and C_act1_2_h with each other, it is nice to handle the activities C_act0_h and C_act1_2_h equally by multiplying one of these activities by a weight.

At the step S3 of the flowchart shown in FIG. 10, a threshold conditional relation given below is applied to the activity C_act1_9_h of the even wider area composed of ten vicinity pixels forming a horizontal vicinity array on the left-hand side of the observed pixel P10 and ten vicinity pixels forming a horizontal vicinity array on the right-hand side of the observed pixel P10 and a predetermined threshold value denoted by notation DET_ACT1_9_TH. If the activity and the threshold value DET_ACT1_9_TH determined in advance satisfy the threshold conditional relation, a variable C_det_act1_9_h is set at 1. If the activity and the predetermined threshold value do not satisfy the activity conditional relation, on the other hand, the variable C_det_act1_9_h is set at 0. Thus, the value of the variable C_det_act1_9_h indicates whether or not the activity and the threshold value DET_ACT1_9_TH determined in advance satisfy the threshold conditional relation. The following threshold conditional statement expresses the application of the activity conditional relation to the activity and the threshold value as well as an operation to set the variable C_det_act1_9_h at 1 or 0:

```
If (C_act1_9_h <= DET_C_ACT1_9_TH) {
    C_det_act1_9_h = 1;
} else {
    C_det_act1_9_h = 0;
}
```

If even only any one of the variables C_det_slope_h, C_det_act1_2_h and C_det_act1_9_h is set at 1 as a result of the execution of the conditional statements described above, the pseudo-contour existence determination section 305 regards the values of the variables as values indicating that pseudo contours have been generated in the input video signal. In this case, the pseudo-contour existence determination section 305 passes on a gain to the gain adjustment section 303 as an argument. A conditional program statement for verifying the variables C_det_slope_h, C_det_act1_2_h and C_det_act1_9_h as well as setting a gain C_GAIN_LPF_H in the argument C_gain_h in accordance with the result of the verification is written as follows.

```
If ((C_det_slope_h== 1) ||
    (C_det_act1_2_h == 1) ||
    (C_det_act1_9_h == 1) {
        C_gain_h = C_GAIN_LPF_H;
} else {
        C_gain_h = 0;
}
```

In accordance with the above conditional program statement, if the value of the variable C_det_slope_h, C_det_act1_2_h or C_det_act1_9_h is equal to 1, the argument C_gain_h is set at the gain C_GAIN_LPF_H. Much like the gain GAIN_LPF_H described earlier, typically, the gain C_GAIN_LPF_H is in the range 0 to 1. If the values of the variables C_det_slope_h, C_det_act1_2_h and C_det_act1_9_h are all equal to 0, on the other hand, the argument C_gain_h is set at 0. It is to be noted that, if the argument C_gain_h is set at the gain C_GAIN_LPF_H, the filter processing is carried out not only on the color-difference signal Cb or Cr. Instead, the same filter processing is carried out on both the color-difference signals Cb and Cr.

In accordance with the above conditional program statement, if the value of the variable C_det_slope_h, C_det_act1_2_h or C_det_act1_9_h is equal to 1, the argument C_gain_h is set at the gain C_GAIN_LPF_H. That is to say, the condition demanding that the value of the variable C_det_slope_h be equal to 1, the condition demanding that the value of the variable C_det_act1_2_h be equal to 1 and the condition demanding that the value of the variable C_det_act1_9_h be equal to 1 are combined with each other to form an OR (logical sum) expression in the above conditional program statement. It is to be noted, however, that the combination of the three conditions is by no means limited to the OR (logical product) expression much like the case of the luminance signal Y described earlier. For example, the three conditions can also be combined with each other to form an AND (logical product) expression in the above conditional program statement. As another alternative, the three conditions can also be combined with each other to form a mixed expression composing of an OR (logical sum) partial expression an AND (logical product) partial expression in the above conditional program statement. As a further alternative, if the three conditions combined with each other to form an OR (logical sum) expression are satisfied for either the luminance signal Y or the color-difference signal Cb or Cr, the pseudo-contour existence determination section 305 regards the values of the variables as values indicating that pseudo contours have been generated in the input video signal. In this case, the pseudo-contour existence determination section 305 sets the gain C_GAIN_LPF_H in the argument C_gain_h and passes on the argument C_gain_h to the gain adjustment section 303. A conditional program statement for verifying the variables det_slope_h, det_act1_2_h and det_act1_9_h for the luminance signal Y and the variables C_det_slope_h, C_det_act1_2_h and C_det_act1_9_h for the color-difference signals Cb and Cr as well as setting a gain GAIN_LPF_H in the argument gain_h for the luminance signal Y and a gain C_GAIN_LPF_H in the argument C_gain_h for the color-difference signals Cb and Cr in accordance with the result of the verification is written as follows:

```
If ((det_slope_h== 1) ||
    (det_act1_2_h == 1) ||
    (det_act1_9_h == 1) ||
    (C_det_slope_h == 1) ||
    (C_det_act1_2_h == 1) ||
    (C_det_act1_9_h == 1)) {
        gain_h= GAIN_LPF_H;
        C_gain_h= C_GAIN_LPF_H;
} else {
        gain_h= 0;
        C_gain_h= 0;
}
```

In this embodiment described above, processing is carried out by making the spatial processing area for the color-difference signals Cb and Cr the same as that of the luminance signal Y. It is to be noted, however, that the processing can also be carried out by making the spatial processing area for the color-difference signals Cb and Cr different from that of the luminance signal Y. In the case of the sampling rate of 4:2:2 for example, the spatial processing area for the color-difference signals Cb and Cr is two times that of the luminance signal Y.

Third Embodiment

Figure 25:
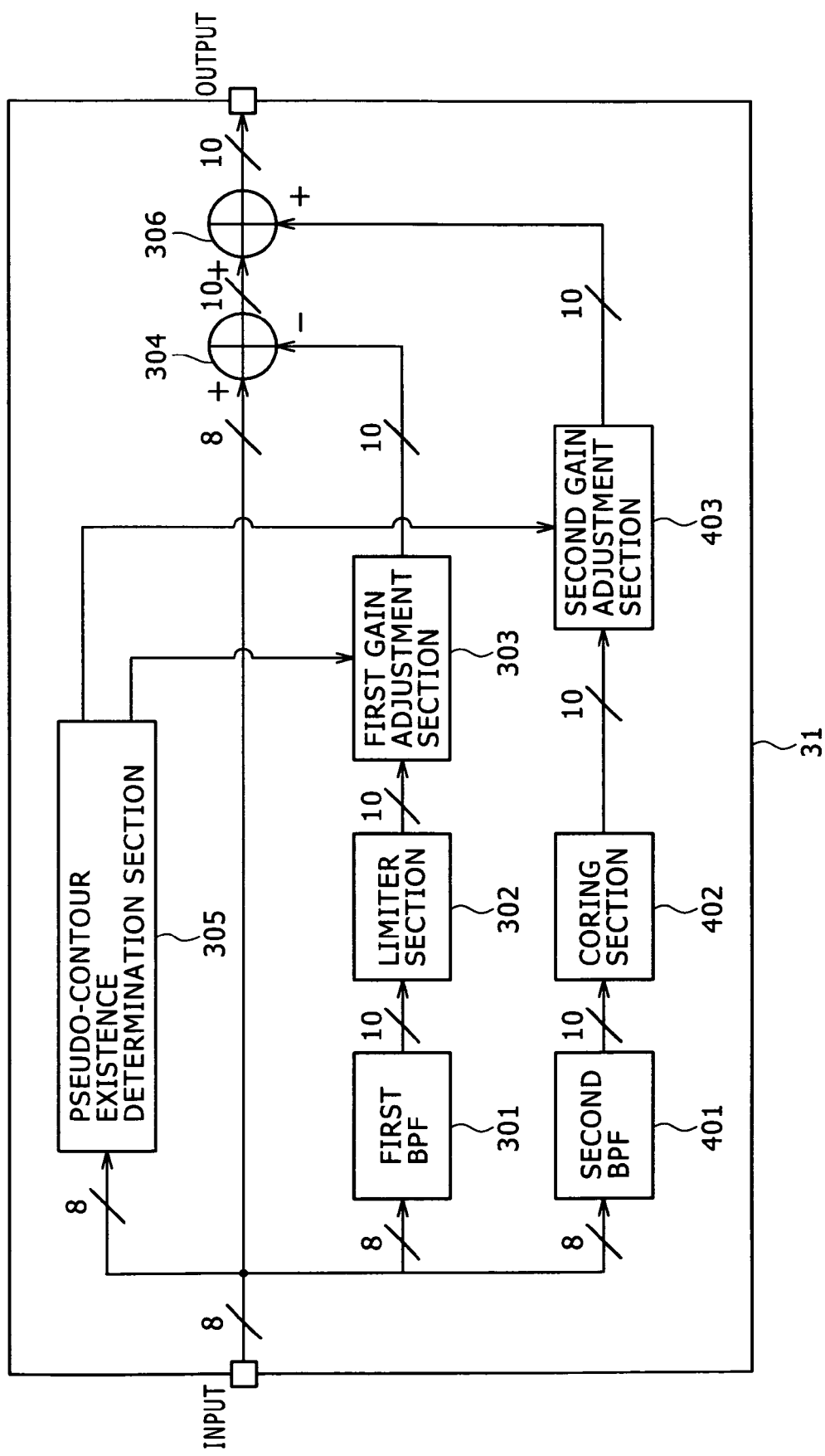
FIG. 25 is a block diagram showing a typical configuration of a filter according to a third embodiment of the present invention.
Figure 27:
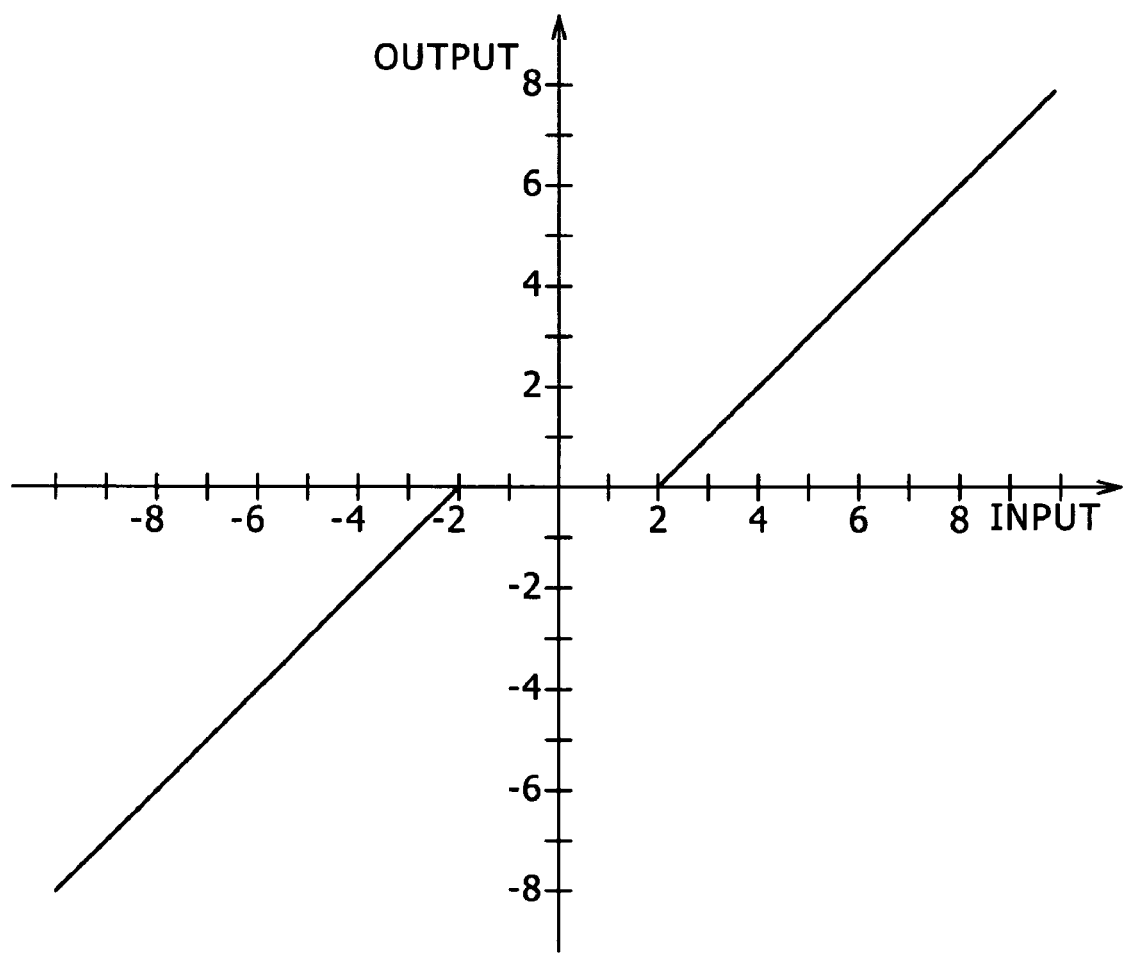
FIG. 27 is a diagram showing a typical input/output characteristic of a coring section according to the third embodiment of the present invention.

Next, a third embodiment is explained by referring to FIGS. 25 to 27. In accordance with this embodiment, there is provided a configuration in which the number of pseudo contours generated in the input video signal is reduced and, at the same time, an image sharpness enhancement process is carried out in order to improve the sharpness of an image represented by the input video signal. Configuration elements shown in FIG. 25 as elements identical with their counterparts shown in FIGS. 1, 9 and 19 explained earlier are denoted by the same reference numerals as the counterparts. The filter 31 shown in FIG. 25 has a first BPF 301, a limiter section 302, a first gain adjustment section 303 and an adder 304. The first BPF 301 increases the gradation (or the tone) of an input video signal and extracts signal components in the high-frequency band from the input video signal, passing on the high-frequency signal components to the limiter section 302. The limiter section 302 is a section for carrying out an amplitude limiting process to limit the amplitude of an image signal received from the first BPF 301. The first gain adjustment section 303 is a section for adjusting the level of an image signal received from the limiter section 302. The adder 304 is a section for subtracting an image signal received from the first gain adjustment section 303 from the input video signal.

In addition, the filter 31 shown in FIG. 25 also includes a second BPF 401, a coring section 402, a second gain adjustment section 403 and an adder 306. The second BPF 401 increases the gradation of the input video signal and extracts signal components in the high-frequency band higher than the band of signal components passed on by the first BPF 301 from the input video signal, passing on the extracted high-frequency signal components to the coring section 402. The coring section 402 is a section for carrying out a coring process on an image signal received from the second BPF 401. The second gain adjustment section 403 is a section for adjusting the level of an image signal received from the coring section 402. The adder 306 is a section for adding an image signal received from the second gain adjustment section 403 to an image signal received from the adder 304. On top of that, the filter 31 shown in FIG. 25 also has a pseudo-contour existence determination section 305 for detecting the input video signal, producing a result of determination as to whether or not pseudo contours exist in the input video signal and outputting the result of the determination to the first gain adjustment section 303 as well as the second gain adjustment section 403.

In the recording/reproduction apparatus 100 having the configuration described above, the first BPF 301, the limiter section 302, the first gain adjustment section 303 and the adder 304 carry out the pseudo-contour reduction processing to reduce the number of pseudo contours generated in an input video signal. On the other hand, the second BPF 401, the coring section 402, the second gain adjustment section 403 and the adder 306 carry out the sharpness enhancement processing to improve the sharpness of an image represented by the input video signal.

Since signals output by the first BPF 301 and the second BPF 401 are subjected to different processes carried out respectively by the limiter section 302 and the coring section 402 at the stages following the first BPF 301 and the second BPF 401 respectively, the first BPF 301 makes use of the filter-coefficient set M1 different from a filter-coefficient set M2 as shown in FIG. 26. In the following description, notation M2 also denotes the second BPF 401, which is a filter making use of the filter-coefficient set M2. The filter-coefficient set M1 shown in FIGS. 4B, 20 and 26 is used by the filter BPF 301 serving as a filter M1 for passing on signal components having high frequencies which are not so high as the frequencies of signal components passed on by the filter M2 making use of the filter-coefficient set M2 shown in FIG. 26. As shown in FIG. 26, the filter-coefficient set M2 includes a filter coefficient K8 assigned to the observed pixel P10 as a coefficient having a value of 128/256, a filter coefficient K7 assigned to the pixel P9 adjacent to the observed pixel P10 on the left-hand side of the observed pixel P10 as a coefficient having a value of −64/256 and a filter coefficient K9 assigned to the pixel P11 adjacent to the observed pixel P10 on the right-hand side of the observed pixel P10 as a coefficient also having a value of −64/256.

The first BPF 301 changes the bit count of an input video signal from eight to ten in a decompression process and extracts signal components in the high-frequency band from the input video signal, passing on the image signal components to the limiter section 302. Then, the limiter section 302 carries out a process to limit the amplitude of a ten-bit signal output by the BPF 301 and limit the gradation thereof to a value not exceeding an eight-bit gradation. Subsequently, the first gain adjustment section 303 adjusts the gain of an image signal output by the limiter section 302 and outputs an image signal obtained as a result of the gain adjustment process to the adder 304. The adder 304 subtracts an image signal received from the first gain adjustment section 303 from the input video signal. In the mean time, the second BPF 401 changes the bit count of an input video signal from eight to ten in a decompression process and extracts signal components in the high-frequency band higher than the band of signal components passed on by the first BPF 301 from the input video signal, passing on the extracted image signal components to the coring section 402. Then, the coring section 402 carries out a coring process on a ten-bit signal output by the second BPF 401 in order to generate a contour signal having small and medium amplitudes. Subsequently, the second gain adjustment section 403 adjusts the gain of the contour signal output by the coring section 402 and outputs a contour signal obtained as a result of the gain adjustment process to the adder 306. The adder 306 adds the contour signal received from the coring section 402 through the second gain adjustment section 403 to an image signal output by the adder 304.

FIG. 27 is a diagram showing a typical input/output characteristic of the coring section 402. In accordance with the typical input/output characteristic shown in FIG. 27, the coring section 402 does not pass on signals, which are included in signal components extracted by the second BPF 401 from the input video signal and supplied by the second BPF 401 to the coring section 402 as signals having small amplitudes of up to 2, to the second gain adjustment section 403. However, the coring section 402 passes on signals, which are included in signal components extracted by the second BPF 401 from the input video signal and supplied by the second BPF 401 to the coring section 402 as signals having amplitudes at least equal to 2, to the second gain adjustment section 403 by subtracting 2 from the original amplitudes. For example, when the coring section 402 receives an image signal having an amplitude of 6 from the second BPF 401, the coring section 402 passes on the image signal as an image signal having an amplitude of 4 (=6-2) to the second gain adjustment section 403. In accordance with the typical input/output characteristic shown in FIG. 27, the coring section 402 passes on signals, which are included in signal components extracted by the second BPF 401 from the input video signal and supplied by the second BPF 401 to the coring section 402 as signals having amplitudes exceeding ±2, to the second gain adjustment section 403 by subtracting ±2 respectively from the original amplitudes without regard to how large the absolute values of the original amplitudes are. However, it is also possible to provide a configuration in which the coring section 402 does not pass an image signal received thereby as an image signal having a large amplitude to the second gain adjustment section 403. For example, the coring section 402 can be provided with a limiter characteristic for reducing the output in accordance with the amplitude of an image signal received thereby or setting the amplitude of an image signal output thereby at 0 in the case of an image signal received thereby as an image signal having an amplitude greater than a level determined in advance.

Then, each of the first gain adjustment section 303 and the second gain adjustment section 403 adjusts the gain of an image signal received thereby from the limiter section 302 or the coring section 402 respectively on the basis of a gain value received from the pseudo-contour existence determination section 305 as an argument and outputs an image signal having an adjusted gain. If the pseudo-contour existence determination section 305 determines that pseudo contours in the input video signal are striking, the first gain adjustment section 303 sets the gain of an infinitesimal-amplitude image signal received thereby from the limiter section 302 at a value determined in advance and outputs an image signal having an adjusted gain to the adder 304. Then, the adder 304 subtracts the image signal having an adjusted gain from the input video signal in order to reduce the number of pseudo contours included in the reproduced video. However, if the pseudo-contour existence determination section 305 determines that pseudo contours in the input video signal are striking, the second gain adjustment section 403 sets the gain of a contour signal received thereby from the coring section 402 at 0 or a small value. Thus, the coring process carried out by the coring section 402 never inevitably results in emphasized pseudo contours in the reproduced video.

If the pseudo-contour existence determination section 305 determines that pseudo contours in the input video signal are not striking, on the other hand, the first gain adjustment section 303 sets the gain of an infinitesimal-amplitude image signal received thereby from the limiter section 302 at 0 and, thus, outputs no signal to the adder 304. Therefore, the adder 304 subtracts nothing from the input video signal. That is to say, the process to reduce the number of pseudo contours is not carried out. However, if the pseudo-contour existence determination section 305 determines that pseudo contours in the input video signal are not striking, the second gain adjustment section 403 sets the gain of a contour signal received thereby from the coring section 402 at a value determined in advance. That is to say, the second gain adjustment section 403 adjusts the gain of the contour signal output by the coring section 402 and outputs a contour signal obtained as a result of the gain adjustment process to the adder 306. Then, the adder 306 adds the contour signal received from the coring section 402 through the second gain adjustment section 403 to an image signal output by the adder 304.

By having such a configuration, infinitesimal-amplitude image signals included in the input video signal are subtracted from the video signal but signals included in the input video signal as signals each having an amplitude at least equal to a small value determined in advance are added to the input video signal. Thus, the quality of the reproduced video can be improved by reducing the number of pseudo contours included in the reproduced video and, at the same time, improving the sharpness of the reproduced video. That is to say, the pseudo-contour reduction process is carried out on image portions with striking pseudo contours whereas the sharpness enhancement process is carried out on other portions of the image.

Figure 28:
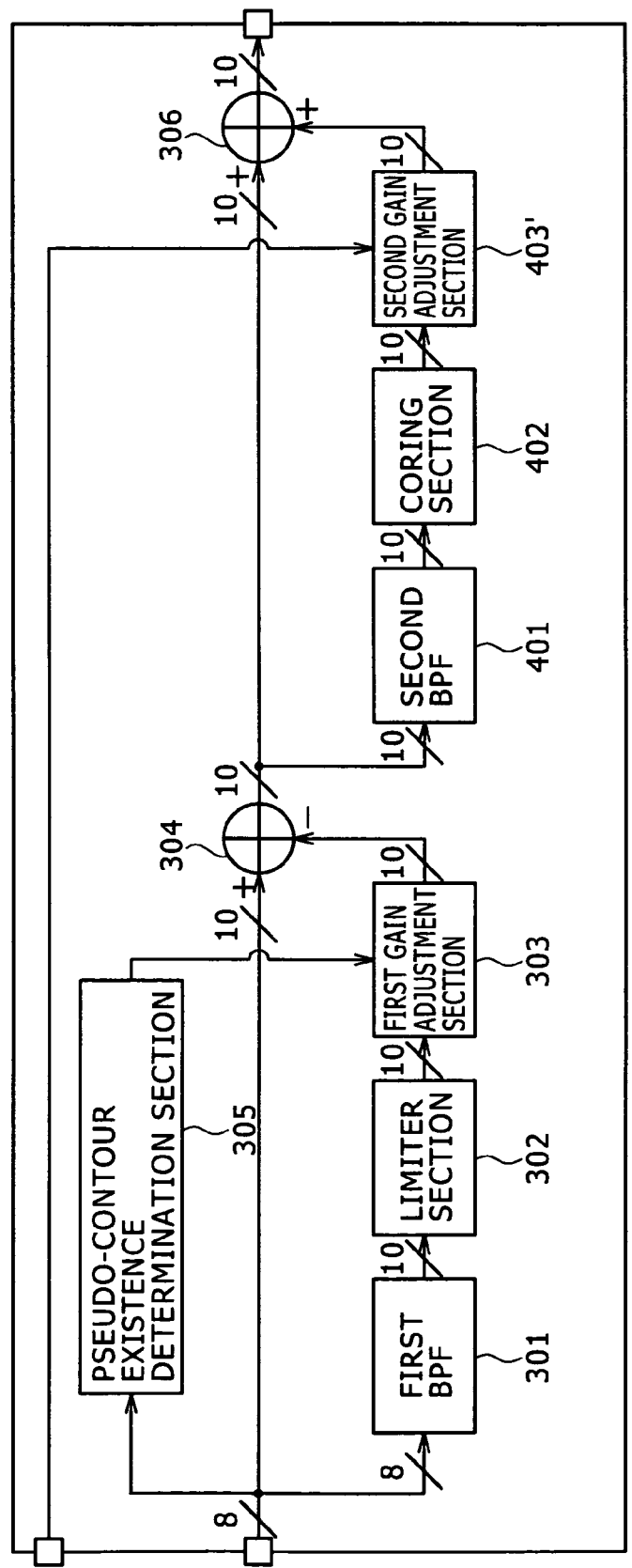
FIG. 28 is a block diagram showing another typical configuration of the filter according to the third embodiment of the present invention.

In the configuration shown in the block diagram of FIG. 25, the pseudo-contour reduction process and the sharpness enhancement process are carried out concurrently. It is to be noted, however, that the filter 301 can also be provided with a configuration in which the pseudo-contour reduction process is carried out first prior to the sharpness enhancement process. A typical configuration of such a filter 31 is shown in FIG. 28. Configuration elements shown in FIG. 28 as elements identical with their counterparts shown in FIGS. 1, 9, 19 and 25 explained earlier are denoted by the same reference numerals as the counterparts. The filter 31 shown in FIG. 28 has a first BPF 301, a limiter section 302, a first gain adjustment section 303 and an adder 304. The first BPF 301 increases the gradation (or the tone) of an input video signal and extracts signal components in the high-frequency band from the input video signal, passing on the high-frequency signal components to the limiter section 302. The limiter section 302 is a section for carrying out an amplitude limiting process to limit the amplitude of an image signal received from the first BPF 301. The first gain adjustment section 303 is a section for adjusting the level of an image signal received from the limiter section 302. The adder 304 is a section for subtracting an image signal received from the first gain adjustment section 303 from the input video signal.

In addition, the filter 31 shown in FIG. 28 also includes a second BPF 401, a coring section 402, a second gain adjustment section 403' and an adder 306. The second BPF 401 increases the gradation of an image signal output by the adder 304 and extracts signal components in the high-frequency band higher than the band of signal components passed on by the first BPF 301 from an image signal output by the adder 304, passing on the extracted high-frequency signal components to the coring section 402. The coring section 402 is a section for carrying out a coring process on an image signal received from the second BPF 401. The second gain adjustment section 403' is a section for adjusting the level of an image signal received from the coring section 402. The second gain adjustment section 403' also receives a control signal from the CPU 60 employed in the recording/reproduction apparatus 100 as shown in FIG. 2 as will be described below. The adder 306 is a section for adding an image signal received from the second gain adjustment section 403' to an image signal received from the adder 304. On top of that, the filter 31 shown in FIG. 28 also has a pseudo-contour existence determination section 305 for detecting the input video signal, producing a result of determination as to whether or not pseudo contours exist in the input video signal and outputting the result of the determination to the first gain adjustment section 303.

This embodiment has a configuration allowing the user to carry out an operation to change the degree to which the sharpness of the image is emphasized in the sharpness enhancement process. Receiving an input from such an operation, the CPU 60 employed in the recording/reproduction apparatus 100 as shown in FIG. 2 generates a control signal and outputs the control signal to the second gain adjustment section 403' as described above.

If the pseudo-contour existence determination section 305 determines that pseudo contours in the input video signal are striking, the first gain adjustment section 303 sets the gain of an infinitesimal-amplitude image signal received thereby from the limiter section 302 at a value determined in advance and outputs an image signal having an adjusted gain to the adder 304. Then, the adder 304 subtracts the image signal having an adjusted gain from the input video signal in order to reduce the number of pseudo contours included in the reproduced video. Thus, the second BPF 401 receives an image signal completing the pseudo-contour reduction process from the adder 304. As a result, the coring process carried out by the coring section 402 never inevitably results in emphasized pseudo contours in the reproduced video.

In addition, in the above configuration, the user carries out an operation to change the degree to which the sharpness of the image is emphasized in the sharpness enhancement process carried out by the coring section 402 and the CPU 60 employed in the recording/reproduction apparatus 100 as shown in FIG. 2 generates a control signal, outputting the control signal to the second gain adjustment section 403' in accordance with an input indicated by such an operation instead of relying on a determination result produced by the video graphic processor 30 as described above. Thus, the processing can be made simple.

Figure 29:
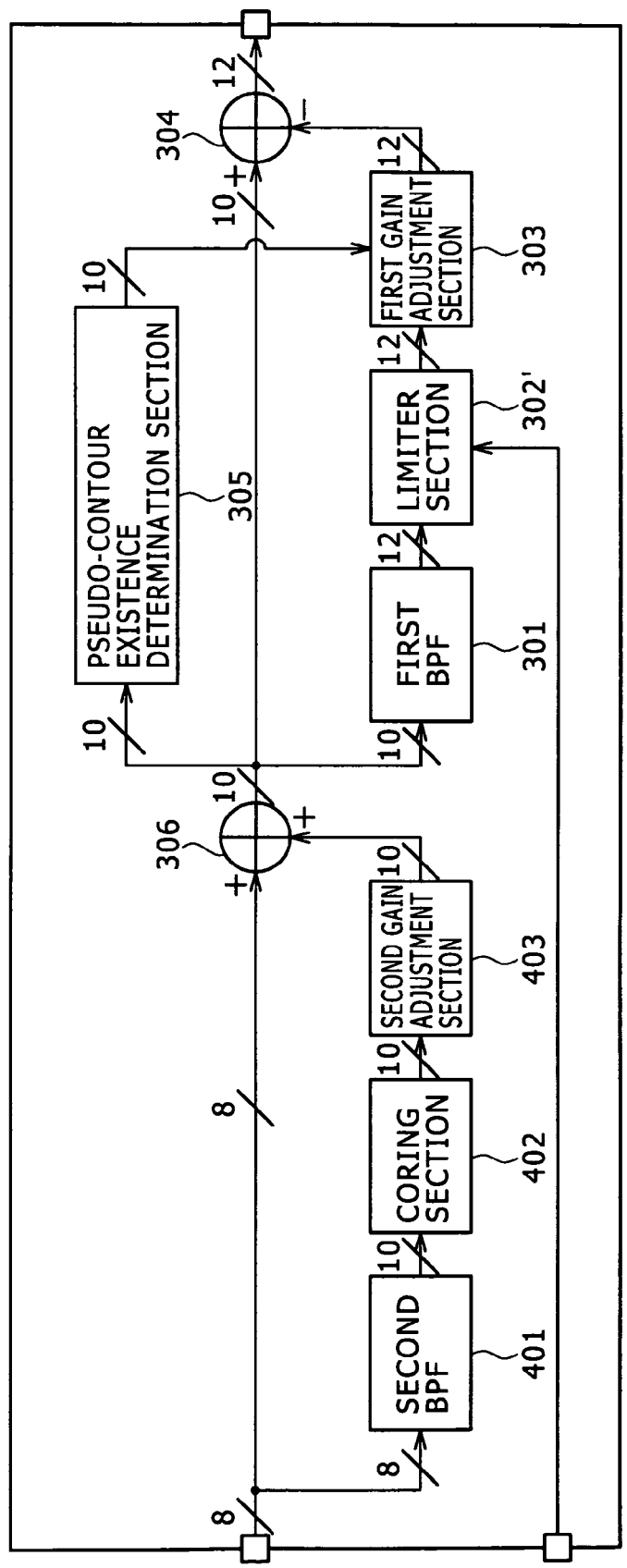
FIG. 29 is a block diagram showing a further typical configuration of the filter according to the third embodiment of the present invention.

In the configuration described above by referring to FIG. 28, the pseudo-contour reduction process is carried out first prior to the sharpness enhancement process. It is to be noted, however, that the filter 31 can also be provided with a configuration in which the pseudo-contour reduction process is carried out after the sharpness enhancement process. A typical configuration of such a filter 31 is shown in FIG. 29. Configuration elements shown in FIG. 29 as elements identical with their counterparts shown in FIGS. 1, 9, 19, 25 and 28 explained earlier are denoted by the same reference numerals as the counterparts. The filter 31 shown in FIG. 28 has a second BPF 401, a coring section 402, a second gain adjustment section 403 and an adder 306. The second BPF 401 increases the gradation (or the tone) of the input video signal and extracts signal components in a relatively high frequency band from the input video signal, passing on the high-frequency signal components to the coring section 402. The coring section 402 is a section for carrying out a coring process on an image signal received from the second BPF 401. The second gain adjustment section 403 is a section for adjusting the level of an image signal received from the coring section 402. The adder 306 is a section for adding an image signal received from the second gain adjustment section 403 to the input video signal.

In addition, the filter 31 shown in FIG. 29 also has a first BPF 301, a limiter section 302', a first gain adjustment section 303 and an adder 304. The first BPF 301 increases the gradation of an image signal output by the adder 306 and extracts signal components in a relatively low frequency band lower than the band of component signals passed on by the second BPF 401 from the image signal output by the adder 306, passing on the extracted signal components in the relatively low frequency band to the limiter section 302'. The limiter section 302' is a section for carrying out an amplitude limiting process to limit the amplitude of an image signal received from the first BPF 301. The first gain adjustment section 303 is a section for adjusting the level of an image signal received from the limiter section 302'. The adder 304 is a section for subtracting an image signal received from the first gain adjustment section 303 from the image signal. On top of that, the filter 31 shown in FIG. 29 also has a pseudo-contour existence determination section 305 for detecting the image signal output by the adder 306, producing a result of determination as to whether or not pseudo contours exist in the image signal output by the adder 306 and outputting the result of the determination to the first gain adjustment section 303.

In the configuration described above, the second BPF 401, the coring section 402 and the second gain adjustment section 403 carry out the sharpness enhancement process before the pseudo-contour reduction process performed by the limiter section 302', the first gain adjustment section 303 and the adder 304. In this case, in order to prevent the effect of the sharpness enhancement process from being inadvertently decreased by the pseudo-contour reduction process carried out at a later stage or prevent the sharpness enhancement process from inadvertently decreasing the effect of by the pseudo-contour reduction process, the configuration is provided with a function to adjust the level of the amplitude limitation carried out by the limiter section 302' in accordance with the gain value set in the second gain adjustment section 403 as follows.

Much like the configuration shown in FIG. 28, the configuration shown in FIG. 29 also allows the user to carry out an operation to set a gain value to be used as the gain of the second gain adjustment section 403. Receiving an input from such an operation, the CPU 60 employed in the recording/reproduction apparatus 100 as shown in FIG. 2 generates a control signal representing a gain value and outputs the control signal to the second gain adjustment section 403. In addition, the CPU 60 generates another control signal according to the gain value supplied by the CPU 60 to the second gain adjustment section 403 and outputs the other control signal to the limiter section 302'.

Figure 30:
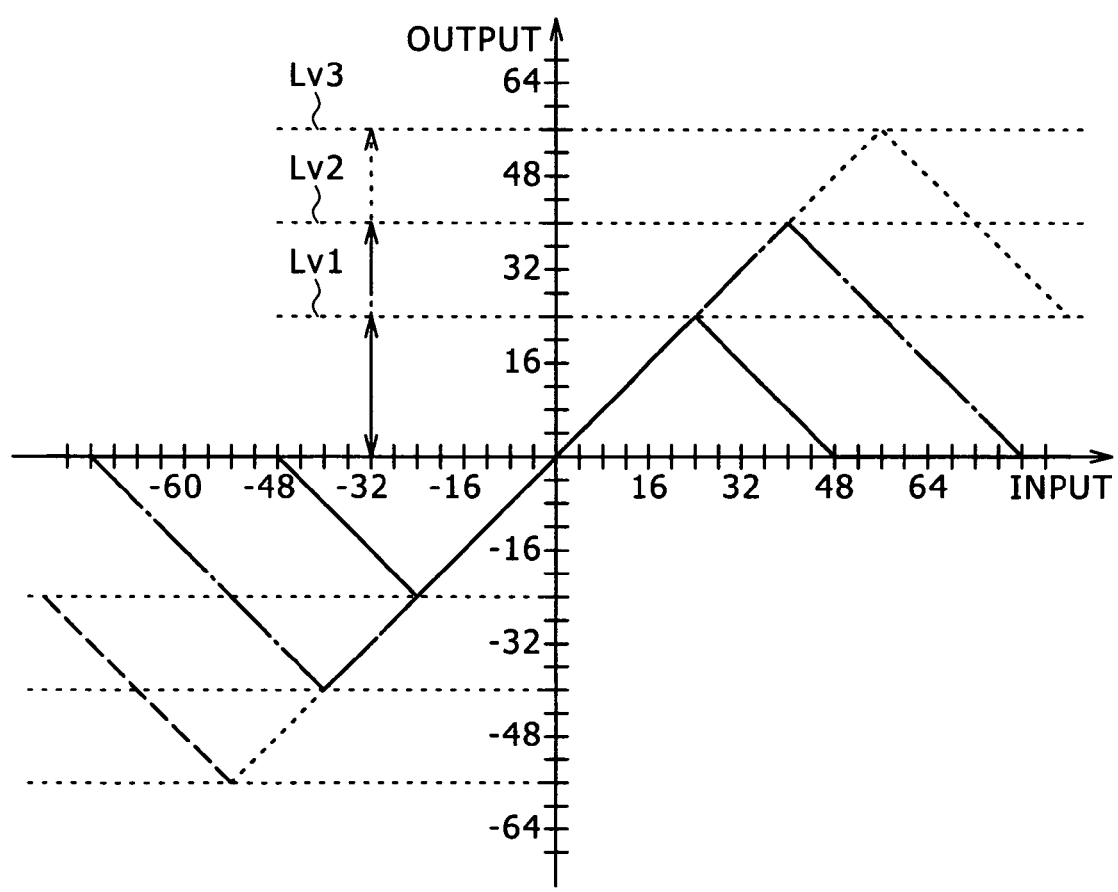
FIG. 30 is a diagram showing input/output characteristics of a limiter section according to the third embodiment of the present invention.

FIG. 30 is a diagram showing input/output characteristics of the limiter section 302'. The limiter section 302' limits the amplitude of an input signal supplied thereto to a level Lv1, Lv2 or Lv3 selected in accordance with the other control signal supplied by the CPU 60 as a signal depending on a control signal supplied by the CPU 60 to the second gain adjustment section 403. When the limit level Lv1 of typically ±24 V is selected, the limiter section 302' outputs an image signal linearly proportional to the input signal within a range defined by the limit level Lv1. As the input signal goes beyond the range, however, the limiter section 302' reduces the amplitude of the output signal in such a way that, the larger the amplitude of the input signal, the smaller the amplitude of the output signal. For input signals each having an amplitude equal to at least ±48 V, the limiter section 302' generates an output signal having an amplitude of 0 V. By the same token, when the limit level Lv2 of typically ±40 V is selected, the limiter section 302' outputs an image signal linearly proportional to the input signal within a range defined by the limit level Lv2. As the input signal goes beyond the range, however, the limiter section 302' reduces the amplitude of the output signal in such a way that, the larger the amplitude of the input signal, the smaller the amplitude of the output signal. For input signals each having an amplitude equal to at least ±80 V, the limiter section 302' generates an output signal having an amplitude of 0 V. In the same way, when the limit level Lv3 of typically ±56 V is selected, the limiter section 302' outputs an image signal linearly proportional to the input signal within a range defined by the limit level Lv3. As the input signal goes beyond the range, however, the limiter section 302' reduces the amplitude of the output signal in such a way that, the larger the amplitude of the input signal, the smaller the amplitude of the output signal. For input signals each having an amplitude equal to at least ±112 V, the limiter section 302' generates an output signal having an amplitude of 0 V.

Figure 31:
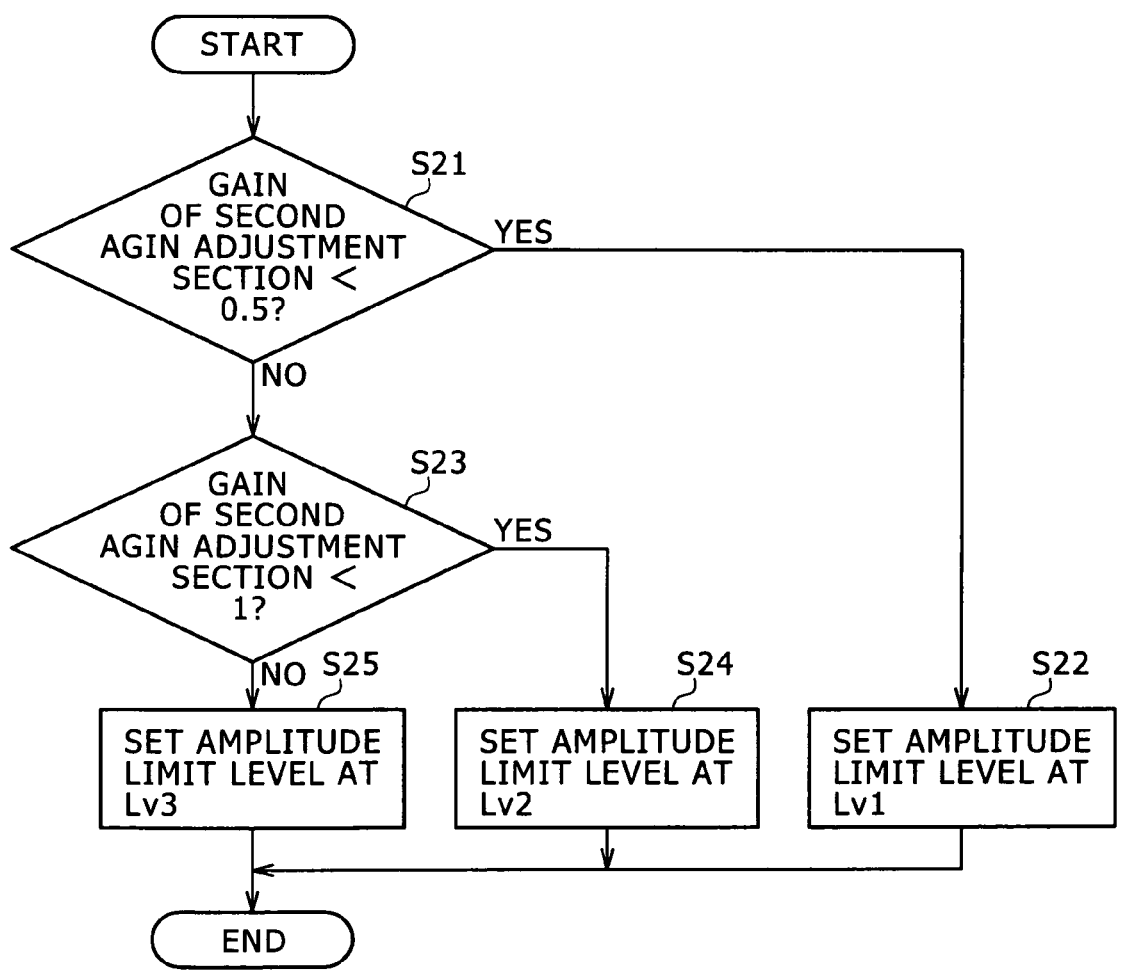
FIG. 31 is a flowchart representing processing to select a limit level to be used in the limiter section according to the third embodiment of the present invention in accordance with a gain used in a gain adjustment section according to the third embodiment.

FIG. 31 is a diagram showing a flowchart representing processing to select a limit level Lv to be used in the limiter section 302' in accordance with the gain used in the second gain adjustment section 403'. As shown in the figure, the flowchart begins with a step S21 to produce a result of determination as to whether or not the gain of the second gain adjustment section 403' is smaller than 0.5. If the determination result produced at the step S21 indicates that the gain of the second gain adjustment section 403' is smaller than 0.5, the flow of the level selection processing goes on to a step S22 at which the amplitude limit level of the limiter section 302' is set at the limit level Lv1.

If the determination result produced at the step S21 indicates that the gain of the second gain adjustment section 403' is not smaller than 0.5, on the other hand, the flow of the level selection processing goes on to a step S23 to produce a result of determination as to whether or not the gain of the second gain adjustment section 403' is smaller than 1. If the determination result produced at the step S23 indicates that the gain of the second gain adjustment section 403' is smaller than 1, the flow of the level selection processing goes on to a step S24 at which the amplitude limit level of the limiter section 302' is set at the limit level Lv2. If the determination result produced at the step S23 indicates that the gain of the second gain adjustment section 403' is not smaller than 1, on the other hand, the flow of the level selection processing goes on to a step S25 at which the amplitude limit level of the limiter section 302' is set at the limit level Lv3.

As is obvious from the flowchart explained above, if the gain value set in the second gain adjustment section 403' is large, that is, if the degree of the sharpness emphasis is high, the amplitude limit level of the limiter section 302' also becomes higher in proportion to the gain of the second gain adjustment section 403'. Thus, if the sharpness is strongly emphasized, the effect of the sharpness emphasis is not reduced inadvertently due to the pseudo-contour reduction process. In the embodiment described above, the limiter section 302' has three different amplitude limit levels. It is to be noted, however, that the number of amplitude limit levels is by no means limited to 3. That is to say, the number of amplitude limit levels can be set at a value greater than 3. For example, the number of amplitude limit levels can be set at 4, 5 or an even larger value. In addition, in the embodiment described above, the criteria used in evaluating the gain value of the second gain adjustment section 403' are 0.5 and 1. It is to be noted, however, that the criteria do not have to be these numbers but can also be any other numerical values.

Figure 32:
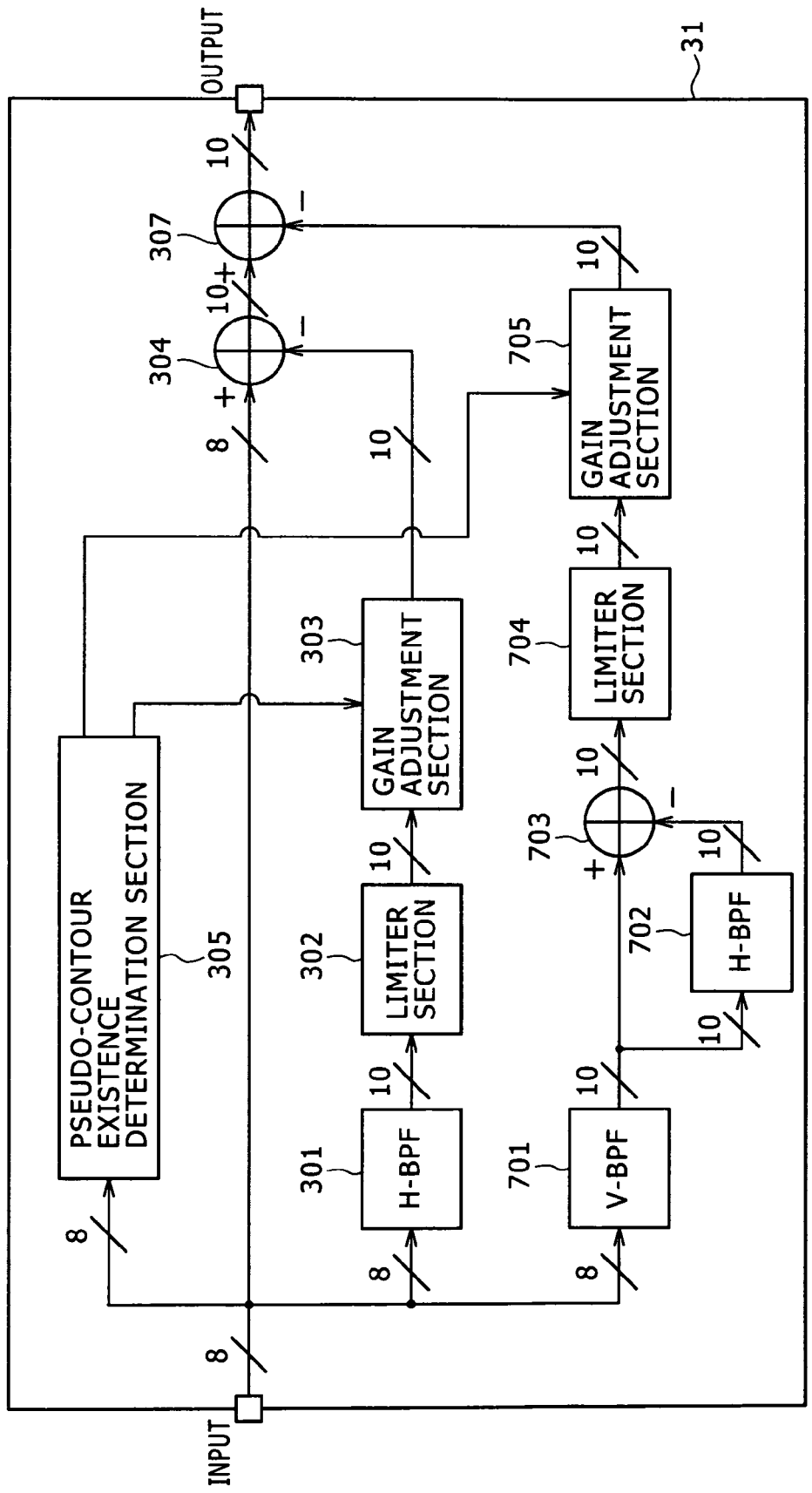
FIG. 32 is a block diagram showing a still further typical configuration of the filter according to the third embodiment of the present invention.

In the embodiments described above, signals of pixels arranged in the horizontal direction are extracted and processed. It is also worth noting, however, that signals of pixels arranged in the vertical direction can also be extracted and processed at the same time. FIG. 32 is a block diagram showing a configuration of the filter 31 shown in FIG. 9 except that the filter 31 shown in FIG. 32 carries out the pseudo-contour reduction process also on pixels arranged in the vertical direction. Configuration elements shown in FIG. 32 as elements identical with their counterparts shown in FIG. 9 explained earlier are denoted by the same reference numerals as the counterparts. The filter 31 shown in FIG. 32 has an H-BPF 301, a limiter section 302, a gain adjustment section 303, an adder 304 and a pseudo-contour existence determination section 305. The H-BPF 301 is a section for carrying out a bit decompression process on the input video signal in order to increase the bit count of the input video signal and a process to extract high-frequency signal components originated by pixels arranged in the horizontal direction from the input video signal, passing on the extracted high-frequency signal components to the limiter section 302. The limiter section 302 is a section for carrying out a process to limit the amplitude of an image signal received from the H-BPF 301. The gain adjustment section 303 is a section for adjusting the level of an image signal output by the limiter section 302. The adder 304 is a section for subtracting an image signal output by the gain adjustment section 303 from the input video signal. The pseudo-contour existence determination section 305 is a section for detecting the input video signal in order to produce a result of determination as to whether or not pseudo contours have been generated in the input video signal. The pseudo-contour existence determination section 305 supplies the result of the determination to the gain adjustment section 303 which then changes the value of the gain thereof in accordance with the result received from the pseudo-contour existence determination section 305.

In addition, the filter 31 shown in FIG. 32 has a V-BPF 701, an H-BPF 702, a subtractor 703, a limiter section 704, a gain adjustment section 705 and a subtractor 307. The V-BPF 701 is a section for carrying out a bit decompression process on the input video signal in order to increase the bit count of the input video signal and a process to extract high-frequency signal components originated by pixels arranged in the vertical direction from the input video signal, passing on the extracted high-frequency signal components to the H-BPF 702 as well as the subtractor 703. The H-BPF 702 is a section for carrying out a process to extract high-frequency signal components originated by pixels arranged in the horizontal direction from the image signal received from the V-BPF 701, passing on the extracted high-frequency signal components the subtractor 703. Each of the high-frequency signal components extracted by the H-BPF 702 is an image signal component extracted by the H-BPF 301. For this reason, the H-BPF 702 is also referred to as an overlapping-signal component passing filter. The subtractor 703 is a section for subtracting an image signal output by the H-BPF 702 from an image signal output by the V-BPF 701. The limiter section 704 is a section for carrying out a process to limit the amplitude of an image signal received from the subtractor 703. The gain adjustment section 705 is a section for adjusting the level of an image signal output by the limiter section 704. The subtractor 307 is a section for subtracting an image signal output by the gain adjustment section 705 from an image signal output by the adder 304. The pseudo-contour existence determination section 305 supplies the result of the determination also to the gain adjustment section 705 which then changes the value of the gain thereof in accordance with the result received from the pseudo-contour existence determination section 305.

As described above, each of the high-frequency signal components extracted by the H-BPF 702 from an image signal output by the V-BPF 701 is an image signal component extracted by the H-BPF 301 and the subtractor 703 subtracts an image signal output by the H-BPF 702 from an image signal output by the V-BPF 701. Thus, none of vertical-direction components output by the subtractor 703 overlaps a horizontal-direction component output by the H-BPF 301. If the V-BPF 701 is implemented by hardware, the hardware typically includes a delay line.

In addition, the pseudo-contour existence determination section 305 supplies the result of the determination also to the gain adjustment section 303 as well as the gain adjustment section 705. Thus, the gain adjustment section 303 makes use of a proper gain to generate an infinitesimal-amplitude image signal from horizontal-direction components output by the limiter section 302 as an image signal to be subtracted from the input video signal in case the pseudo-contour existence determination section 305 produces a determination result indicating that pseudo contours exist in the input video signal. By the same token, the gain adjustment section 705 makes use of a proper gain to generate an infinitesimal-amplitude image signal from vertical-direction components output by the limiter section 704 as an image signal to be subtracted from an image signal generated by the adder 304 in case the pseudo-contour existence determination section 305 produces a determination result indicating that pseudo contours exist in the input video signal. As a result, the number of pseudo contours in the reproduced video is decreased. In the filter 31 shown in FIG. 32, the horizontal processing and the vertical processing are carried out concurrently on image signals originated by pixels arranged in the horizontal direction and image signals originated by pixels arranged in the vertical direction respectively. It is to be noted, however, that the horizontal processing and the vertical processing can also be carried out sequentially. For example, the horizontal processing is carried out before the vertical processing.

As described above, FIG. 32 is a block diagram showing a configuration of the filter 31 shown in FIG. 9 except that the filter 31 shown in FIG. 32 carries out the pseudo-contour reduction process also on pixels arranged in the vertical direction. It is to be noted, however, that a variety of other configurations each used for carrying out processing on image signals originated by pixels arranged in the horizontal direction and processing on image signals originated by pixels arranged in the vertical direction concurrently can be provided. For example, it is possible to provide a configuration based on that shown in FIG. 25 as a configuration for carrying out the sharpness enhancement process also on image signals originated by pixels arranged in the vertical direction.

In addition, in each of the embodiments described above, existence of pseudo contours in a video signal is determined on the basis of the level of the video signal in the base band. It is to be noted, however, that the pseudo-contour reduction processing can also be carried out on only an area assumed to be an area causing coarse quantization after the decoding process carried out by the MPEG decoder 15a or 15b on the basis of quantization information acquired from an image signal output by the MPEG decoder 15a or 15b.

In addition, each of the embodiments described above implements an image-signal processing apparatus which functions as a recording/reproduction apparatus. It is to be noted, however, that each of the embodiments may also implement an image-signal processing apparatus which functions as another apparatus such as a TV receiver or a video-signal switching apparatus known as the so-called AV amplifier.

The series of processes described previously can be carried out by hardware and/or execution of software. If the series of processes described above is carried out by execution of software, programs composing the software can be installed into a computer embedded in dedicated hardware, a general-purpose personal computer or the like from typically a network or the recording medium. In this case, the computer or the personal computer serves as the recording/reproduction apparatus 100 described above. A general-purpose personal computer is a personal computer, which can be made capable of carrying out a variety of functions by installing a variety of programs into the personal computer.

It should be understood by those skilled in the art that various modifications, combinations, sub-combinations and alterations may occur depending on design requirements and other factors insofar as they are within the scope of the appended claims or the equivalents thereof.

What is claimed is:

1. An image-signal processing apparatus, comprising:
   a band pass filter configured to increase the bit count of an input digital image signal in a bit decompression process and pass on an image signal of a high frequency band, wherein said band pass filter extracts horizontal-direction frequency signal components from said input digital image signal and passes on said horizontal-direction frequency signal components;
   an amplitude limiting section configured to limit the amplitude of said image signal passed on by said band pass filter to a level determined in advance;
   a subtractor configured to subtract an image signal output by said amplitude limiting section from said input digital image signal;
   a vertical-direction frequency-component band pass filter configured to extract vertical-direction frequency signal components from said input digital image signal and pass on said vertical-direction frequency signal components;
   an overlapping-frequency-component band pass filter configured to extract an image signal component overlapping any one of said horizontal-direction frequency signal components passed on by said band pass filter from said vertical-direction frequency signal components passed on by said vertical-direction frequency-component band pass filter and pass on said extracted overlapping signal component; and
   an adder configured to subtract said overlapping signal passed on by said overlapping-frequency-component band pass filter from said vertical-direction frequency signal components passed on by said vertical-direction frequency-component band pass filter.

2. An image-signal processing apparatus, comprising
   a band pass filter configured to increase the bit count of an input digital image signal in a bit decompression process and pass on an image signal of a high frequency band;
   an amplitude limiting section configured to limit the amplitude of said image signal passed on by said band pass filter to a level determined in advance;
   a gain adjustment section configured to adjust the gain of an image signal output by said amplitude limiting section as a signal having the amplitude limited by said amplitude limiting section;
   a subtractor configured to subtract an image signal output by said amplitude limiting section from said input digital image signal; and
   a pseudo-contour existence determination section configured to produce a result of determination as to whether or not an image represented by said input digital image signal is an image with a striking pseudo contour on the basis of a rate of gradation changes in an area composed of an observed pixel selected among pixels composing said image and neighbor pixels located in the vicinity of said observed pixel, wherein
   said gain adjustment section changes the gain from one value to another in accordance with said result of said determination.

3. The image-signal processing apparatus according to claim 2, wherein said gain adjustment section sets said gain at a value determined in advance if said determination result produced by said pseudo-contour existence determination section indicates that said image represented by said input digital image signal is an image with a striking pseudo contour.

4. The image-signal processing apparatus according to claim 3, wherein said pseudo-contour existence determination section produces a determination result indicating that said image represented by said input digital image signal is an image with a striking pseudo contour if signal levels of said pixels composing said area are monotonously increasing or decreasing.

5. The image-signal processing apparatus according to claim 3, wherein said pseudo-contour existence determination section produces a determination result indicating that said image represented by said input digital image signal is an image with a striking pseudo contour if an activity of a small area including said observed pixel and pixels adjacent to said observed pixel on the left-hand and right-hand sides of said observed pixel is greater than an activity of a wider area in the vicinity of said observed pixel where said activity of an area is defined as the sum of the absolute values of differences in signal level between every two adjacent pixels in said area.

6. The image-signal processing apparatus according to claim 3, wherein said pseudo-contour existence determination section produces a determination result indicating that said image represented by said input digital image signal is an image with a striking pseudo contour if said activity of an even wider area in the vicinity of said observed pixel is equal to or smaller than a threshold value determined in advance.

7. The image-signal processing apparatus according to claim 2, wherein if a sub-area included in an area composed of pixels in the vicinity of said observed pixel as a sub-area with no differences in signal level between any two of said pixels is large, said pseudo-contour existence determination section sets said band pass filter to function as a filter having a large time constant.

8. The image-signal processing apparatus according to claim 2, further comprising
   a sharpness enhancement section configured to carry out a sharpness enhancement process on said input digital image signal.

9. The image-signal processing apparatus according to claim 8, wherein said sharpness enhancement section comprises:
   a second band pass filter configured to increase the bit count of said input digital image signal in a bit decompression process and pass on an image signal of a high frequency band higher than the band of said image signal passed on by said band pass filter;
   a coring section configured to limit the amplitude of said image signal passed on by said second band pass filter in order to generate a contour signal;
   a second gain adjustment section configured to adjust the gain of said contour signal output by said coring section; and an adder configured to add said contour signal received from said coring section through said second gain adjustment section as a contour signal having the gain adjusted by said second gain adjustment section to an image signal output by said subtractor.

10. The image-signal processing apparatus according to claim 9, wherein said second gain adjustment section reduces said gain or sets said gain at 0 if said determination result produced by said pseudo-contour existence determination section indicates that said image represented by said input digital image signal is an image with a striking pseudo contour.

11. The image-signal processing apparatus according to claim 9, wherein said second band pass filter increases the bit count of an image signal output by said subtractor in a bit decompression process and passes on an image signal of a high frequency band higher than the band of said image signal passed on by said band pass filter.

12. The image-signal processing apparatus according to claim 9, wherein said band pass filter increases the bit count of an image signal output by said adder in a bit decompression process and passes on an image signal of a high frequency band.

13. The image-signal processing apparatus according to claim 2, wherein said pseudo-contour existence determination section outputs said result of said determination to said gain adjustment section as well as said second gain adjustment section.

* * * * *